MEMORY SYSTEM

Original Filed Aug. 28, 1959 21 Sheets-Sheet 1

INVENTORS
ROBERT R. SEEBER, JR.
ARTHUR J. SCRIVER, JR

BY Marshall M. Truax
ATTORNEY

FIG. 2

| CYCLE | 1 | | 2 | | 3 | | 4 | | 5 | | 6 | | 7 | | 8 | | 9 | | 10 | | 11 | | 12 | | 13 | | 14 | | 15 | | 16 | | 17 | | 18 | | 19 | | 20 | | 21 | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| PART | A | B | A | B | A | B | A | B | A | B | A | B | A | B | A | B | A | B | A | B | A | B | A | B | A | B | A | B | A | B | A | B | A | B | A | B | A | B | A | B | A | B |
| ENTRY | 29 | 29 | 1 | 1 | 44 | 44 | 10 | 10 | 11 | 11 | 51 | 51 | 39 | 39 | 36 | 36 | 12 | 12 | 50 | 50 | 23 | 23 | 55 | 55 | 22 | 22 | 58 | 58 | 42 | 42 | 64 | 64 | 82 | 82 | 25 | 25 | 98 | 98 | 31 | 31 | 38 | 38 |
| ECHO | | | | | | | | | | | | | 1 | 1 | 10 | 10 | 11 | 11 | 12 | 12 | 29 | 29 | 36 | 36 | 39 | 39 | 44 | 44 | 50 | 50 | 51 | 51 | 55 | 55 | 58 | 58 | 64 | 64 | 82 | 82 | 98 | 98 |
| EXIT (D1) | | | | | | | | | | | | 1 | 1 | 10 | 10 | 11 | 11 | 12 | 12 | 29 | 29 | 36 | 36 | 39 | 39 | 44 | 44 | 50 | 50 | 51 | 51 | 55 | 55 | 58 | 58 | 64 | 64 | 82 | 82 | 98 | 98 | 22 |
| W 1 | | | | | | | | | | | 1 | 1 | 10 | 10 | 11 | 11 | 29 | 29 | 29 | 29 | 36 | 36 | 39 | 39 | 44 | 44 | 50 | 50 | 51 | 51 | 55 | 55 | 58 | 58 | 64 | 64 | 82 | 82 | 98 | 98 | 22 | 22 |
| D 2 | | | | | | | | | | 1 | 1 | 10 | 10 | 11 | 11 | 29 | 29 | 29 | 29 | 36 | 36 | 39 | 39 | 44 | 44 | 50 | 50 | 51 | 51 | 55 | 55 | 58 | 58 | 64 | 64 | 82 | 82 | 98 | 98 | 22 | 22 | 23 |
| W 2 | | | | | | | | | 1 | 1 | 10 | 10 | 11 | 11 | 29 | 29 | 36 | 36 | 36 | 36 | 39 | 39 | 44 | 44 | 50 | 50 | 51 | 51 | 55 | 55 | 58 | 58 | 64 | 64 | 82 | 82 | 22 | 22 | 22 | 22 | 23 | 23 |
| D 3 | | | | | | | | 1 | 1 | 10 | 10 | 11 | 11 | 29 | 29 | 36 | 36 | 36 | 36 | 39 | 39 | 44 | 44 | 50 | 50 | 51 | 51 | 55 | 55 | 58 | 58 | 64 | 64 | 82 | 82 | 22 | 22 | 22 | 22 | 23 | 23 | 25 |
| W 3 | | | | | | | 1 | 1 | 10 | 10 | 11 | 11 | 29 | 29 | 39 | 39 | 39 | 39 | 39 | 39 | 44 | 44 | 50 | 50 | 51 | 51 | 55 | 55 | 58 | 58 | 22 | 22 | 22 | 22 | 22 | 22 | 23 | 23 | 23 | 23 | 25 | 25 |
| D 4 | | | | | | 1 | 1 | 10 | 10 | 11 | 11 | 29 | 29 | 39 | 39 | 39 | 39 | 39 | 39 | 44 | 44 | 50 | 50 | 51 | 51 | 55 | 55 | 58 | 58 | 22 | 22 | 22 | 22 | 22 | 22 | 23 | 23 | 23 | 23 | 25 | 25 | 31 |
| W 4 | | | | | 1 | 1 | 29 | 29 | 29 | 29 | 29 | 29 | 44 | 44 | 44 | 44 | 44 | 44 | 44 | 44 | 50 | 50 | 51 | 51 | 55 | 55 | 22 | 22 | 22 | 22 | 23 | 23 | 23 | 23 | 23 | 23 | 25 | 25 | 25 | 25 | 31 | 31 |
| D 5 | | | | 1 | 1 | 29 | 29 | 29 | 29 | 29 | 29 | 44 | 44 | 44 | 44 | 44 | 44 | 44 | 44 | 50 | 50 | 51 | 51 | 55 | 55 | 22 | 22 | 22 | 22 | 23 | 23 | 23 | 23 | 23 | 23 | 25 | 25 | 25 | 25 | 31 | 31 | 38 |
| W 5 | | | 29 | 29 | 29 | 29 | 44 | 44 | 44 | 44 | 44 | 44 | 51 | 51 | 51 | 51 | 51 | 51 | 51 | 51 | 51 | 51 | 23 | 23 | 23 | 23 | 23 | 23 | 23 | 23 | 42 | 42 | 42 | 42 | 42 | 42 | 42 | 42 | 42 | 42 | 42 | 42 |
| D6 | | | 29 | 29 | 29 | 29 | 44 | 44 | 44 | 44 | 44 | 44 | 51 | 51 | 51 | 51 | 51 | 51 | 51 | 51 | 51 | 51 | 23 | 23 | 23 | 23 | 23 | 23 | 23 | 23 | 42 | 42 | 42 | 42 | 42 | 42 | 42 | 42 | 42 | 42 | 42 | 42 |

MEMORY SYSTEM

Original Filed Aug. 28, 1959 21 Sheets-Sheet 3

MEMORY CONTROL CIRCUITS

FIG. 4d EXIT & ECHO EXIT REGISTERS (FORWARD)-WORD REGISTER 1
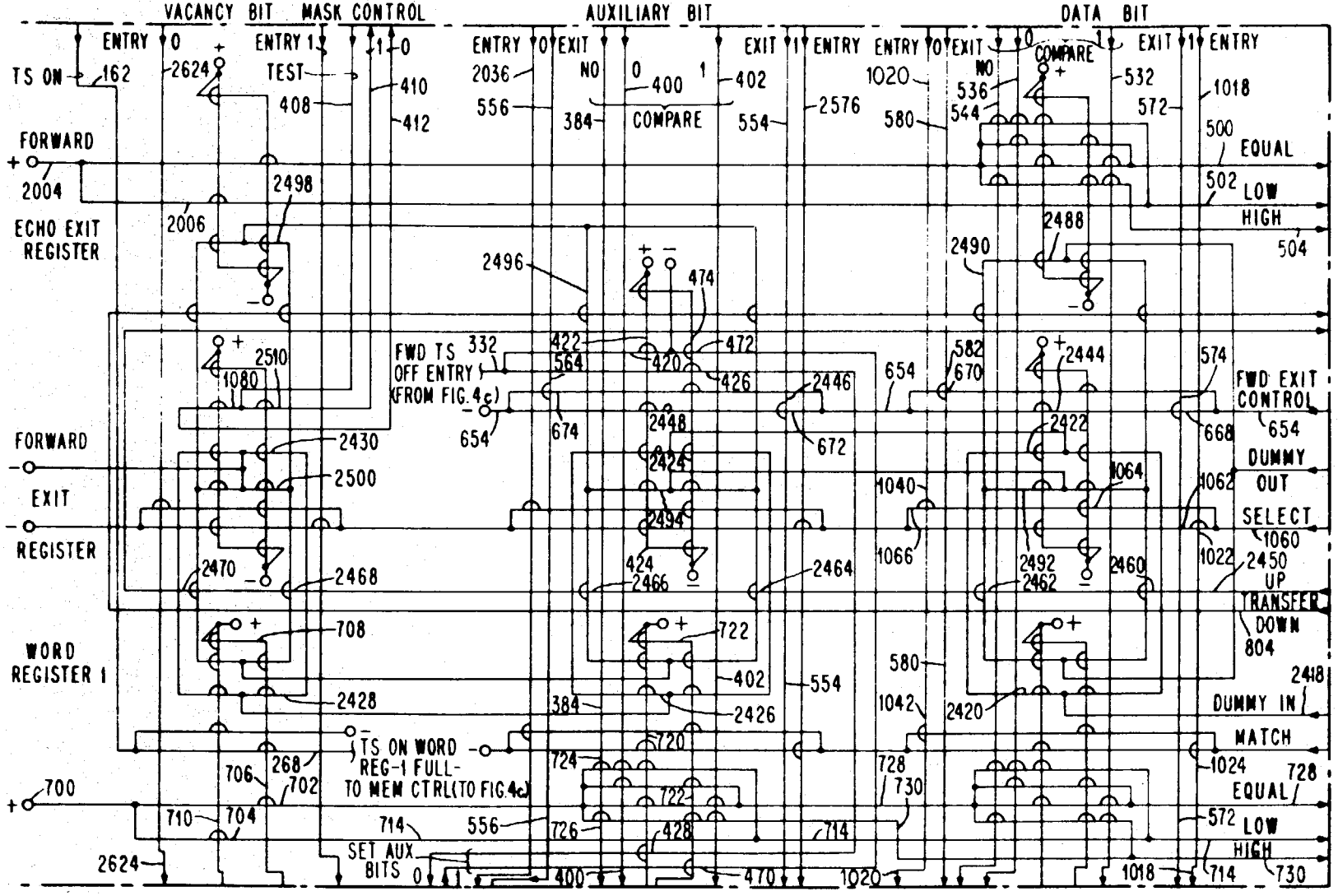

WORD REGISTER 1 & EXIT REGISTER CONTROL

WORD REGISTER 1, DUMMY REGISTER 2 & WORD REGISTER 2

MEMORY SYSTEM

Original Filed Aug. 28, 1959 21 Sheets-Sheet 10

WORD REGISTER 2 & DUMMY REGISTER 2 CONTROL

FIG. 4j WORD REGISTER X, DUMMY REGISTER X+1 & WORD REGISTER X+1
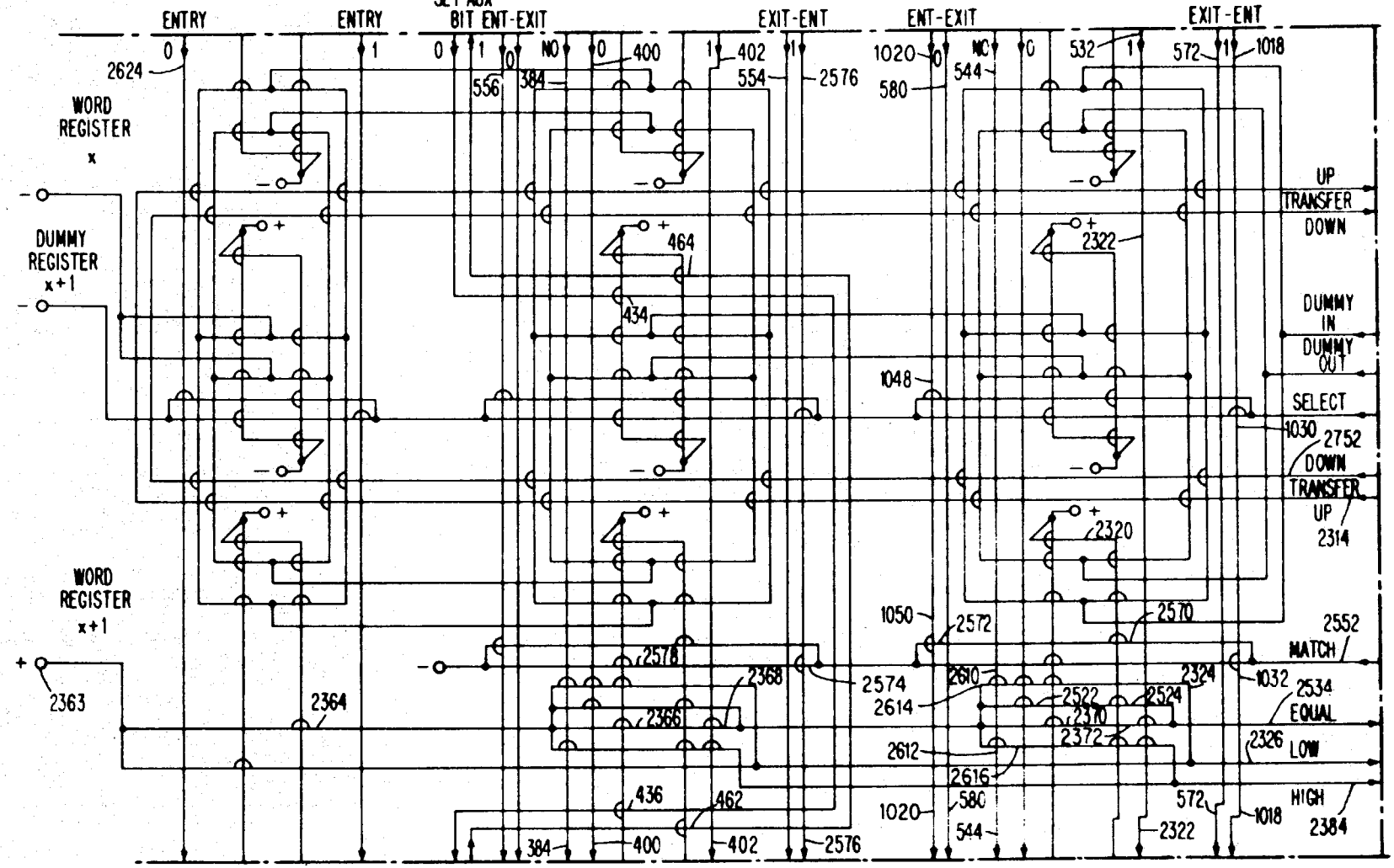

WORD REGISTER X+1 & DUMMY REGISTER X+1 CONTROL
SWITCH FWD BWD
TS ON OFF
EXIT (VAC BIT 1)
EXIT (VAC BIT 1)
MATCH NO PREV-PREV-NO PREV-PREV
SELECT
TRIGGER FWD BWD
UP
TRANSFER
DOWN DUMMY IN
DUMMY OUT
DOWN
TRANSFER
UP
SELECT
MATCH
EQUAL
LOW
HIGH

WORD REGISTER $W_n$ & DUMMY REGISTER W CONTROL

FIG. 4p WORD REGISTER W, BACKWARD EXIT REGISTER & ECHO EXIT REGISTER
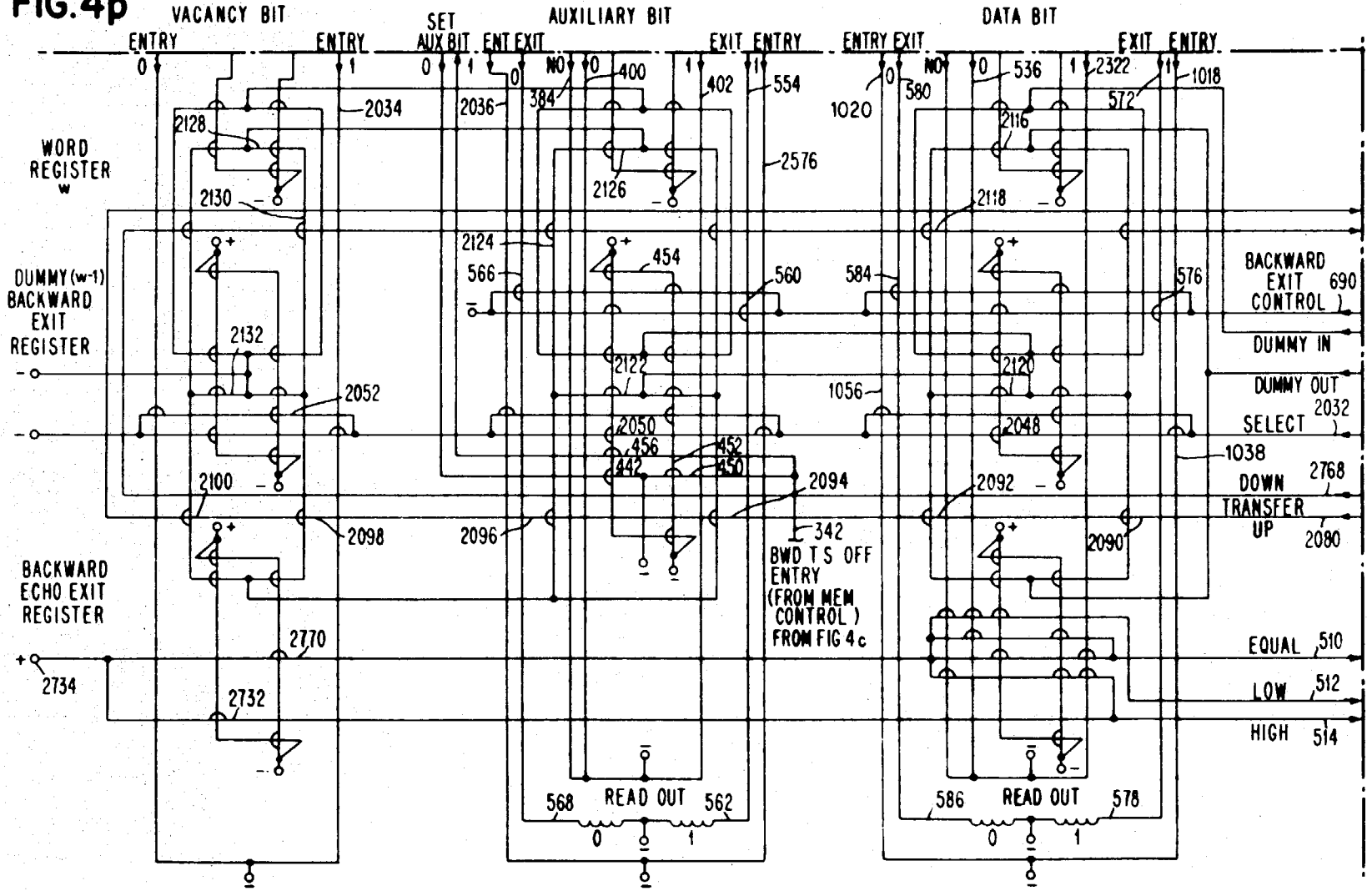

| | | |
|---|---|---|
| FIG. 4a | FIG. 4b | FIG. 4c |
| FIG. 4d | FIG. 4e | FIG. 4f |
| FIG. 4g | FIG. 4h | FIG. 4i |
| FIG. 4j | FIG. 4k | FIG. 4l |
| FIG. 4m | FIG. 4n | FIG. 4o |
| FIG. 4p | FIG. 4q | FIG. 4r |

United States Patent Office

Re. 27,119
Reissued Apr. 27, 1971

27,119
MEMORY SYSTEM

Robert R. Seeber, Jr., Poughkeepsie, and Arthur J. Scriver, Jr., Wappingers Falls, N.Y., assignors to International Business Machines Corporation, New York, N.Y.

Original No. 3,230,512, dated Jan. 18, 1966, Ser. No. 836,753, Aug. 28, 1959. Application for reissue Mar. 13, 1967, Ser. No. 626,355
Int. Cl. G11c *15/00*
U.S. Cl. 340—172.5 47 claims

Matter enclosed in heavy brackets [ ] appears in the original patent but forms no part of this reissue specification; matter printed in italics indicates the additions made by reissue.

*ABSTRACT OF THE DISCLOSURE*

*An associative memory is provided which sorts words as the words are entered into the memory. An associative search in the memory locates the position among the words previously entered into the memory where the next word is to be entered. Dummy registers between the word storing registers provide a temporary location for the word being entered. The word storage locations are shiftable to clear the dummy registers for the next entry. A search can be made under a mask, and means is provided for selecting words one at a time in order when a multiple match occurs.*

This invention relates to memory systems including circuits for entering information into and retrieving information from such systems and more particularly to a fully associative memory system including circuits for sorting information supplied to such systems.

Memory systems can be classified by the manner in which selected discrete locations may be interrogated in order to perform read and write operations. Examples of such memory systems include memory systems having addresses identified with the physical location of the unit of data and associative memory system including catalogue and tag memories. One form of the memory systems having addresses identified with the physical location of the data is the coordinate address memory system in which groups of selection lines are arranged in such a manner that energization of particular lines in each group is effective to select a unique word location. Associative memory systems are those in which a unit of data, such as a word, is retrieved by specifying the information content of an arbitrary portion of its structure. The associative region may extend over the entire word or only a portion thereof. Catalogue memory systems require manual intervention to change the contents and include means to indicate whether or not a particular word is contained within the memory system by comparing the information stored in each register with the information contained in the particular word. Additionally, provision may be incorporated to read out the word if it is in storage.

The memory system of the present invention is further classified as a new, more powerful and fully associative memory system having the ability to identify any word or words stored in memory when any portion of the word is known.

When the memory system of the invention is operated, signals, representative of a portion of the word which may include one or more bits, are applied to those storage devices of all registers wherein the specified portion of information is stored. These signals will thereupon select those registers having like signals contained in the portion of the word upon which interrogation has been performed. As will be understood from the more detailed description to follow, the extreme versatility of the fully associative memory system may be illustrated by the operation wherein the system may be interrogated to identify words having the same information in all positions or particular groups of positions of each register and by another operation wherein a sorting or merging operation on words or records is performed. When the memory system is operated for storage or sorting purposes, it is operating in the associative memory mode.

Recently, the phenomenon of superconductivity has been employed in the design of switching or gating devices called cryotrons, useful in computers, memory systems, control circuits and other devices. These gating devices comprise a gate conductor and a control conductor of superconductive material associated therewith, both maintained below the temperatures at which the superconductive materials undergo transitions between normal and superconductive states in the absence of a magnetic field. The control conductor is preferably fabricated of a superconductive material requiring a more intense magnetic field to drive it into a normal or resistive state at the operating temperature of the circuit than is required to so drive the superconductive material of the gate conductor. The gating function is achieved by energizing the control conductor with current of a magnitude to apply a magnetic field to the gate conductor sufficient to drive the latter into the resistive state. Further information on superconductive gating devices and a discussion of some logical circuits assembled therefrom is contained in an article by D. A. Buck, entitled, "The Cryotron—A Superconductive Computer Component," which appeared in the Proceedings of the IRE, vol. 44, No. 4, pages 482–493, April 1956. Details of the particular cryogenic elements used in this invention appear before the specific circuits of the invention are discussed.

Briefly, the memory system comprises a plurality of unique storage locations in tandem relationship and grouped in pairs so that each group, in effect, is set aside for a single word, but among the groups, a word entering memory is inserted in proper sequence with the other words by using one of the two locations normally assigned to one word. Thus, pairs of locations so connected may be thought of as corresponding to a series of single registers adapted to receive and transmit words simultaneously so that a word can be inserted between words, the group of words above or below, as the case may be, being shifted to make available a location for the word to be merged. The proper location for insertion of the word is selected by comparing the entering word or a portion thereof with all of the words or like portions thereof. Words may be retrieved either by addressing an associative region of a word or words or by exceeding the capacity of the memory in which case words on a word for word basis are automatically transmitted from memory in sequence.

More specifically, words, each comprising a plurality of bits, are the units of data, and the words are transmitted serially, bits of a word being transmitted in parallel. The storage locations, referred to as storage registers, each store a word and are connected in cascade so that the bits of a word are transferred from one register to another simultaneously. For the purpose of description, the storage registers are described as being arranged in a column with the top and bottom of the column referring to the lowest order and highest order respectively for the "forward" mode of operation and bottom and top referring to the highest order and lowest order respectively for the "backward" mode. The memory is constructed to be reversible as the previous statement implies, but at this point, only the forward mode is considered except when the backward mode is referred to explicitly.

The top and bottom registers and alternate registers therebetween of the column of storage registers are best described as intermediate storage registers and are designated as "dummy" registers. An entry register is provided having an output bus of word size connected as an input to each of the dummy registers. The storage registers interspersed between dummy registers are designated word registers and communicate with the entry register via dummy registers. Thus, the column is perfectly symmetrical with respect to dummy and word registers. The top dummy register, Dummy register 1, has an output bus connected as an input circuit to the Exit circuits and another output to a so-called Echo Exit register which always retains the image of the bit configuration of the word last removed from memory via the Exit circuits. Additionally, memory control circuits provide timing and control signals.

For the backward mode, the bottom dummy register, Dummy register W+1, has an output bus connected as an input circuit to the Exit circuits in common with Dummy register 1 and another output circuit to another Echo Exit register which serves the same purpose as the first.

For an Entry operation the word comprises a plurality of data bits and a vacancy bit which is used to determine when memory is full. When a word is removed from memory, the vacancy bit is discarded and the word comprises data bits only.

The associative region of the word is defined by a mask so that either a portion or all of the word may be specified. Starting with the memory empty, the first word to be entered is placed in the bottom storage register, Dummy register W+1. The second word to be entered is either entered in the dummy register immediately above the bottom word register, Word register W, if the associative portion is less than the associative portion of the first word or the word previously entered is moved up one register to the next dummy register and the second word replaces it in the bottom dummy register if the associative portion is equal to or greater than the associative portion of the first word entered. The first and second words are then moved into adjacent storage locations, expressly word registers. The third word to be entered has its associative region compared against like regions of the words previously stored and enters the dummy register just above the first word whose associative region is greater than its own with all words in the registers above moving up one position to provide space for the new word. If the third word to be entered has data in the associative region greater than data in like regions in words previously stored or equal to a like region in the bottom word, the third word is entered in the bottom dummy register and the other words move up a position to provide a space. The result, then, is that for each entry operation the words finally occupy word registers. In the manner described above, all of the words in memory are stored with the data in the associative regions in ascending sequence from top to bottom of memory. When all of the word registers are occupied and another entry is made, one of the words in memory or the incoming word is made available at the exit register and the memory system is then performing entry and exit operations simultaneously. The selection of the exit word depends upon whether the memory system is operating in the forward or backward mode.

When the memory system is operating only as an associative memory system, the associative portion of a word is specified in the Entry register, the word nearest to the top of memory and related thereto by a match is obtained and placed in the Exit circuits via Dummy register 1, and then all of the words above the one obtained are moved to fill the location vacated by the word obtained if the latter is not to be retained for subsequent use. Otherwise, the matched word remains as before.

When the system is operating as a self-sorting memory, the exit circuits are used for overflow if the number of words to be sorted is greater than the capacity of memory. If all of the memory locations are in use, the associative region of the word to be entered is compared with like regions of the words in memory, and if equal to or greater than the like region of the word in the top register, it is entered in the proper word register to place it in sequence. All of the words in the registers above and including the location of insertion are moved up one location and the word in the top word register is transferred to the exit circuits. Its replica is retained in the Echo Exit register (forward, in this instance). If the contents of the associative region of the word to be entered is less than the contents of like portions of the words in memory and a word has not been previously transferred to the exit circuits, the word passes to the exit circuits; if the associative data is less than that of the word previously transferred from memory and having its image in the Echo Exit register, a new sequence group of words is started to keep the words leaving memory in sequence. This is accomplished by entering the current word at the bottom of memory as the beginning of a new group, each word of which is identified by an auxiliary bit which numerically increases the value of each word in the new group so that, in effect, both groups appear to be in sequence. As additional words are entered in memory the new group gradually occupies all locations of memory at which time the auxiliary bits in the word registers are retired.

In the backward mode of operation or reversible mode, sorting is performed with the data in the associative region in descending sequence from bottom to top. In this case, the Dummy register W+1 is used as an exit register and the Backward Echo Exit register retains the image of the most recently extracted word.

It is an object of the invention, therefore, to provide an improved memory system.

Another object of the invention is to provide a fully associative memory system.

Still another object of the invention is to provide a memory system wherein unique locations may be addressed by all or a selected portion of the information content therein.

A further object of the invention is to provide an improved superconductive memory system.

Yet another object of the invention is to provide an improved memory system wherein words may be read out in sequential order.

Yet another object of the invention is to provide an improved memory system wherein words may be read into memory in sequential order.

A still further object of the invention is to provide a memory system wherein any word in memory may be located when any fractional part of the word is known.

Another object of the invention is to provide a superconductive memory system wherein words may be located in response to an associative pattern of the information content of a word.

Still another object of the invention is to provide an improved memory system wherein words having the identical information in particular portions of each storage location may be read out serially.

It is an object of this invention to provide an improved apparatus for comparing a unit of information with a plurality of units of information.

It is an object of this invention to provide apparatus for comparing a unit of information with a plurality of units of information stored in a memory system and with one unit of information previously extracted from the memory system.

Another object of this invention is to provide apparatus for sorting or merging units of information in a storage device.

A further object of this invention is to provide sorting apparatus having circuits for selecting a designated portion of a unit of information for association with like designated portions of a plurality of units of information.

Still another feature of this invention is to provide apparatus for receiving units of information which are randomly arranged and to arrange them in a desired sequence.

Yet another feature of this invention is to provide a storage system wherein circuits are arranged to extract a unit of information from memory and then to move other units of information to fill the location in memory from which the selected unit was obtained.

Another object of the invention is to provide storage apparatus for making a stored unit of information of a predetermined character available at an output from storage when all locations of storage are occupied and a current unit of information is to be entered in storage.

Still another object of the invention is to provide a memory system which can perform an entry and exit operation simultaneously.

A still further object of the invention is to provide a sorting device wherein the denominational order of the units of information may be reversed so that forward and backward arranging of data in sequence is accomplished.

Yet another object of this invention is to provide apparatus for arranging two groups of units of data in sequential order and identifying one group in a manner such that the two groups appear to be in sequence.

It is another object of this invention to provide a memory system having circuits for retrieving data on the basis of either a portion or all of the data content and for retrieving data by exceeding the capacity of memory so that units of data overflow.

It is another object of this invention to provide a memory system having circuits responsive to an indicator which accompanies each word for making one identified group of words available and another identified group of words unavailable for retrieval on the basis of information content.

Another object is one in accordance with the foregoing object wherein the identified group of words unavailable for retrieval on the basis of the information content is available for retrieval by exceeding the capacity of memory so that units of data are ejected.

Another object is one in accordance with the foregoing object wherein the group of words available for retrieval by exceeding the capacity of memory are retrieved serially arranged in accordance with the value of a specified portion of the words.

Another object of the invention is to provide logical circuits including those using complementary input signals to provide complementary output signals.

Another object of the invention is to provide a latch circuit which specifies a particular output after the input has changed.

Still another object of the invention is to provide comparing circuits especially suitable for comparing a plurality of units of data simultaneously.

Yet another object of the invention is to provide a plurality of bistable devices sequentially settable in response to a series of signals applied thereto and circuits responsive to the bistable device last set for resetting all of the other bistable devices.

The foregoing and other objects, features and advantages of the invention will be apparent from the following more particular description of a preferred embodiment of the invention, as illustrated in the accompanying drawings.

In the drawings:

FIGURE 2 is a chart for illustrating the processing of a series of numbers in one mode of operation of the associative memory system.

Figure 4A:
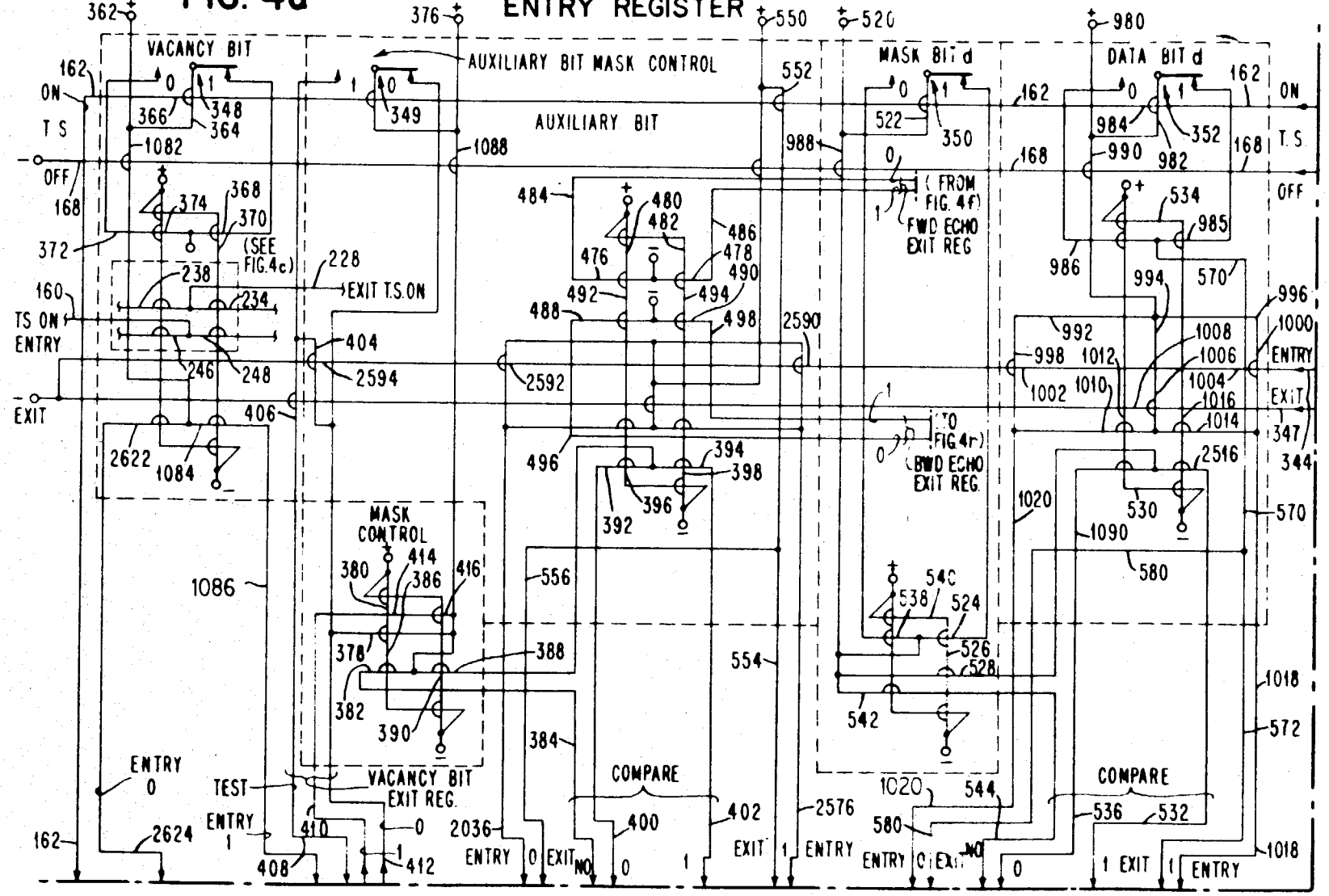
Figure 4B:
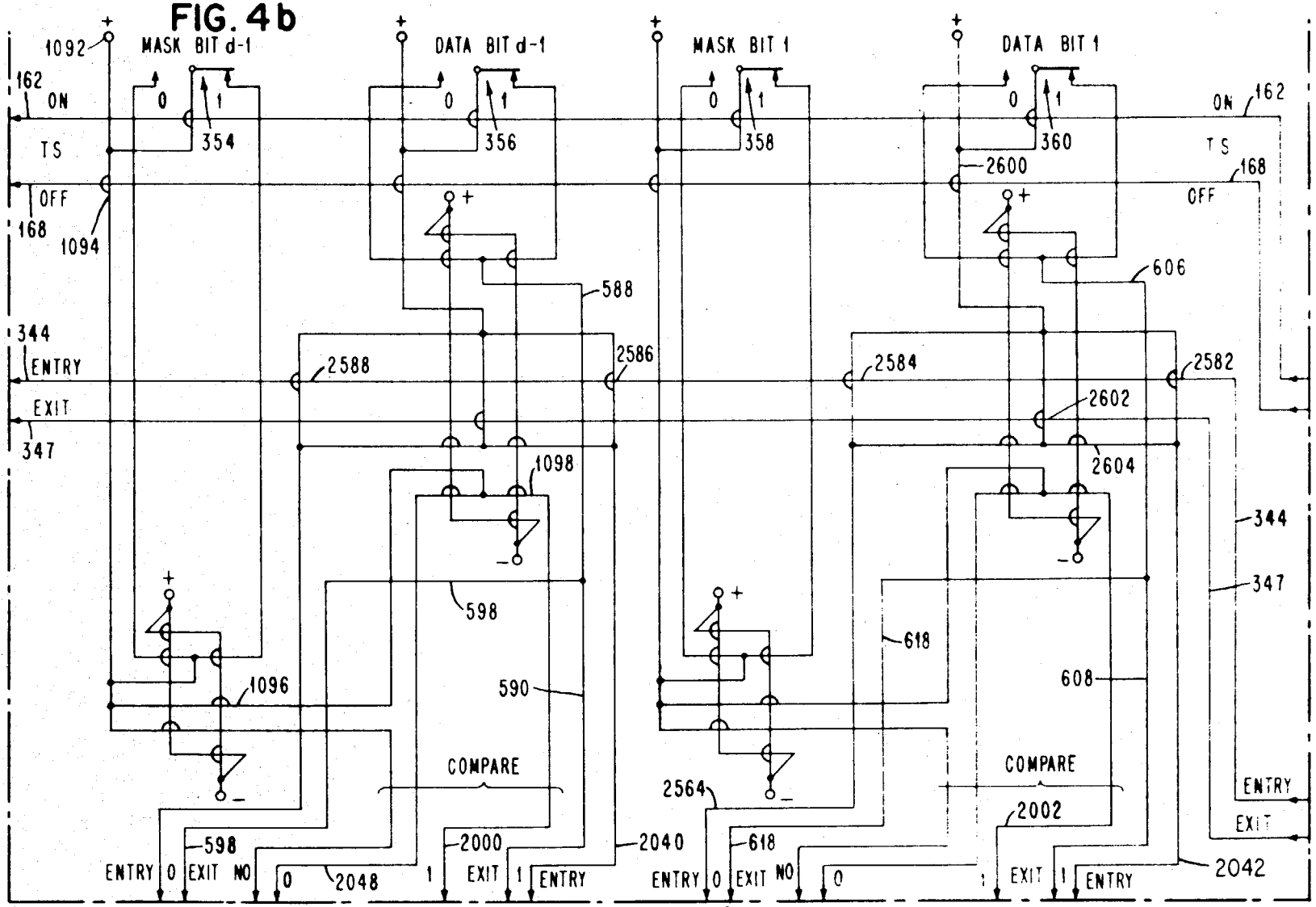
Figure 4C:
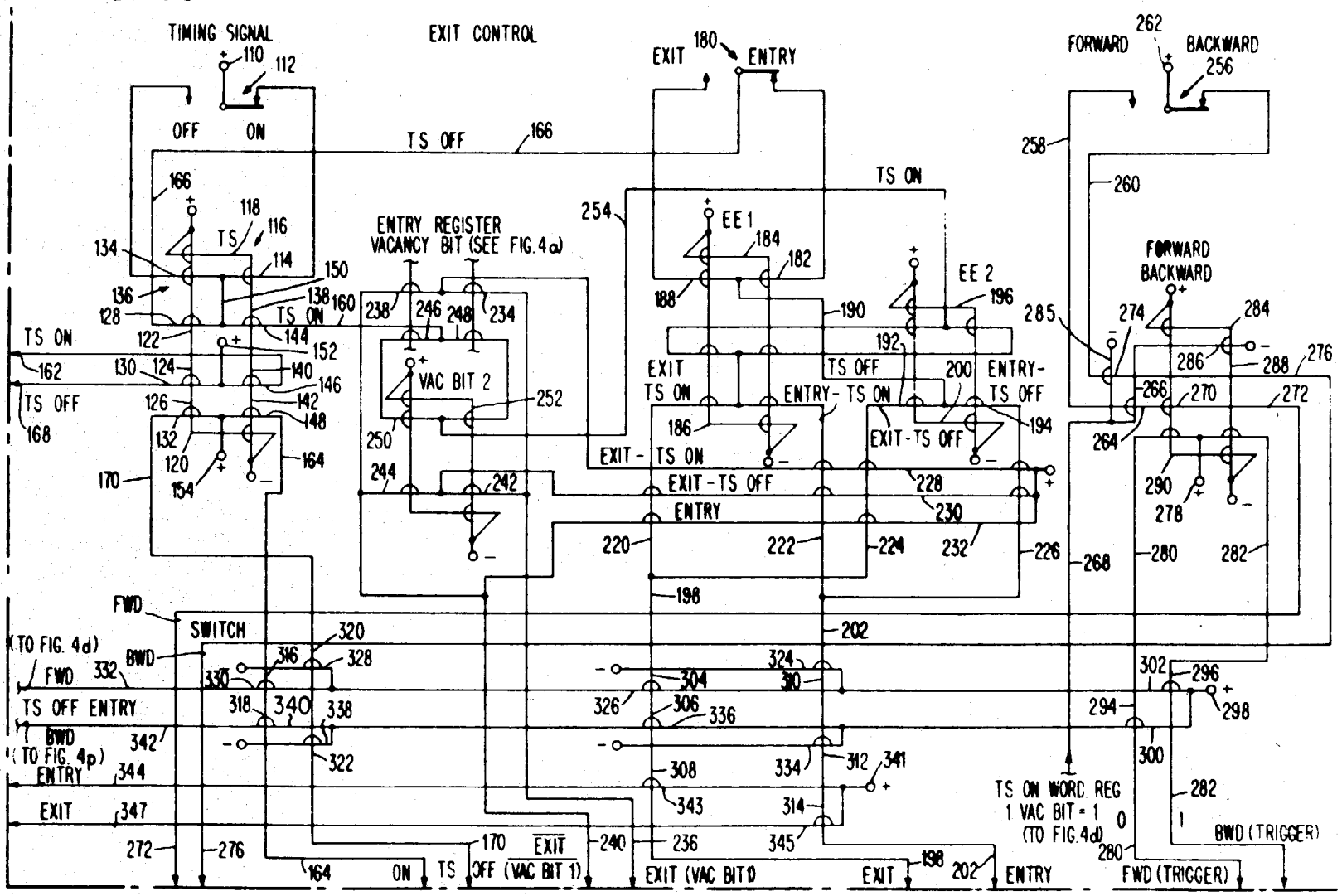
Figure 4E:
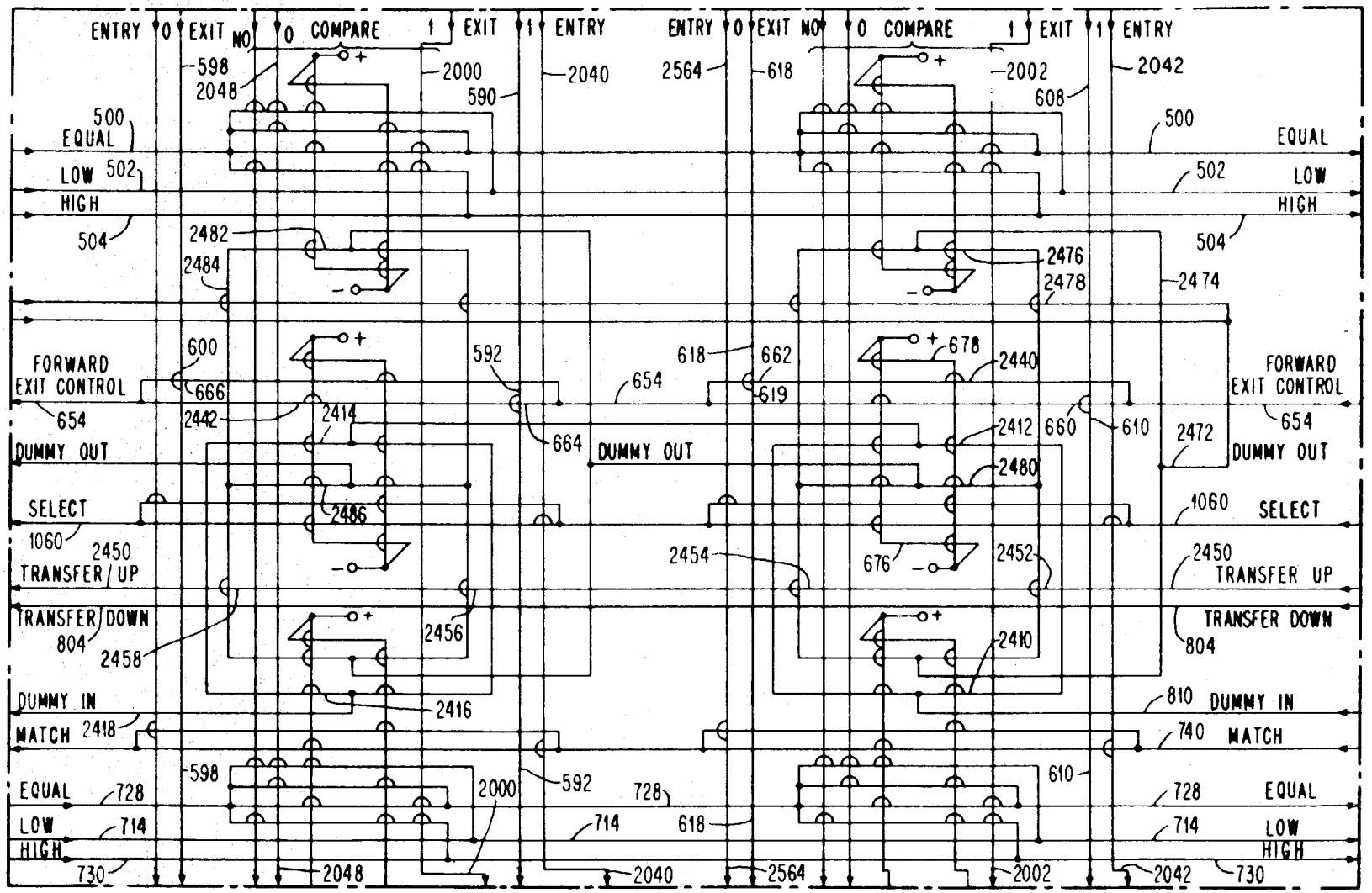
Figure 4F:
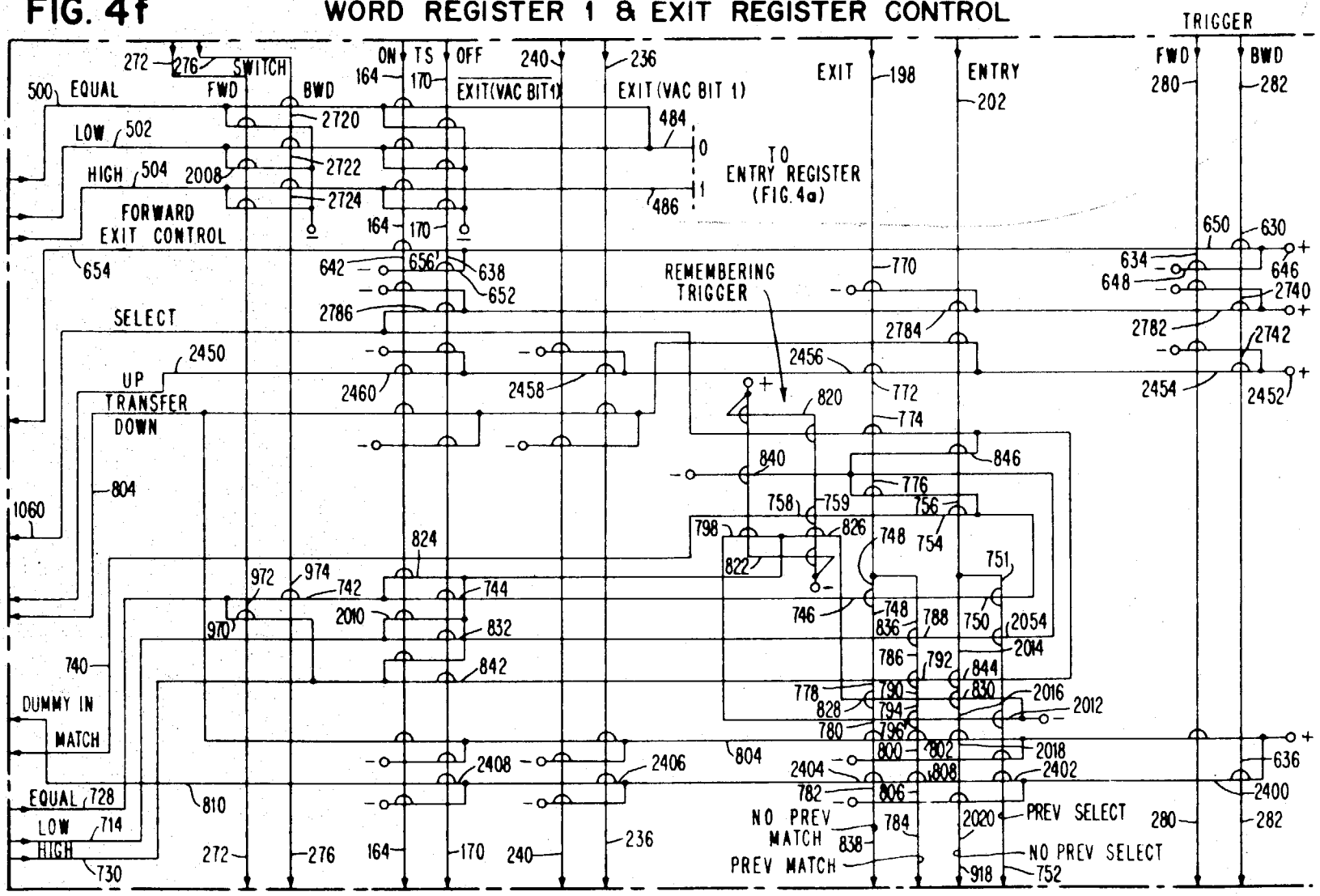
Figure 4G:
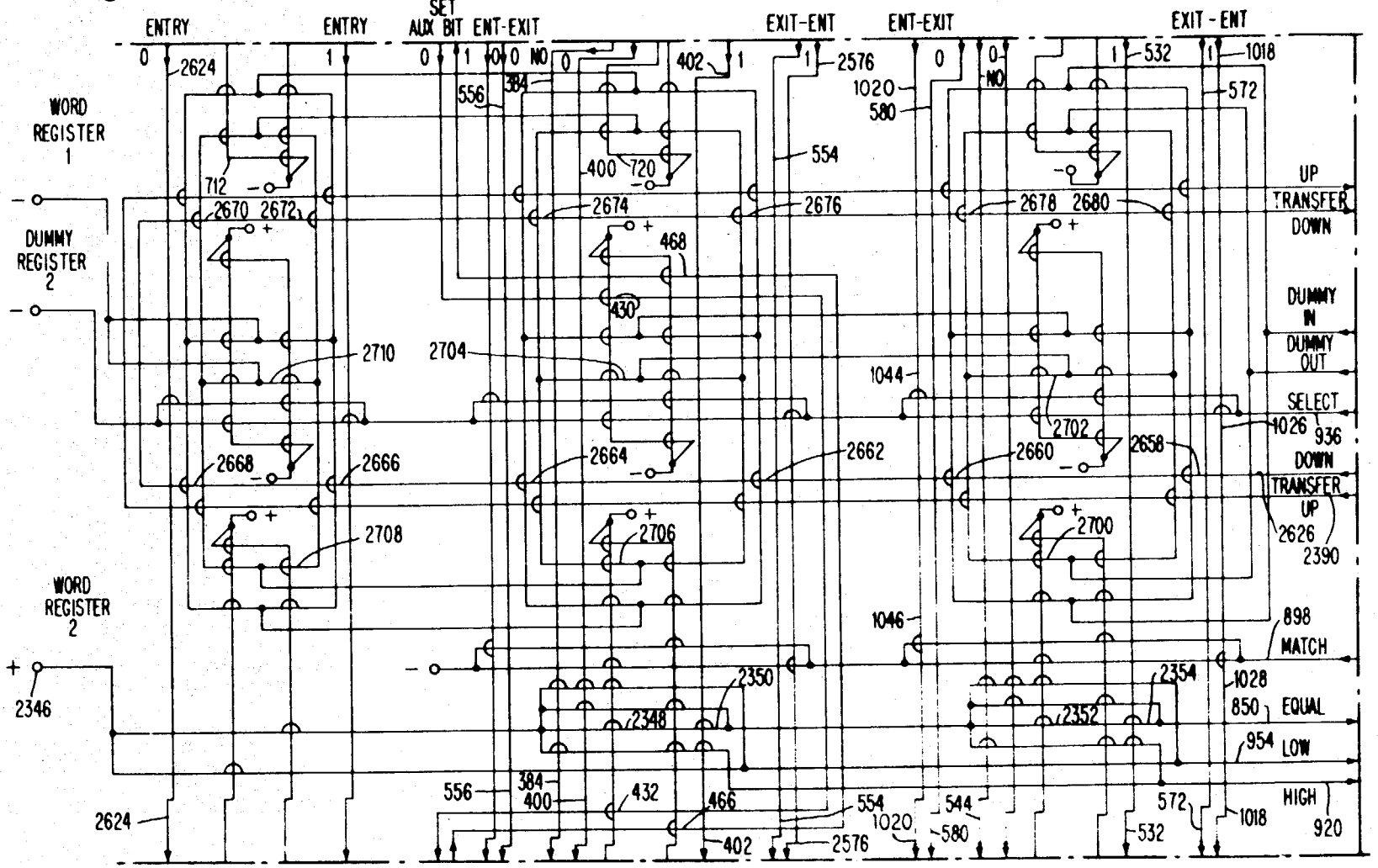
Figure 4H:
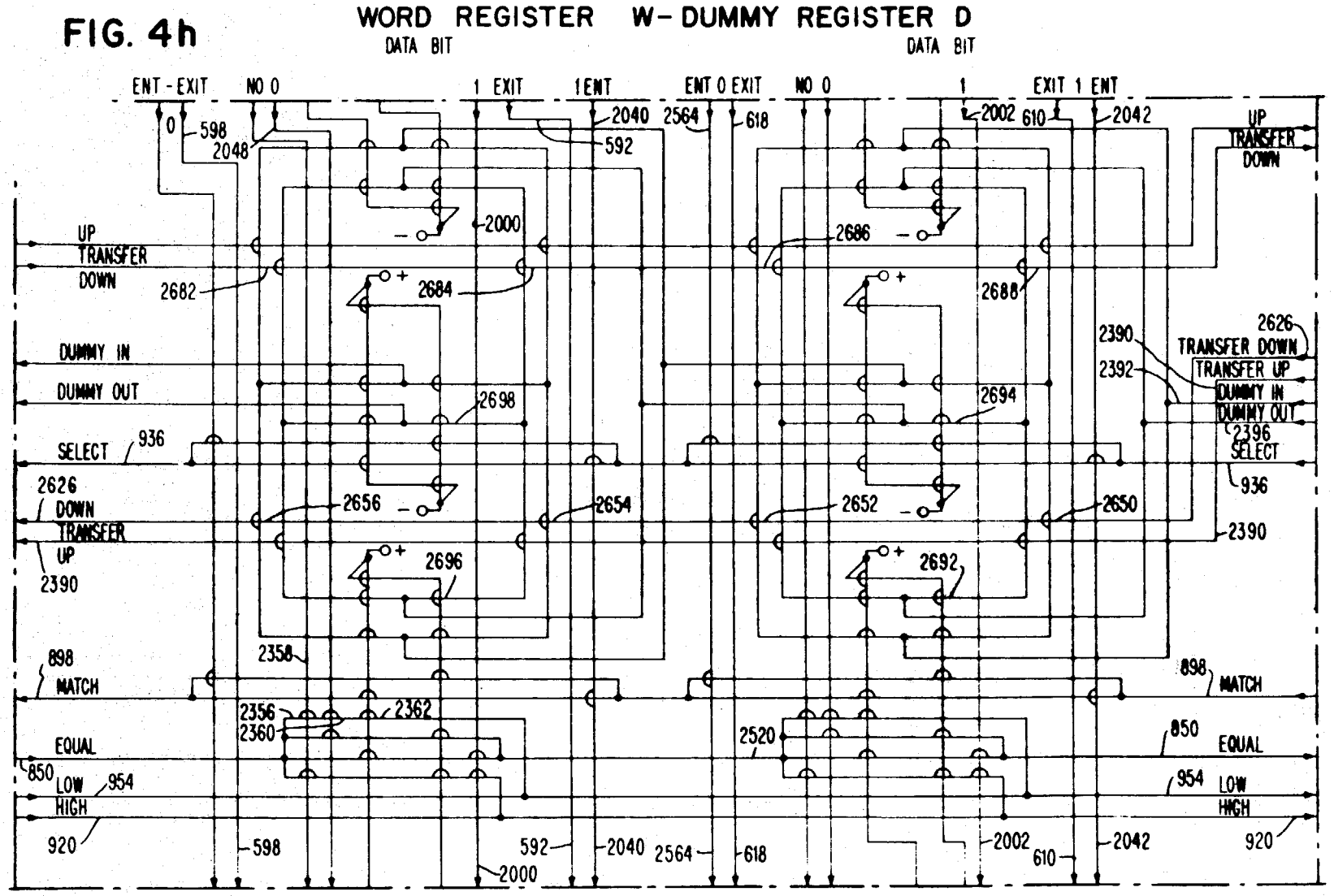
Figure 4I:
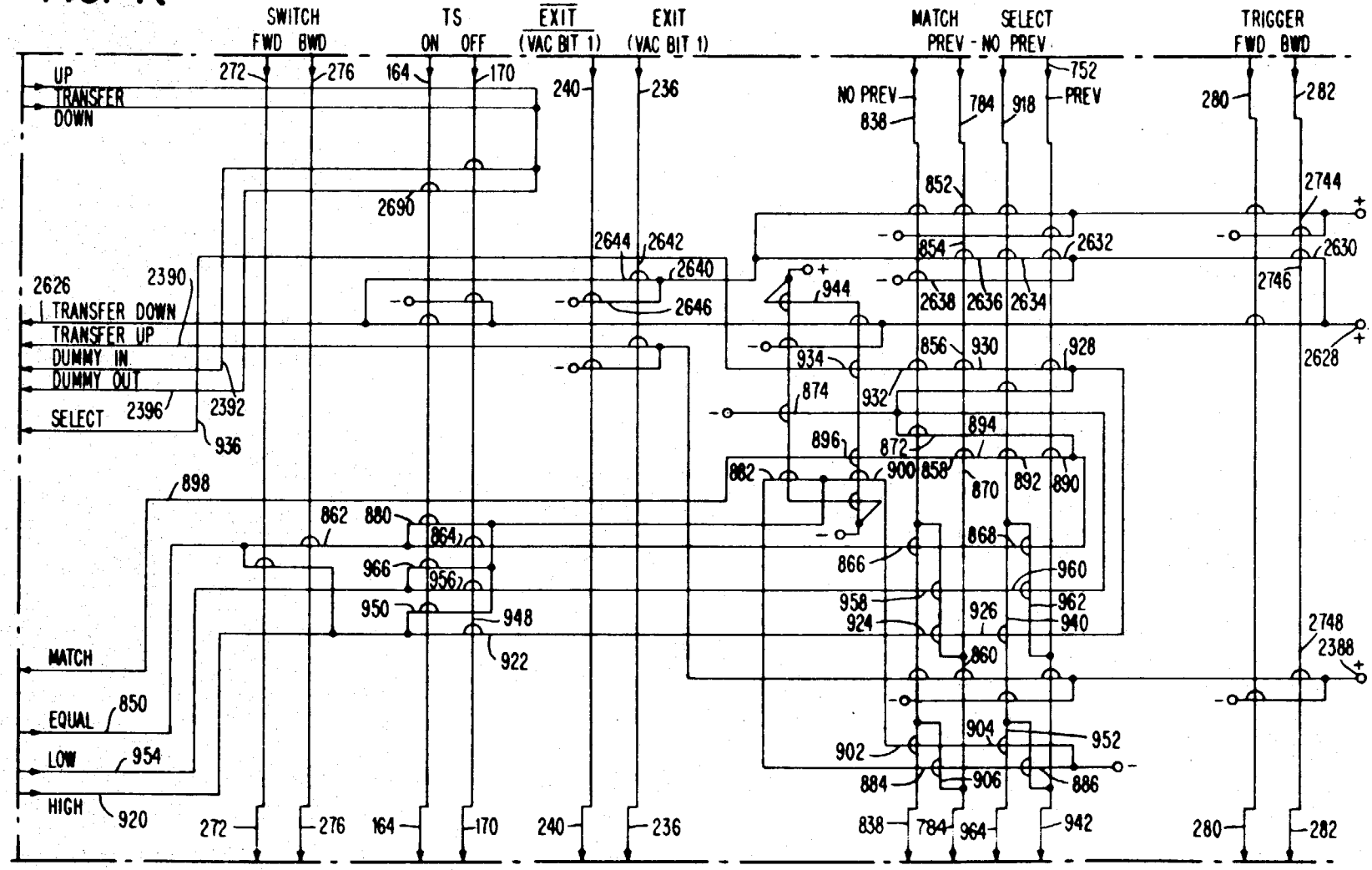
Figure 4K:
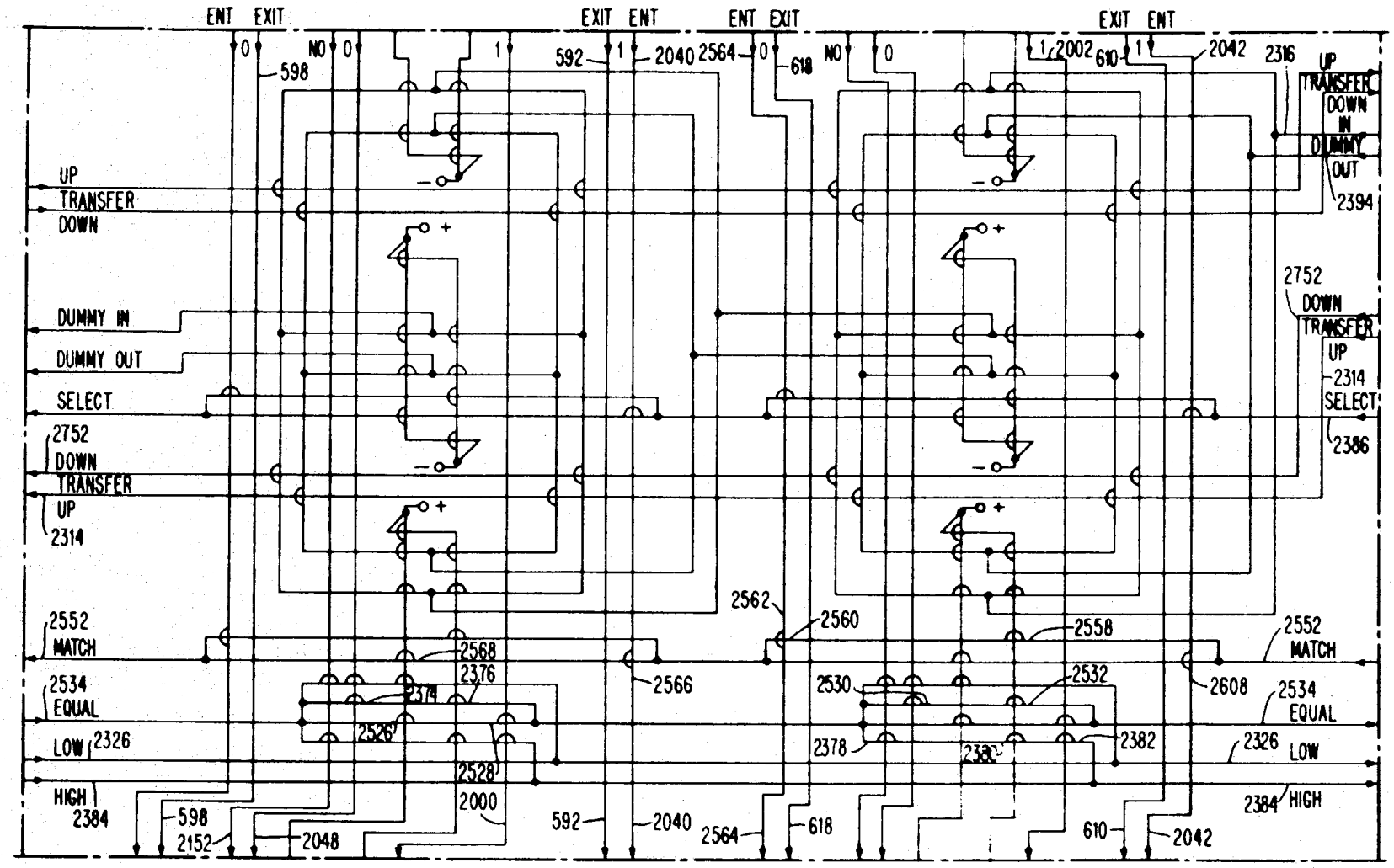
Figure 4F:
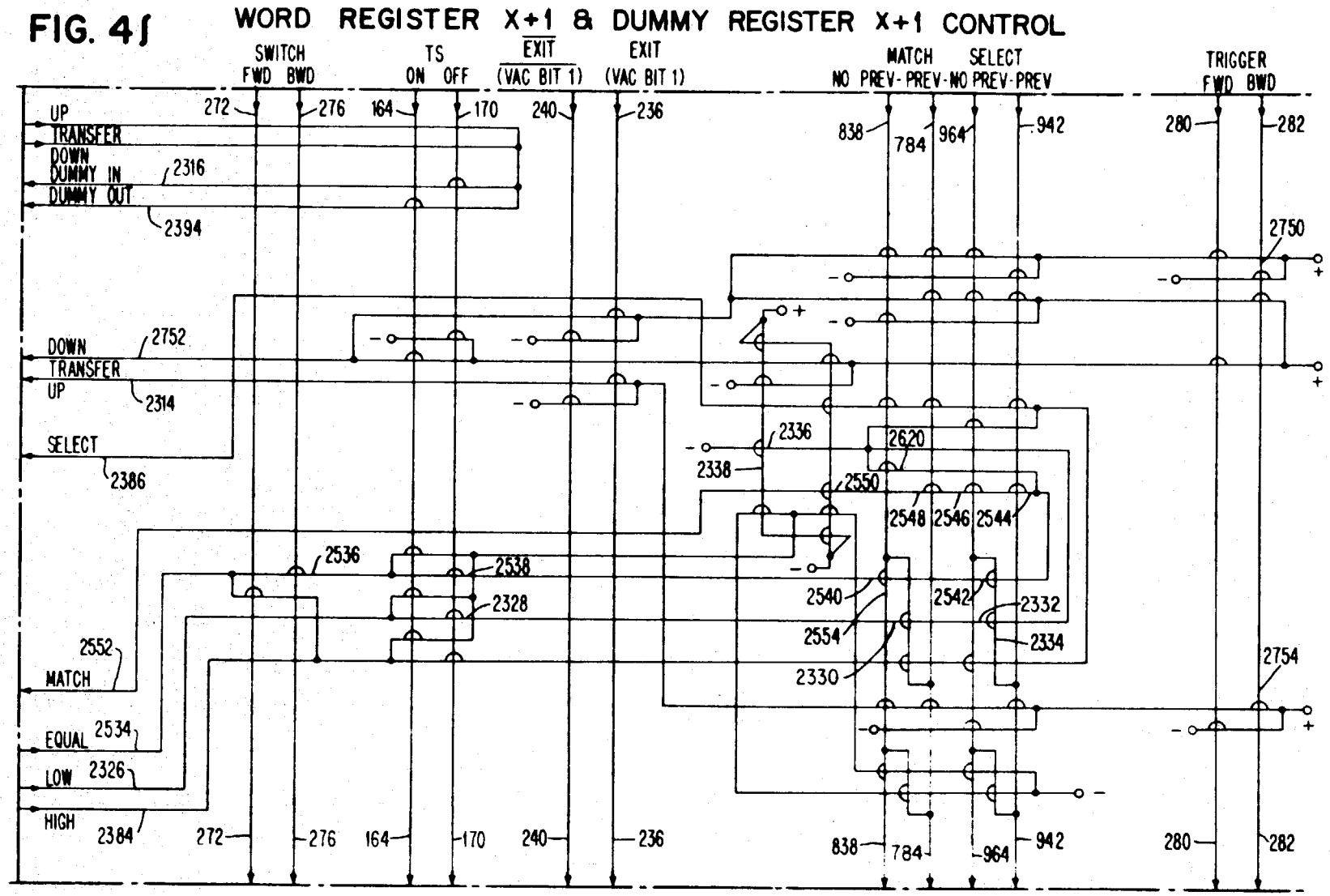
Figure 4M:
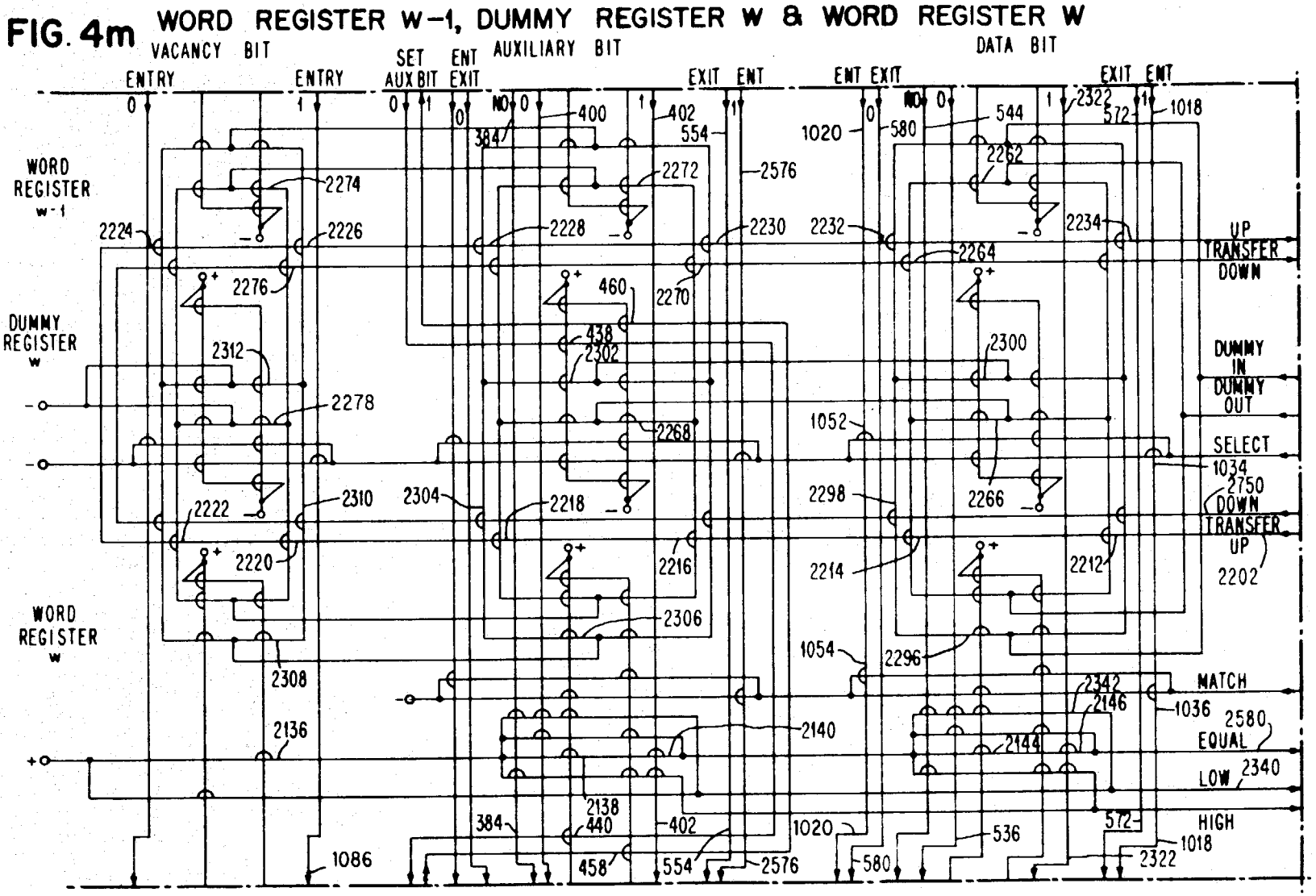
Figure 4N:
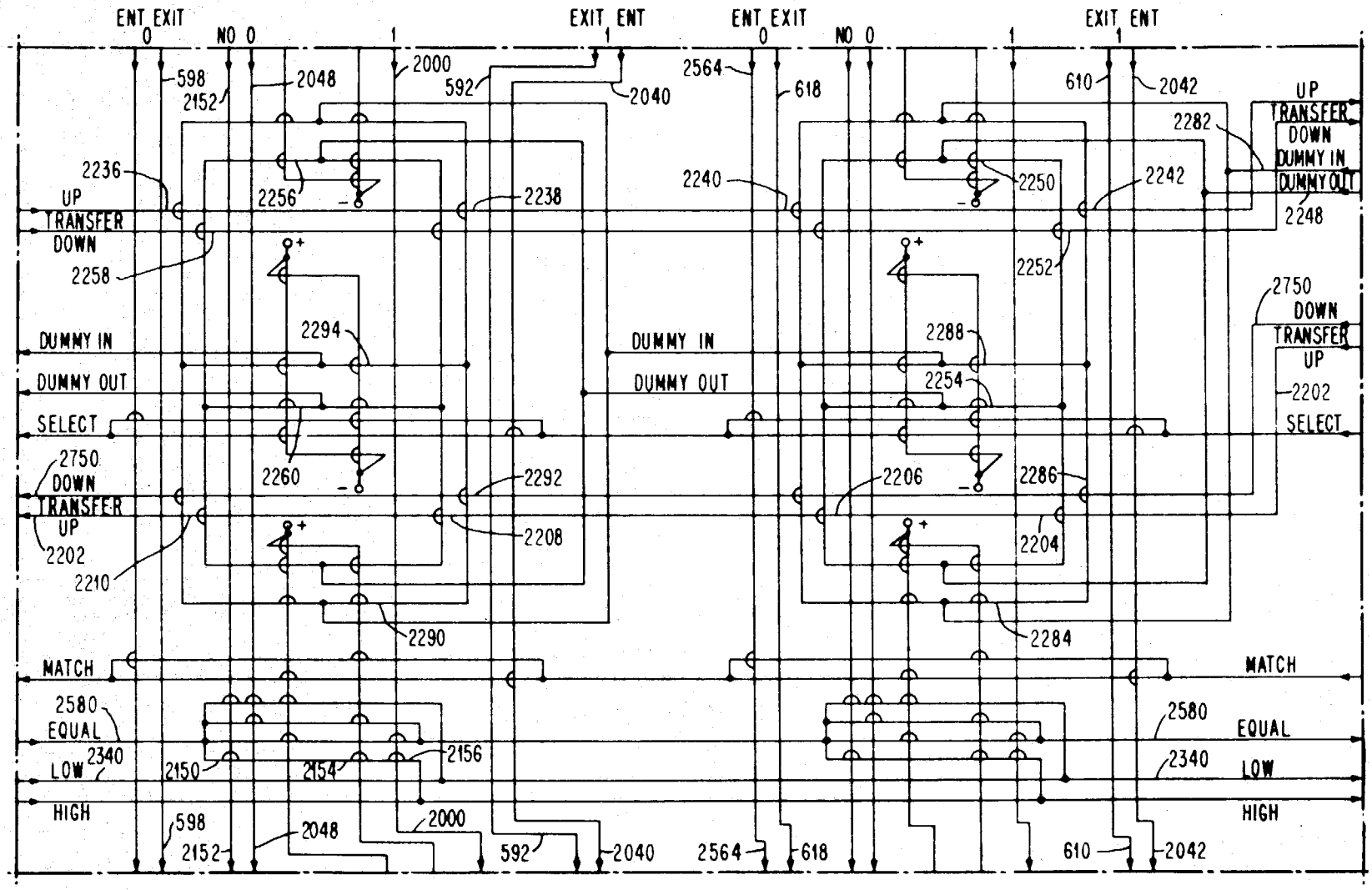
Figure 40:
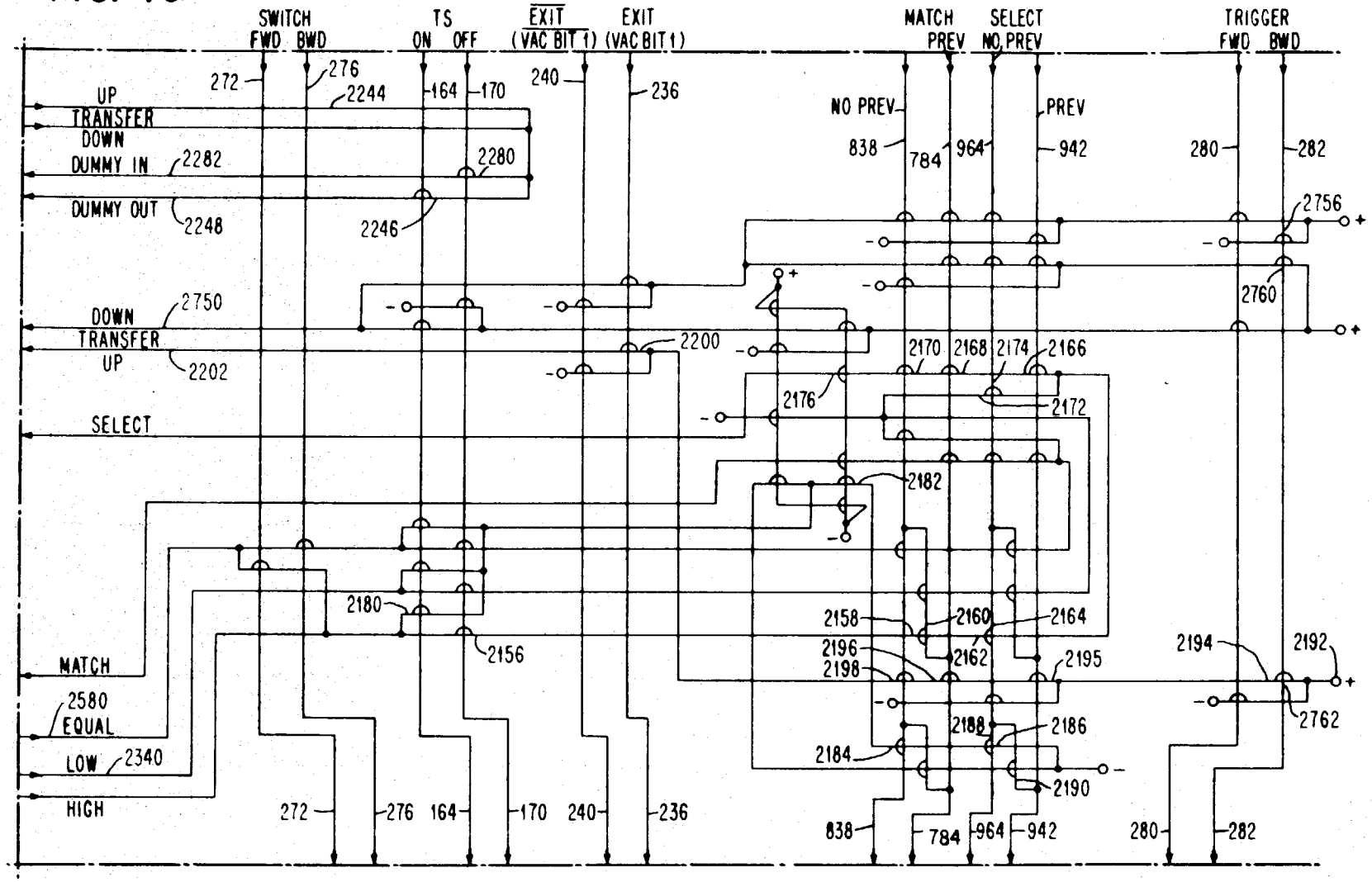
Figure 4Q:
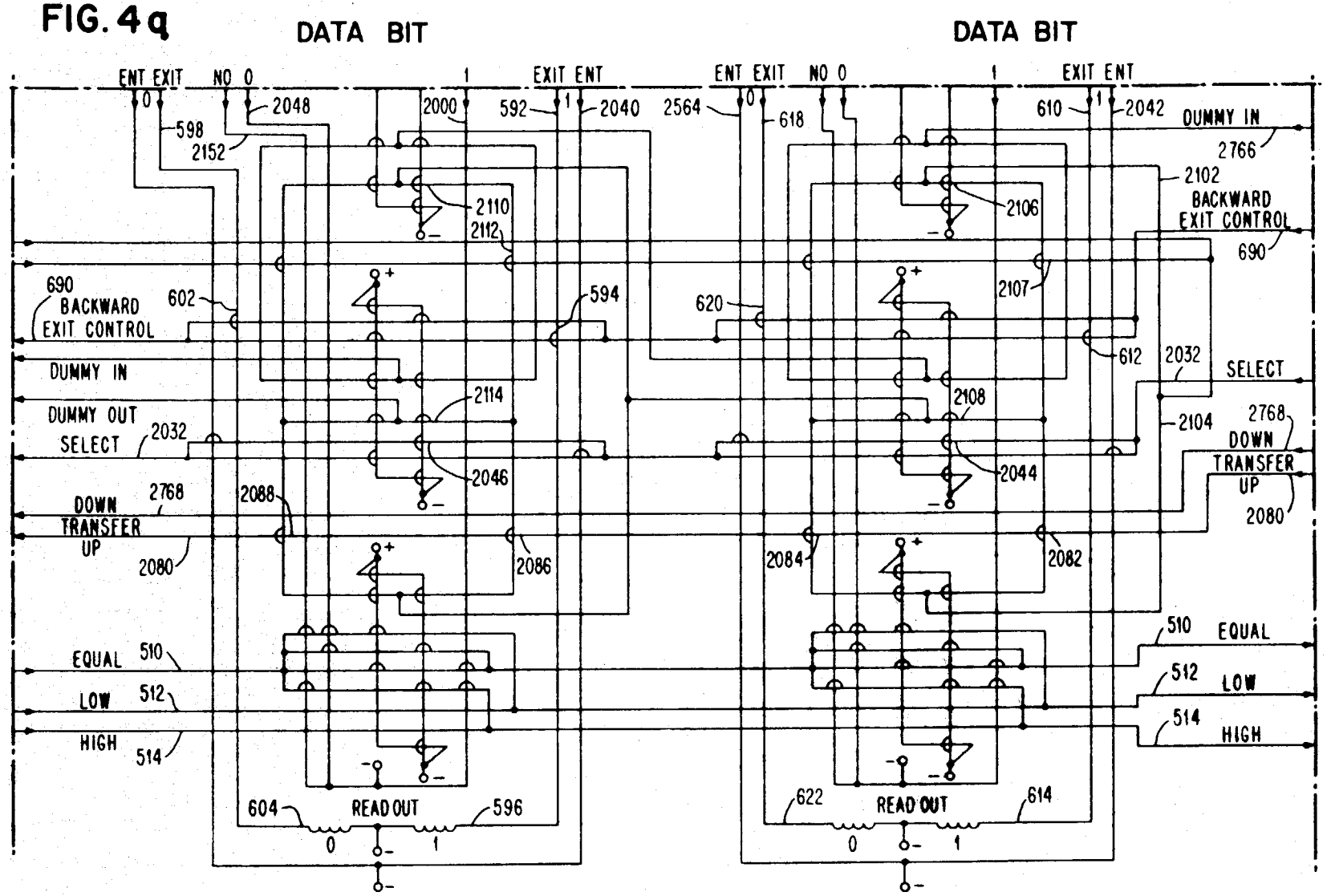
Figure 4R:
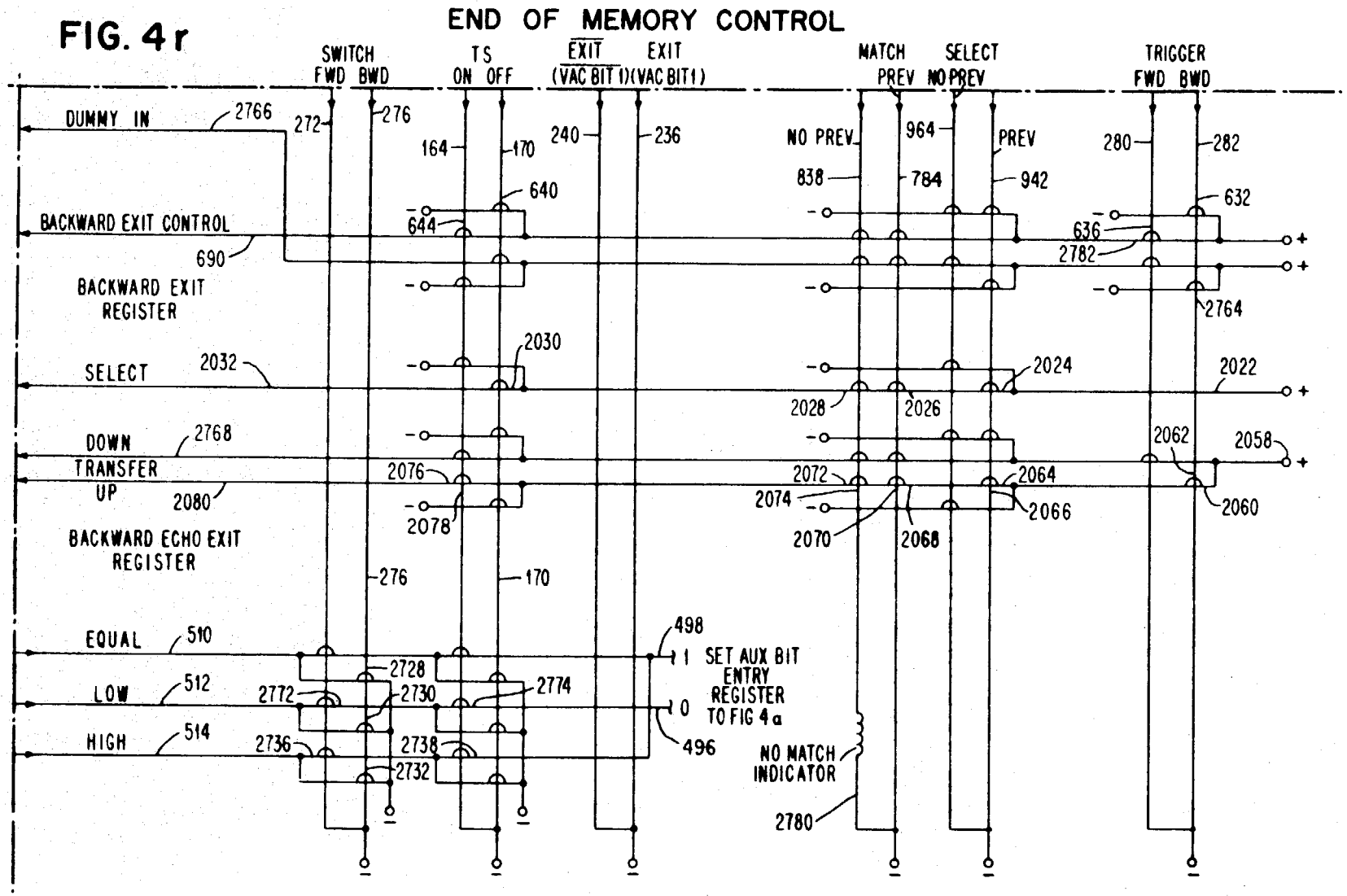

FIGURES 4a through 4r taken together comprise a schematic diagram of the circuits of the associative memory system.

Figures 5A, 5B:
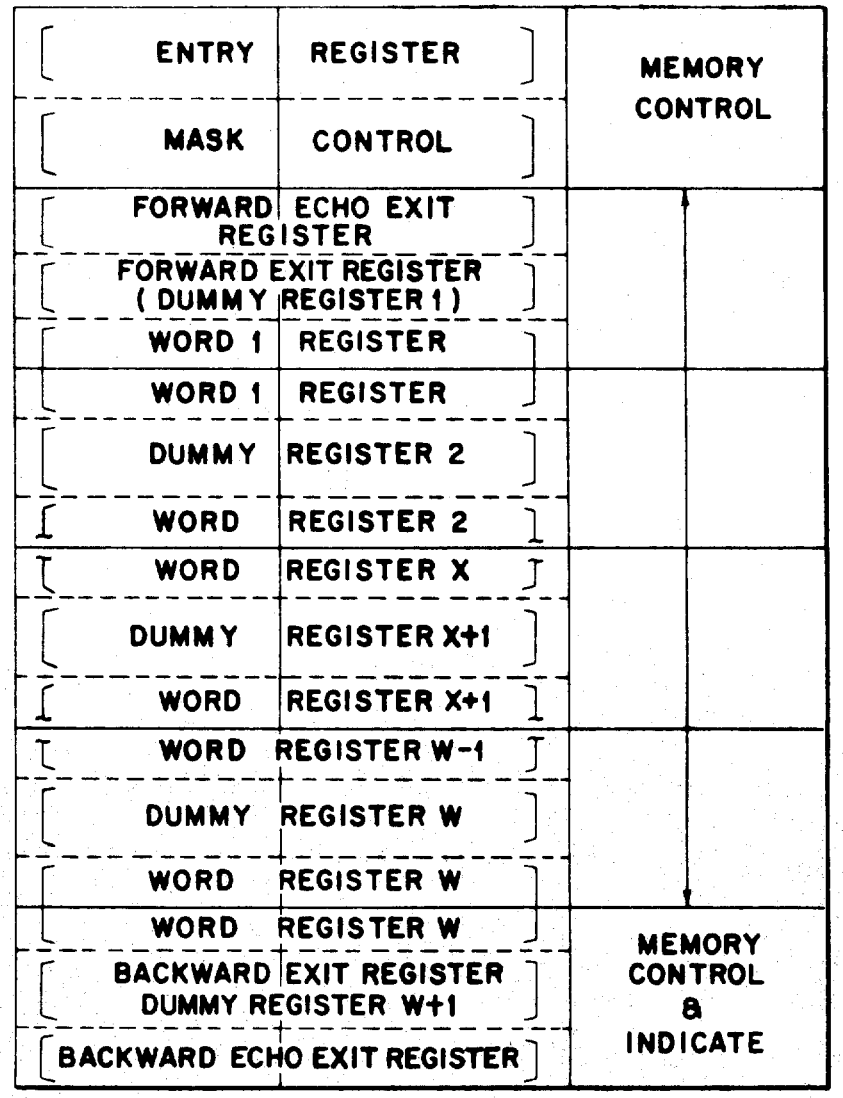

FIGURE 5a indicates how FIGURES 4a through 4r are arranged to provide a composite circuit diagram.

FIGURE 5b shows the drawings of FIGURES 4a through 4r arranged according to FIGURE 5a and also shows the location of various groups of circuits.

Figure 1:
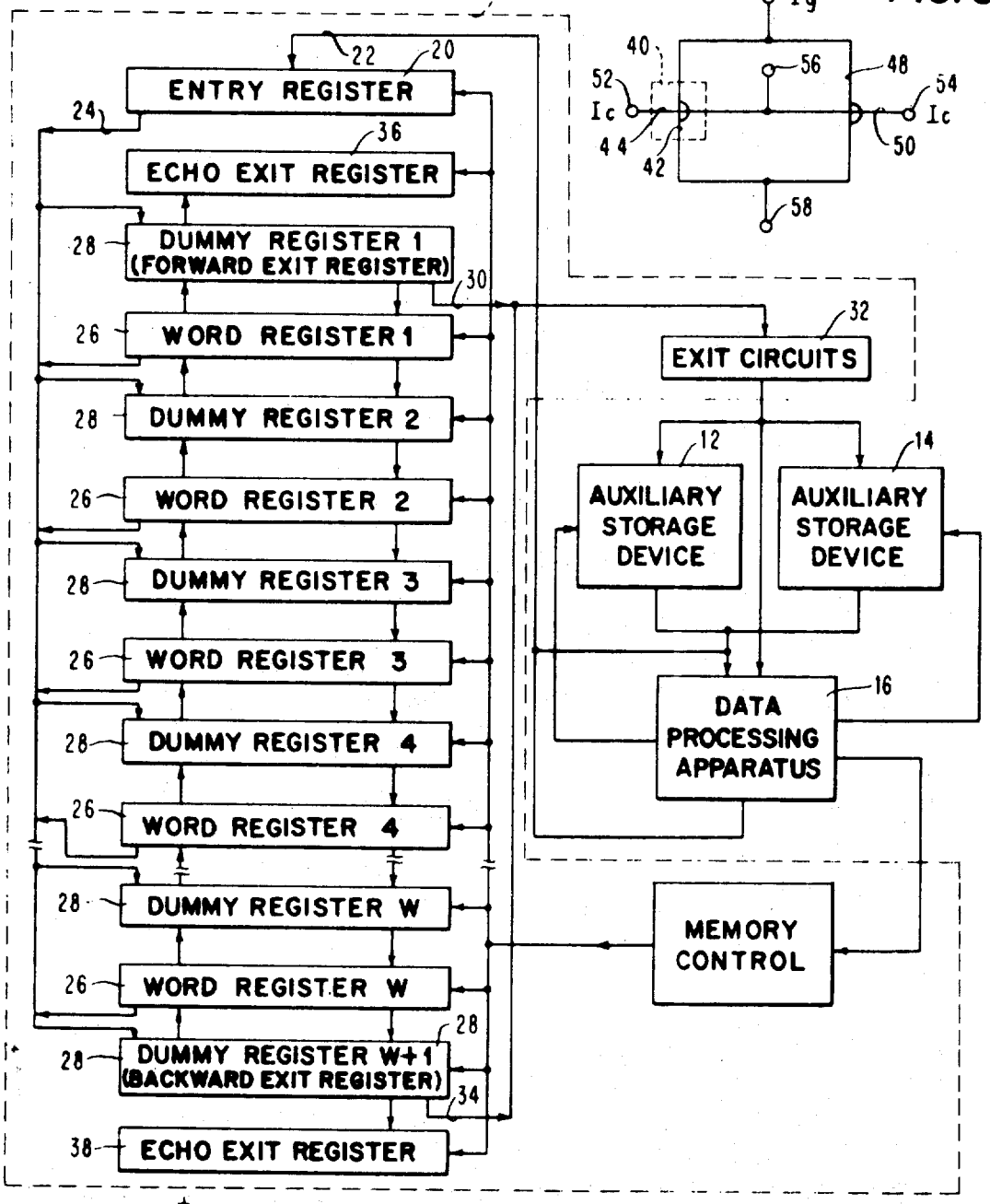
FIGURE 1 is a block diagram of a data processing system including a block diagram of the associative memory system.

In FIGURE 1 there is shown the memory system 10 and associated equipment for the utilization of the memory device which may comprise an auxiliary storage device 12, an auxiliary storage device 14, data processing apparatus 16 and interconnections such that communication may be had between the data processing apparatus and auxiliary storage devices or the memory system. By programmed control, the data processing apparatus may direct the memory system and auxiliary storage devices so that operations are performed to utilize the features of the memory system 10. The memory system 10 comprises an Entry register 20, in which a word is temporarily stored in preparation for its entry into one of the word registers 26, labeled 1 through W. The Entry register has an input circuit 22 and an output circuit 24. Dummy registers 28 labeled 1 and W+1 are arranged at the top and bottom of the column of registers and Dummy registers 2 through W are placed intermediate the Word registers 26. A bus between the Entry register 20 and the Exit register 28 links dummy registers and word registers for the transfer of data signals therebetween. Dummy register 1 also serves as the Forward Exit register and has an output bus 30 connected to Exit circuits 32. Starting with the memory empty, the first word to be entered is placed in the Entry register 20 and, in a forward sorting operation to be discussed at this time, the word is taken from the Entry register and placed into Dummy register W+1 via Exit bus 24. The second word is entered in the Entry register and the first word is moved into Word register W and then the second word is either entered in the Dummy register W immediately above Word register W if the associative portion of the second word entered has a value less than the associative portion of the word in the Word register W, or the second word is entered in Dummy register W+1 if the second word has a value equal to or greater than the first word which is now stored in Word register W, the latter being moved up one register into Dummy register W. The third word to be entered has its associative region compared against like regions of the first and second words and enters the dummy register just above the first word whose associative region is greater than its own with all words above moving up one position to provide space for the new word. If the third word to be entered has data in the associative region greater than data in like regions in words previously stored or equal to a like region in the bottom word, the third word is entered in Dummy register W+1, and the other words move up to provide space. The object is to have all words in memory in sequence and finally located in word registers for each step in the merging operation. The fact that the residue remains in the dummy registers is irrelevant to the operation and therefore these registers are available for receiving words. The rule observed is that an incoming word first enters a selected one of the dummy registers, all of which are available at the time, and then those words of lower value are moved into adjacent dummy registers temporarily for subsequent entry into adjacent word registers. Thus, in the forward mode of operation all of the words in memory are stored with the data in the associative regions in ascending sequence from top to bottom of memory. When all of the word registers are occupied and another word is entered in the Entry register 20, either the word in Word register 1 is made available at the Forward Exit register 28, or the new word is placed in the Forward Exit register. To accomplish this, the associative region of the word to be entered is compared with like regions of the words in memory, and if equal to or greater than the like region of the word in Word register 1, the new word is entered in the proper dummy register to place the word in sequence. All of the words in the registers above and including the location of insertion are moved up on location, and the word in Word register 1 is transferred to the Exit circuit 32 via the Forward Exit register 28. If the contents of the associative region of the word to be entered is less than the contents of like portions of the words in memory, and a word has not been previously transferred to the Exit circuits, the word itself passes from the Entry register into the Exit circuits 32 via Dummy register 1. The replica or echo of the last word placed in the Exit circuits is always retained in the Echo Exit register 36 in the forward mode of operation. If the associative data has a value less than that of the word previously transferred from memory as determined by the image remaining in the Exit register, a new sequence of groups of words is started to keep the words leaving the memory via the Exit circuits 32 in sequence. This is accomplished by entering the current word in Dummy register W+1 as the beginning of a new group. As additional words are entered in memory the new group gradually moves upward to and occupies all locations of memory. Naturally, if the capacity of the memory system is such that it can accommodate all of the words to be stored, all words are placed in registers without any overflow.

The operation of the memory system is best understood with reference to FIGURE 1 and an example of operation illustrated by the chart of FIGURE 2, which shows in the row labeled ENTRY a series of numbers to be entered in memory via the Entry register 20. Two columns are shown for each number in the Entry register. The first column shows the location of the number with the timing signal OFF, called the A part of a cycle during which time data is transferred from the computer 16 or auxiliary storage units 12 and 14 to the Entry register 20, the contents of the dummy registers are moved to the word registers, one of the Exit registers transfers data to the Exit circuits and to the Echo Exit register if each is necessary to the operation. The second column shows the location of the number with the timing signal ON, called the B part of a cycle, during which time either an Entry register to dummy register operation, a word register transfer to a dummy register operation, or a word register to an Exit register operation is performed. The bar over the numbers signifies action during the part of a cycle concerned with, either when the timing signal is OFF (A part) or when the timing signal is ON (B part). A bar is placed under the number to signify that the no movement of the number takes place. Those numbers having neither a bar above nor a bar below are those which have been nondestructively read out leaving a shadow or image.

While the chart of FIGURE 2 is shown in terms of decimal numbers, it will be understood that in the embodiment of the invention, the numbers are processed in the pure binary notation which may express any code including binary coded decimal, alphabetic or symbolic information in binary terms. The number 29, for example, could appear as 011101 in binary or 0010 1001 in binary coded decimal if six or eight orders respectively of the associative region are assumed with the lowest order appearing at the right end of the series. Furthermore, for the purpose of illustration, the associative region is taken to contain the numbers used in the chart although the associative region may be the entire word or portion of a word, the remainder of which may comprise numeric, alphabetic or symbolic information coded in binary form.

Thus, it may be seen in FIGURE 2 that the number 29 is placed in the Entry register during the A portion of cycle 1. During the B portion of cycle 1, the number 29 is transferred to Dummy register W+1 (where W equals 5 as shown in FIGURE 2). During the A part of cycle 2, the number 1 is placed in the Entry register and the number 29 is transferred from Dummy register W+1 into Word register W. During the B part of the second cycle, the 1 is transferred into Dummy register W, and the number 29 remains in Word register 5. Since the number 1 in the Entry register was less than the number 29, it will be observed that the number 1 was placed nearer the top of the column of registers. During the A portion of cycle 3 the number 44 is placed in the Entry register, the number 1 is transferred from Dummy register 5 to Word register 4, and the number 29 remains in Word register 5, the image being in Dummy register 6. During the B portion of cycle 3, the number 44 is moved into Dummy register 6 replacing the image 29, the number 29 is moved into Dummy register 5 and the number 1 is moved from Word register 4 into Dummy register 4. The first three cycles have illustrated the cases where the number in the Entry register was less than the numbers stored in memory and the other instance where the word in the Entry register was greater than those stored in memory. The next example of cycle 4 concerns merging a number among those previously stored.

In the A part of cycle 4, the number 10 is placed in the Entry register, 1 is moved to Word register 3, 29 is moved to Word register 4, and 44 is moved to Word register 5, thus making available the vacated dummy registers. During the B part of cycle 4, the number 10 is inserted in Dummy register 4 and the number 1 is moved from Word register 3 into Dummy register 3. In this manner, a word is merged with those in memory.

During cycle 5, the number 11 is placed in the Entry register, and the number 10 and the number 1 are moved into Word registers 3 and 2 respectively. Then the number 11 is placed in Dummy register 4 with lower valued numbers moving up into dummy registers.

During cycle 6, the number 51 is placed in the Entry register and the numbers 11, 10 and 1 are moved into Word registers 3, 2 and 1 respectively. Then, the number 51 is placed in Dummy register 6 and each of the numbers in word registers are moved up to the next dummy register. The memory is now fully loaded.

During cycle 7, the number 39 is placed in the Entry register and all words in dummy registers except the number 1 are moved up to word registers. The number 1 is moved from the Exit register onto the output bus 30 and is also entered in the Echo Exit register 36. Then, the number 39 is entered in Dummy register 4 and all numbers above in word registers are transferred to dummy registers. The number 1 would pass to an auxiliary storage device 12 or 14 via Exit circuits 32.

During cycle 8, the number 36 is merged and the number 10 leaves memory and is stored following the number 1. Note that the image of the number 10 is now in the Echo Exit register.

During cycle 9, the number 12, being larger than 11, is merged and the number 11 is passed via the Exit circuits to the storage device where the 1 and 10 are stored. It is to be noted that the number 12 passes directly to the Forward Exit register (Dummy register 1). During cycle 10, the number 50 is merged and the number 12 placed in the Exit register during cycle 9 now follows the number 11 to the auxiliary storage device.

Cycle 11 is an instance where a new group is formed because the incoming number is less than the number in the Echo Exit register and all of the other numbers in memory. Specifically, the number 23 is placed in the Entry register during the A part of cycle 11. The comparison indicates that 23 is less than 29 in the Echo Exit register and less than all of the numbers in memory. If the number 23 were passed to the Exit circuits it would be out of sequence so a new group of numbers is started at the bottom of memory. As stated previously, the new group of numbers will each be provided with an extra bit, designated an auxiliary bit, higher than the highest ordered position of the memory locations which will make the new group appear as higher ordered numbers with respect to the first group although, in reality, they are not. Further, an incoming number may be merged with the new group if appropriate to do so as circuits are arranged to disregard the auxiliary bits as among the numbers in the new group and the one to be merged therewith. In cycle 11, then, the number 23 is placed in the Entry register, the numbers 50, 44, 39 and 36 move upwardly into word registers and number 29 moves to the Exit circuits and Echo Exit register during the A part of the cycle. During the B part of cycle 11, the number 23 enters Dummy register 6 and all of the other numbers move upwardly from word registers into dummy registers.

In cycle 12, the number 55 is compared with all of the stored numbers and the contents of Echo Exit register and as a result is merged at the end of the first group—that is, between 51 and 23. There is no chance that the number 51 be entered after the number 23 because the auxiliary bit is of higher order than the most significant order of the memory locations. The number 36 is sent to the Exit circuits and Echo Exit register, and finally the numbers are adjusted by moving the numbers less than 55 upwardly into dummy registers.

In the A part of cycle 13, the number 22 is placed in the Entry register, the numbers 55, 51, 50 and 44 are moved upwardly into word registers and the number 39 is sent to the Exit circuits and the Echo Exit register. During the B part of cycle 13, the number 22 is inserted in Dummy register 5 as the lowest number in the new group and the numbers 55, 50, 50 and 44 are moved upwardly into dummy registers.

In the A part of cycle 14, the number 58 is placed in the Entry register, the numbers 22, 55, 51 and 50 are moved upwardly into word registers and the number 44 is dispatched to the Exit circuits and Echo Exit register. During the B part of cycle 14, the number 58 is inserted in Dummy register 4 (at the end of the first group in sequence) and the numbers 55, 51 and 50 are moved upwardly into dummy registers. Note that the numbers 23 and 22 are undisturbed.

In the A part of cycle 15, the number 42 is placed in the Entry register, the numbers 58, 55 and 51 are moved up one position to word registers and the number 50 is sent to the Exit circuits and the Echo Exit register. In keeping with the pattern prescribed, the number 42 merges with the second or new group by entering Dummy register 6 during the B part of the cycle. Further, the numbers 23, 22, 58, 55 and 51 move up one position into dummy registers.

In the A part of cycle 16, the number 64 is placed in the Entry register, the numbers 42, 23, 22, 58 and 55 are moved upwardly in word registers and the number 51 is dispatched to the Exit circuits and the Echo Exit register. During the B part of cycle 16, the number 64 is merged by placing it in Dummy register 3 and the numbers 58 and 55 are moved upwardly into dummy registers. Note especially that the number 64 is greater than the highest number in each of the group but is placed in the first.

In the A part of cycle 17, the number 82 is placed in the Entry register, the numbers 64 and 58 are moved up one position into word registers, and the number 55 is sent to the Exit circuits and the Echo Exit register. During the B part of cycle 17, the number 82 is inserted in Dummy register 3, and the numbers 64 and 58 are moved up one position into dummy registers.

During the A part of cycle 18, the number 25 is placed in the Entry register, the numbers 82 and 64 are moved upwardly into word registers and the number 58 is directed to the Exit circuits and the Echo Exit register. During the B part of cycle 18, the number 25 is merged between the numbers 42 and 23 by placing it in Dummy register 5. The numbers 23, 22, 82 and 64 are moved up one position into dummy registers.

During the A part of cycle 19, the number 98 is entered in the Entry register, the numbers 25, 23, 22 and 82 are moved up one position into word registers and the number 64 is dispatched to the Exit circuits and the Echo Exit register. During the B part of cycle 19, the number 98 is entered in Dummy register 2 (the end of the first group) and the number 82 is moved into the Forward Exit register (Dummy register 1).

During the A part of cycle 20, the number 31 is placed in the Entry register, the number 98 is moved into Word register 1 and the number 82 is sent to the Exit circuits and the Echo Exit register. During the B part of cycle 20, the number 31 is placed in Dummy register 5, and the numbers 25, 23, 22 and 98 are moved upwardly into dummy registers.

During the A part of cycle 21, the number 38 is placed in the Entry register, the numbers 31, 25, 23 and 22 are moved up one location into word registers and the number 98 is moved to the Exit circuits and the Echo Exit register. During the B part of cycle 21, the number 38 is entered in Dummy Register 5 and the numbers 31, 25, 23 and 22 are moved up one position into adjacent dummy registers. At this time, the new group has completely replaced the first group and the auxiliary bits are deleted because their significance has been lost. The fact that a new group of words has filled memory is sensed by the auxiliary bit position of the Exit register containing a 1. All of the auxiliary bits in memory are changed to 0, and then it is possible to use the auxiliary bit position to designate still another group.

The example above, although not specific to the circuits employed, illustrates the operation of the system when the quantity of numbers to be placed in sequence exceeds the capacity of memory. Further, one way of retrieving data from memory is described including a showing that the numbers are retrieved in sequence. The other way of retrieving data by specifying an associative region or all of a word is described later.

To complete the sorting operation described above, assume that groups of numbers passed through the Exit circuits 32 are stored alternately in auxiliary storage devices 12 and 14 and then are returned via bus 22 to the Entry register 20. It is apparent that the blocks of numbers in sequence will become larger when they are returned via bus 22 to the Entry Register. If it is assumed that the outgoing groups are being put on magnetic tapes, then at the end of the forward operation as described above, the groups will be in ascending order on at least two tapes (roughly half on each) with the tapes wound so that the numbers with the larger magnitudes are on the outside layers of tape in each case. By reading the tapes in the direction opposite from the direction of the writing operation and using the backward sorting feature of the memory system, no time is lost by having to rewind the tapes. If the memory is in the Backward mode of operation, the backward entry operation is the same as the forward operation except that if the incoming number is equal to a number in memory, the incoming word enters the register just above the register in which the equal number is stored so that groups of equal numbers are preserved in the same order as they arrive. If no numbers are found in memory equal to the incoming number, the number enters the register just above the register holding the number greater in value than the incoming word. When the memory becomes full, the Backward operation changes to a greater degree. Upon entry of another number, the largest number is transferred to the Backward Exit register. This largest number is either the incoming number or the number occupying the bottom word register. If the number is in the bottom word register, the incoming word enters the uppermost dummy register having a number equal to or greater than the incoming number. The contents of the register and all registers below are shifted downwardly one register to make room for the incoming word and to fill up the register whose contents are transferred to the Backward Exit register. Images of the number leaving memory are retained in the Backward Echo Exit register and comparison is effected in the manner described in the Forward mode of operation. As the memory fills in the Backward mode, the auxiliary bit of the incoming numbers is set to 1. When the memory is full and the incoming numbers are equal to or lower than the number in the Backward Echo Exit register, the incoming number is merged in memory with its auxiliary bit set to 1. If the incoming number is larger than the number in the Backward Echo Exit register, the incoming word falls outside the sequence in memory so its auxiliary bit is set to 0 and it starts a new group at the top dummy register. Further incoming numbers are merged with the new group. When the new group takes over memory, an incoming number causes numbers of the new group to leave memory, in which case the auxiliary bit in the Exit register is sensed as being a 0 to indicate the beginning of a still newer group and all of the auxiliary bits are changed to 1.

In the preferred embodiment of the invention, thin film, single crossover cryogenic switches are used because such elements provide high density and low cost apparatus. Briefly, the switch comprises a substrate to support the films, a gate film, an insulating layer and a control film. The gate film is the switched element and is either superconductive or resistive depending upon the magnitude of the current in the control film which is the switching element. If the current in the control film exceeds a critical value, the gate is resistive. For a value of control current less than the critical value, the gate is superconductive. Appropriate interconnecting films connect the cryotrons in logical configurations. The control film and interconnecting films are superconductive throughout the operation of the apparatus and, therefore, offer no resistance to current supplied thereto.

Figure 3A:
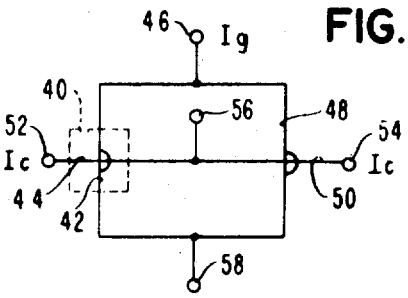
FIGURE 3a is schematic diagrams of a basic cryogenic circuit.

In FIGURE 3a there is shown a symbol for thin-film, single crossover cryotron 40. The gate conductor 42 is identified by a straight line having the diameter of a semicircle superimposed on the straight line. The control conductor 44 is identified by a straight line at right angles to the gate conductor and bisecting the diameter of the semicircle. The symbol does not indicate the direction of current flow through a conductor since the actual polarity is irrelevant to the cryotron per se, the cryotron being sensitive only to the magnitude of control currents which are usually either substantially zero or somewhat more than the critical current value. It is assumed that all cryotrons illustrated herein operate with essentially identical critical-current magnitudes, and thus each current source need only supply the same magnitude of current. FIGURE 3a shows a current source 46 which may provide gate current $I_g$ and a pair of single crossing cryotrons having their gate conductors 42 and 48 connected in parallel and their control conductors 44 and 50 connected so that control current $I_c$ may be supplied to each by way of terminals 52, 54 and 56. Assume that the right-hand gate 48 is superconductive and the left-hand gate 42 is resistive because of applied $I_c$ flowing from terminal 52 to 56 so that gate current $I_g$ flows through the right-hand gate conductor 48. With this condition established, control current may be removed from the left-hand control conductor 44, and although its gate conductor 42 becomes superconductive, the current $I_g$ will not divide between the parallel gate conductors but is maintained in the right-hand path including gate 48. Further, if control current to both control conductors 44 and 50 is supplied, both gate conductors 42 and 48 become resistive and current $I_g$ divides between the two paths so that neither one nor the other current is above the critical value. Additionally, if one gate is superconducting and the other is superconductive and then the current $I_g$ is removed, a circulating or persistent current flows in the parallel circuit composed of the gate conductors, but no current flows in either the input line 46 or the output line 58. Because the output current from such a parallel circuit derived from line 58 is used to perform some operation in circuits fed thereby, one superconductive path for the input current $I_g$ is always maintained for each current source.

Consider now that the right-hand gate conductor 48 is superconducting and control current is removed from the left-cryotron 40. The total current $I_g$ continues to flow in the right-hand gate 48 in the absence of control current supplied to the right hand control conductor 50. Therefore, to switch the current from the right-hand gate 48 to the left-hand gate 42, it is not sufficient to remove the current from the left-hand control conductor 44, but additionally control current must be supplied to the right-hand control conductor 50 to thereby render its gate 48 resistive and direct $I_g$ into the other path through gate 42.

From what has been written above it is apparent that the gate current source must have a superconductive path provided and that complementary control must be maintained over associated gate circuits.

Figure 3B:
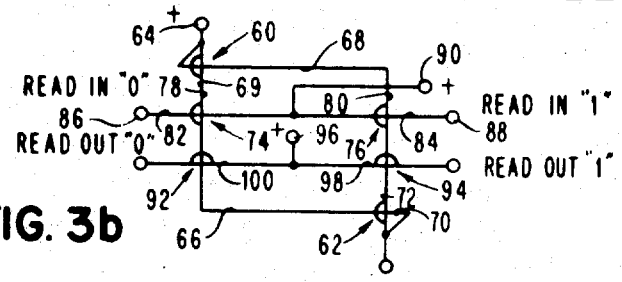
FIGURE 3b is a schematic diagram of a cryogenic flip-flop or trigger.

Referring now to FIGURE 3b, there is shown a basic flip-flop or trigger with read-in and read-out control circuits. Cryotrons 60 and 62 are the flip-flop pair. The current source 64 has two parallel paths 66 and 68, only one of which is superconductive at a time. If the left path 66 is superconducting, the flip-flop is said to be in the ON status or contain a 1; if the right path 68 is superconducting, the flip-flop is said to be in the OFF status or to contain a 0. Bistable operation is accomplished by feed-back of gate current to control conductors. For example, if the flip-flop contains a 1, the left path 66 including a left flip-flop gate conductor 69 is superconducting and the gate current flowing through the control conductor 70 of the lower flip-flop cryotron 62 makes the right path 68 resistive via a resistive gate conductor 72 associated with lower cryotron 62 of the flip-flop thereby maintaining current in the left path 66. Similarly, the other state of the flip-flop is maintained when the right path is superconducting.

The flip-flop of FIGURE 3b has read-in cryotrons 74 and 76 having their gate conductors 78 and 80 respectively in series with each flip-flop path. The control conductors 82 and 84 of the read-in pair cryotrons may be fed with current individually by suitable termination at the points 86 and 88 so that the current from a source 90 is directed into one or the other of control conductors. By causing $I_c$ to flow in the control coil 82 of the left-hand read-in cryotron 74, a 0 is entered in the flip-flop in a manner to be described hereafter. Energization of the control conductor 84 of the right-hand read-in cryotron 76 causes a 1 to be entered in the flip-flop.

Beneath the read-in cryotrons are a pair of read-out cryotrons 92 and 94, each having its control conductors in series with a one of the flip-flop paths. The right-hand cryotron 94 of the read-out pair is used to detect a 1, and the left-hand cryotron 92 is used to detect a 0. In this instance of read-out circuits, it is the gate conductors which are sampled as to resistive or superconductive states by the steering of current from the source 96 into one or other other read-out gate conductors to a suitable termination.

Assume that the flip-flop of FIGURE 3b is in the 0 state (right path 68 superconducting) and it is desired to read in a 1. Control current is caused to flow through the control conductor 84 of the read-in 1 cryotron making its gate conductor 80 resistive. Since both the right and left paths of the flip-flop are now resistive, the current from source 64 divides in half between the two paths of the flip-flop. When the current through each path falls near the half point (or below the critical value), neither the upper flip-flop gate nor lower flip-flop gate is resistive thereby leaving the read-in 1 cryogenic gate 80 as the only resistive gate. This action forces all of the current from source 64 into the left-hand path 66 of the flip-flop which makes the lower-flip-flop gate 72 resistive via current in its control conductor 70. The flip-flop is now in its stable state of 1 or ON and the read-in 1 current can be removed from control conductor 84 without change of state of the flip-flop. In like fashion, the flip-flop can be set to 0 or OFF by application of control current to the read-in 0 control conductor 82.

Detecting the state of the flip-flop (reading out is non-destructive) is accomplished by coupling a circuit from the read-out current source 96 through one of the read-out cryotrons 92 and 94. Assuming the flip-flop to be in the 0 state, a gate 98 of the right-hand read-out cryotron 94 is resistive and current is directed through the read-out 0 gate 100, now superconductive, to the output device where the presence of current indicates a 0 is sensed. Similarly, with the flip-flop in the 1 state, the current is directed through a read-out gate 98.

In the illustrations of this invention + and − signs have been used to designate the connections to a current source, but the actual polarity of the connections, as stated previously, are irrelevant and may be interchanged. Although many separate pairs of + and − signs are shown, these separate circuits may be connected in series to a single common current source. To retain constant input current during switching operations where slightly different characteristics of cryotrons would cause transient conditions, an inductance may be connected in series between outputs and inputs of devices such as those in FIGURES 3a and 3b connected in series. It is assumed that when power is first supplied to the system, all of the flip-flops are set to 0 or OFF state by circuits not shown which may operate the read-in 0 cryotron.

FIGURES 4a through 4r show the circuit details of the memory system 10 of FIGURE 1. By referring to FIGURE 5a FIGURES 4a through 4r can be arranged as a composite diagram, and then by referring to FIGURE 5b, the various registers, controls and so forth may be identified and their location and relationship determined since the arrangements of figures in FIGURES 5a and 5b correspond. It is helpful to compare FIGURES 1 and 5b at this time so that what has been written previously concerning the memory system 10 of FIGURE 1 can be applied to the composite diagrams of FIGURES 4a through 4r. In FIGURE 5b, note especially that each word register is divided into a top portion and a bottom portion on adjacent sheets of the drawings; therefore, if the capacity of the system is not increased, then X equals 2 and W equals 4 so that the order of registers would appear as follows:

Entry Register
Forward Echo Exit Register
Dummy Register 1 (Forward Exit Register)
Word Register 1
Dummy Register 2
Word Register 2
Dummy Register 3
Word Register 3
Dummy Register 4
Word Register 4
Dummy Register 5 (Backward Exit Register)
Backward Echo Exit Register Thus, it becomes apparent that by selecting the capacity of memory by defining W, an entire memory system is precisely described by repeatedly inserting the row of circuits shown in FIGURES 4j, 4k and 4l, and assigning appropriate values to X. Further, provision has been made as shown by the broken lines between adjacent bit positions of FIGURES 4b, 4e, 4h, 4k, 4n and 4q for the insertion of any number of data bit positions desired between data bit positions D–1 and 1 by repeatedly inserting data bit circuits like those of data bit positions D–1. Accordingly, the memory system may be expanded to accommodate any number of words having any number of bit positions.

In the description to follow, it is unnecessary to describe the operation in terms of more than a few word locations and data bit positions; and it is assumed that W equals 4 to describe the array of registers and d equals 3 to describe the number of data bit positions. Hence, the order of registers above applies, and in FIGURES 4a and 4b, with d equal to 3, the data bit positions from left to right are 3, 2 and 1. Since operation is in the pure binary notation within the system wherein only the values 0 and 1 are used, it may be assumed, for example, that the bits represent a binary quantity in which case data bit position 3 represents 4 when a 1 is present, data bit position 2 represents a 2 when a 1 is present, and data bit position 1 represents a 1 when a 1 is present. Therefore, a scale of 0 through 7 may be expressed with the three bit positions used in this description. Of course, the numbers of FIGURE 2 cannot be accommodated in the bit positions of the system specified above, but it will be apparent that the difference is one of degree only and that the same principles of operation apply.

Memory Control

Referring now to FIGURE 4c, there is shown a TS (Timing Signal) trigger which defines the A and B part of each cycle. As stated previously, when the Timing Signal trigger is OFF, a word may be received in the Entry register, a word may be transmitted externally from the Exit register, and, if necessary, transfer of words from the dummy registers to word registers is accomplished to complete a transfer-up or transfer-down operation. When the Timing Signal trigger is ON, a word may be transferred from the Entry register into the proper dummy register, a matched word may be moved to the Exit register and, if necessary, transfer of words from word registers to dummy registers is accomplished to begin a transfer-up or transfer-down operation. Starting at the current source 110, a switch 112 represents a device in the computer of the data processing system which controls the timing of the memory operation. Through the TS ON side of the switch, current is directed through a control conductor 114 of a right read-in cryotron 116 to turn ON the TS trigger by making a right path 118 resistive and a left path 120 superconductive. Thus, control current is passed through control conductors 122, 124 and 126 of TS read-out cryotrons making their respective gates 128, 130 and 132 resistive. Through the TS OFF side of the switch, current from source 110 is directed through a control conductor 134 of a left read-in cryotron 136 to turn OFF the TS trigger by making the left path 120 resistive and the right path 118 superconductive. Thus, control current is passed through control conductors 138, 140 and 142 of TS read-out cryotrons making the respective gates 144, 146 and 148 resistive. The read-in current flows through one or the other of the control conductors of the TS read-in cryotrons to the line 150 where it becomes the current source of the top pair of TS read-out cryotrons. A current source 152 supplies one or the other of the gate conductors of the middle pair of TS read-out cryotrons, and a current source 154 supplies one or the other of the gate conductors of the bottom pair of TS read-out cryotrons. These three pairs of TS read-out cryotrons either furnish signals on the TS ON lines 160, 162 and 164 or the TS OFF lines 166, 168 and 170. TS ON and OFF lines 164 and 170 extend downwardly through the word register control circuits of FIGURES 4f, 4i, 4l, 4o and 4r to a negative terminal for synchronizing the transfer of words within memory. TS ON and OFF lines 162 and 168 extend through the Entry register at the top of FIGURES 4b and 4a to time its operation. The TS OFF line 168 terminates at a negative terminal at the left of the Entry register, but the TS ON line 162 drops down to FIGURE 4d to control a Vacancy Bit circuit of Word register 1 wherein it feeds a parallel circuit, one going to a negative terminal and the other going to a Forward-Backward trigger of FIGURE 4c. The top set of TS read-out cryotrons in FIGURE 4c are used within the memory control circuits in a manner to be described subsequently.

Before describing the Entry-Exit circuits appearing in the center of FIGURE 4c, their function should be described. As will be apparent from the chart of FIGURE 2 and the description pertaining thereto, a complete cycle of operation, as distinguished from a timing cycle divided into portions A and B, takes three time periods such as A, B and A. In the case of an Entry operation, a TS OFF time (A part) is required to place a word in the Entry register, a TS ON time (B part) is required to transfer the word in the Entry register to the proper dummy register and words in word registers above this dummy register upwardly into adjacent dummy registers, and another TS OFF time (A part) is required to transfer those words relocated in dummy registers upwardly into adjacent word registers. The last A part above is also the time for receiving a new word in the Entry register. Therefore, it becomes necessary to retain the EE instruction bit entered in one cycle for use in the next cycle. This is done by storing the bit placed in an EE1 trigger in one cycle in an EE2 trigger during the succeeding cycle therby making the EE1 trigger available for a new EE bit. Summarizing, the EE1 trigger is set and the EE2 trigger is read out of during the A part of the cycle (TS OFF) and the state of the EE1 trigger is transferred to the EE2 trigger and the EE1 trigger is read out during the B part (TS ON).

Consider now an Entry-Exit switch 180 which indicates a device in the computer of the data processing system for entering an EE bit in the memory system. As explained above, the EE bit is set into the EE1 trigger when the Timing Signal is OFF and, accordingly, the TS OFF line 166 is the current source to the EE switch 180. The code for the EE bit as assigned so that 1 specifies an Entry operation and 0 specifies an Exit operation. Thus, when the EE switch is in the Entry position as shown in FIG. 4c, current via TS OFF line flows through a right read-in control conductor 182 of the EE1 trigger making a right path 184 resistive and a left path 186 superconductive so that the EE1 trigger is set to a 1. In like fashion, placing the EE switch in the Exit position provides current to a control conductor 188 of the left EE1 read-in cryotron thereby making path 186 resistive and path 184 superconductive to establish the 0 state. The TS OFF signal is thereafter supplied to the gate conductors 192 and 194 of a pair of read-out cryotrons of the EE2 trigger via a line 190. If the EE2 trigger is OFF (a path 196 superconductnig), the TS OFF signal is passed to an Exit line 198; if the EE2 trigger is ON (a path 200 superconducting), the TS OFF signal is is passed to an Entry line 202. The Exit and Entry lines 198 and 202 respectively pass through the memory control circuits of FIGS. 4f, 4i, 4l, 4o and 4r going to negative terminals and control the movement of words within memory. In this instance, one of this pair of lines is energized when the Timing Signal is OFF, but they may be energized in complementary fashion by other circuits to be descirbed later.

Before continuing with the description of the memory control circuits, the function of the Vacancy Bit will be explained. A Vacancy Bit accompanies each word entering memory and is used to indicate the availability of the location in which the word is stored. A Vacancy Bit of 1 designates an unavailable location and a 0 designates a location available for receiving a word. The Vacancy Bit of a word extracted from memory is dropped, but since read-out of a location in memory is nondestructive, the word may be repeatedly read out if desired. Thus, for an Exit operation a Vacancy Bit is supplied to the Entry register along with the data of the associative region. If the supplied Vacancy Bit is a 1, the word addressed is read out and its vacancy bit remains set to 1 to indicate that the location occupied by the word is unavailable. If the incoming Vacancy Bit is a 0, the word addressed is read out and that location occupied by the word is made available. For example, a word in memory must have a VB of 1 so that it may be extracted during an Exit operation, and it may be addressed and read out many times if the VB bit of the instruction remains a 1. If the word is no longer required to be held in memory, the last read-out operation of the word may be used with a VB to 0 making the word's location available. In the latter case, words are moved to fill the empty location so as to keep all vacant locations at the top of memory. More specifically, the incoming VB is initially placed in a VB1 trigger of the Entry register in FIGURE 4a during TS OFF time and the VB1 trigger is used to set a VB2 trigger of FIGURE 4c to the same binary value during TS ON line. The Vacancy Bit is also transferred from the VB1 trigger to VB position of the Forward Exit register during the same TS ON time. Thus, the VB2 trigger remembers what the new Vacancy Bit was during the succeeding TS OFF time so as to overwrite the register of the extracted word if it was to be destroyed. Otherwise, the words remain in their previously occupied registers. Because an incoming VB placed in the Entry register for an Entry operation is only effective after the operation is performed, in part, in accordance with the VB existing with the word, the actual effect of the incoming VB is delayed because it is first placed in a dummy register where no comparison is made and then transferred to the appropriate word register. The Vacancy Bits are used also to indicate when the memory is completely full and to initiate an overflow operation.

Referring once again to FIGURE 4c, four lines 220, 222, 224 and 226 from the lower read-out cryotrons of the EE1 and EE2 triggers are arranged to provide control current to cryotrons having their gate conductors arranged among three lines labeled Exit-TS ON 228, Exit-TS OFF 230 and Entry 232. Starting from a current source feeding the three lines, it can be seen that the only time line 228 is superconductive is when the Exit-TS-ON line 220 is carrying control current. At this time, the lines 230 and 232 are resistive since gate conductors are included having control conductors supplied by line 220. Similarly, the Exit-TS OFF line is only superconductive during an Exit operation with the Timing Signal OFF, and the Entry line 232 is superconductive during an Entry operation regardless of the state of the Timing Signal. The Exit-TS ON line 228 goes to an upper pair of read-out cryotrons of the Entry Register Vacancy Bit position shown completely in FIGURE 4a. If an Exit operation is being performed and there is a 1 Vacancy Bit in the Entry register, current from the line 228 goes through the 1 gate 234 into the Exit (Vacancy Bit 1) line 236. This occurs during TS ON time when this Vacancy Bit is being transferred to the VB2 trigger. If an Exit operation is being performed and there is a 0 Vacancy Bit in the Entry register, current from the line 228 goes through a 0 gate 238 into an $\overline{\text{Exit (Vacancy Bit 1)}}$ line 240.

The Exit TS OFF line 230 goes to the read-out cryotrons of the VB2 trigger, and when superconducting, supplies current to the Exit (VB1) line 236 via a gate 242 when the VB2 trigger is storing a 1 and to the $\overline{\text{Exit (VB1)}}$ line 240 when the VB2 trigger is storing a 0. During either an Entry operation or an Exit operation with an incoming VB in the Entry register of 0 and an Exit operation with a VB in the VB2 trigger of 0, superconductive current is supplied to the $\overline{\text{Exit (VB1)}}$ line 240 either directly from the Entry line 232 or from the Exit TS ON line 228 through the gate 238 or from the Exit-TS OFF line through the gate 244. The Exit (VB1) line 236 and its complement 240 pass downwardly from FIGURE 4c through the Word Register Control Circuits of FIGURES 4f, 4i, 4l and 4o where they prevent unwanted word transfers in the case of an Exit operation with the extracted word being in memory for future use (Exit operation with an incoming VB of 1).

In FIGURE 4c, the TS ON line 160 from the Timing Signal trigger goes to a read-out pair of cryotrons (the middle pair as shown in the VB position of the Entry register in FIGURE 4a). The gates 246 and 248 of the read-out pair are connected to control conductors 250 and 252 of the read-in cryotrons of the VB2 trigger. Thus, when the Timing Signal is ON, the content of the VB1 trigger (FIGURE 4a) of the Entry register is transferred gate 250 or gate 252 passes through the TS ON line 254 to the VB2 trigger (FIGURE 4c). Current from either to the read-in pair of cryotrons of the EE2 trigger.

The circuits for specifying the forward or backward mode of operation of memory begin in FIGURE 4c where a switch 256 represents a device in the computer which can selectively provide current to either one or the other of a pair of lines 258 and 260 from a current source 262. There are two separate sets of forward-backward control lines. The pair 272 and 276 identified by the word "switch" in the lower left corner of FIGURE 4c is controlled directly the computer and performs two function in memory. First, the pair determines which of the two Echo Exit registers sets the Auxiliary Bit of the Entry register and second, the pair conditions certain of the comparison lines in each word register required to be energized if that word register is the topmost one in memory whose associative region has a value equal to the value in a like region in the Entry register. When the Forward Switch line 258 is superconducting, control current is supplied to a control conductor 264 of a gate 266 associated with a TS ON Word Register 1 VB=1 line 268, a control conductor 270 of a read-in cryotron for the Forward-Backward (F-B) trigger, and a Forward Switch line 272 which passes downwardly to the left, and through the Memory Control circuits of FIGURES 4f, 4i, 4l, 4o and 4r. When the Backward Switch line 260 is superconducting, control current is provided to a control conductor 274 and a Backward Switch line 276 which parallels the Forward Switch line 272 as the latter travels through the Memory Control circuits.

A pair of read-out cryotrons for the F-B trigger provide current from a source 278 to either a Forward (trigger) line 280 or a Backward (trigger) line 282, which lines go to the Memory Control circuits of FIGURES 4f, 4i, 4l, 4o and 4r to perform a function in addition to those stated above, namely, to control the direction, either up or down, in which the words are moved in memory. If the memory is not full, the transfer of words should be in the Forward direction regardless of the position of the Forward-Backward switch; therefore, if the switch 256 is set to Backward, the F-B trigger is not set to Backward until the memory is full. This is accomplished by means of the TS ON Word Register 1 VB=1 line 268 which is superconducting when the memory is full, i.e., Word register 1 has a VB of 1. Assume operation in the Forward mode with memory partially loaded and the F-B trigger indicating Forward mode by a right path 284 superconducting. Now, place the F-B switch in the Backward position and control current flows through the control conductor 274 making its gate 285 resistive. The gate 266 (now superconductive) and a control conductor 286, the latter having a gate conductor 288 in series with path 284, are not supplied with current from the line 268 and the right path 284 remaining superconducting as before. When the VB of Word 1 register becomes 1 indicating a full memory, current through the line 268 passes through the gate 266 and control conductor 286 making gate 288 resistive and setting the F-B trigger to the backward state (a left path 290 superconducting).

In FIGURE 4c, the Forward (trigger) line 280 and Backward (trigger) line 282 include control conductors 294 and 296 respectively which furnish complementary control over a current source 298 via gates 300 and 302. The Exit line 198 includes control conductors 304, 306 and 308, and the Entry line 202 includes control conductors 310, 312 and 314. The TS ON line 164 includes control conductors 316 and 318 and the TS OFF line 170 includes control conductors 320 and 322. Starting at the current source 298 on the right side of FIGURE 4c, there is a circuit through the gate 302 with a branch including a gate 324 associated with the control conductor 310 to a negative terminal. The other path includes a gate 326 associated with the control conductor 304 with a branch through a gate 328 to a negative terminal. The circuit continues through a gate 330 associated with the control conductor 316 and is labeled Forward TS OFF Entry line 332, which goes to the FIGURE 4d as an input to the Auxiliary Bit trigger of the Forward Exit register.

Starting at the current source 298 once again, there is a circuit through the gate 294 and a path including a gate 334 associated with the control conductor 312 to a negative terminal. The other path is through a gate 336 associated with the control conductor 306 and continues through a branch including a gate 338 associated with the control conductor 322 to a negative terminal. The circuit continues through a gate 340 associated with control conductor 318 and is labeled Backward TS OFF Entry line 342 which goes to the Auxiliary Bit position of the Backward Exit register. Thus, the line 332 is superconductive when the lines 280, 202 and 170 are superconducting, and the line 342 is superconductive when the line 282, 202 and 170 are superconducting.

A current source 341 provides current either to an Entry line 344 via a gate 343 associated with the control conductor 308 or to an Exit line 347 via gate 345 associated with a control conductor 314. The Entry and Exit lines 344 and 347 pass through the Entry register of FIGURES 4a and 4b and end at a negative terminal in FIGURE 4a.

Entry register

The Entry register is shown in FIGURES 4a and 4b having input switches which indicate a device in the computer system controlling the bit configuration presented to the memory system. Going from left to right, there is shown a Vacancy Bit switch 348, an Auxiliary Bit Mask Control switch 349, a Mask Bit d switch 350, a Data Bit d switch 352, a Mask Bit d–1 switch 354, a Data Bit d–1 switch 356, a Mask Bit 1 switch 358 and a Data Bit 1 switch 360. Considering the VB entry position with TS OFF line superconducting, current from a source 362 passes through a gate 364 having a control conductor 366, through the 1 side of the switch 348, and through a control conductor 368 having a gate 370 to a negative terminal to set a 1 in the VB Entry trigger. A 0 is set into the VB Entry trigger by passing current through a read-in 0 control conductor 372 having a gate 374. In the Auxiliary Bit Mask Control position with TS OFF, current from a source 376 passes through the 0 side of the switch 349 downwardly through a read-in 0 control conductor 378 having a gate 380 and either through a gate conductor 382 of a read-out cryotron having a control conductor 386 to a NO COMPARE line 384. Depending upon the state of an Auxiliary Bit trigger which includes the control conductors 396 and 398, current, if present from the Mask Control trigger, is directed through either a 0 Compare line 400 or a 1 Compare line 402. With the Auxiliary Bit Mask Control switch 349 in the 1 position, and an Entry operation assumed, current from source 376 is blocked from the Mask Control trigger by a gate 404 and thus passes through a gate 406 to a Test line 408. The Test line examines the state of the VB trigger of the Forward Exit register in FIGURE 4d by feeding a pair of read-out cryotrons returning a signal on either a Mask Control 1 line 410 or a Mask Control 0 line 412. If current is on the 0 line 412, it indicates that memory is not full and the current flows through the read-in 0 control conductor 378 to prevent a comparison using the Auxiliary Bits. If memory is full, current comes in on the 1 line 410 and through the read-in 1 control conductor 416 of the Mask Control trigger to permit comparison via the gate 388 and the read-out cryotrons of the Auxiliary Bit of the Entry register. More specifically, the line 410 includes a control conductor 414 of a read-in 1 cryotron having a gate 416 in series with the right path of the Mask Control trigger so that if the switch 349 is set to 1 and a 1 is present in the VB position of the Forward Exit trigger, current is presented to the read-out cryotrons of the Mask Control trigger by way of control conductor 416. Alternately, if the VB position of the Forward Exit register contains a 0, current is passed through the Mask Control 0 line through the read-in 0 control conductor 378 to the read-out cryotrons of the Mask Control.

The Mask Bit for the Auxiliary Bit is normally set to 1 for an Entry operation which specifies that the memory system is operating in the sorting mode because the Auxiliary Bits are used to define groups of words and merging of a word in the proper group depends upon the identity provided by the Auxiliary Bits. However, the Mask Bit for the Auxiliary Bit is normally set to 0 for an Exit operation which specifies that the memory system is operating in the fully-associative mode because the Auxiliary Bits should be blocked and rendered ineffective to modify the value of the associative region of the word to be retrieved. Of course, there are other occasions when other operations call for other combinations of the settings of the Mask Bit for the Auxiliary Bit and the settings of the Entry-Exit switch.

As mentioned previously, in the Forward mode the Auxiliary Bit is normally set to 0 unless the value of the associative region of the word in the Entry register is less than the tag of the latest extracted word. In this case, the Auxiliary Bit is set to 1 to start a new group, and when this new group fills memory, the Auxiliary Bits are changed back to 0 to be ready for a new group. Looking at the Auxiliary Bit of the Forward Exit register in FIGURES 4d, the Forward-TS OFF-Entry line 332 feeds two parallel circuits. The first circuit goes to a negative terminal by way of a gate 420 associated with a control conductor 422 in a left path 424 of the Auxiliary Bit trigger in the Forward Exit register. The other circuit threads through Auxiliary Bit positions and includes a gate 426 of a read-out 1 cryotron of the Auxiliary Bit (AB) position of the Forward Exit register (FIGURE 4d), a control conductor 428 of a read-in 0 cryotron in the AB position of Word register 1 (FIGURE 4d), a control conductor 430 of a read-in 0 cryotron in the AB position of Dummy register 2 (FIGURE 4g), a control conductor 432 of a read-in 0 cryotron in the AB position of Word register 2 (FIGURE 4g), a control conductor 434 of a read-in 0 cryotron in the AB position of Dummy register X+1 (FIGURE 4j), a control conductor 436 of a read-in 0 cryotron in the AB position of Word register X−1 (FIGURE 4j), a control conductor 438 of a read-in 0 cryotron of the AB position of Dummy register W (FIGURE 4m), a control conductor 440 of a read-in 0 cryotron of the AB position of Word register W (FIGURE 4m), and a control conductor 442 of a read-in 0 cryotron of the AB position of the Backward Exit register (FIGURE 4p) to a negative terminal. Therefore, with the Forward-TS OFF-Entry line 332 superconducting and the Auxiliary Bit position of the Forward Exit register set to 1 (left path 424 superconducting), the gate 426 passes current to read-in 0 control conductors 428, 430, 432, 434, 436, 438, 440 and 442 to the negative terminal to set all Auxiliary Bits associated with the foregoing control conductors to 0's. Note that the Auxiliary Bit position of the Forward Exit register is unchanged since it is necessary to remember for a time its previous state since it was used to reset all of the other Auxiliary Bits.

In FIGURE 4p, the Backward-TS OFF-Entry line 342 from FIGURE 4c feeds two parallel circuits in the same fashion as the Forward-TS-Entry line 332. The first circuit goes to a negative terminal via a gate 450 associated with a control conductor 452 in a right path 454 of the Auxiliary Bit position of the Backward Exit register. The other circuit threads upwardly through Auxiliary Bit positions and includes a gate 456 of a read-out 0 cryotron of the AB position of the Backward Exit register (FIGURE 4p), a control conductor 458 of a read-in 1 cryotron in the AB position of Word register W (FIGURE 4m), a control conductor 460 of a read-in 1 cryotron in the AB position of Dummy register W (FIGURE 4m), a control conductor 462 of a read-in 1 cryotron in the AB position of Word Register X+1 (FIGURE 4j), a control conductor 464 of a read-in 1 cryotron of the AB position of Dummy register X+1 (FIGURE 4j), a control conductor 466 of a read-in 1 cryotron of Word register 2 (FIGURE 4g), a control conductor 468 of a read-in 1 cryotron of the AB position of Dummy register 2 (FIGURE 4g), a control conductor 470 of a read-in 1 cryotron of the AB position of Word register 1 (FIGURE 4d), and a gate 472 associated with a control conductor 474 of the VB position in the Forward Exit register (FIGURE 4d) to a negative terminal. Therefore, when the Backward-TS OFF-Entry line 342 is superconducting and the Auxiliary Bit position of the Backward Exit register (FIGURE 4p) is set to zero (right path 454 superconducting), gate 456 passes current to read-in 1 control conductors 458, 460, 462, 464, 466, 468, 470 and 472 to the negative terminal to set all Auxiliary Bits associated with the foregoing control conductors to 1's. The Auxiliary Bit of the Backward Exit register is unchanged as a result of this operation.

In FIGURE 4a, the Auxiliary Bit trigger of the Entry register has two pairs of read-in cryotrons. One pair, comprising control conductors 476 and 478 and gates 480 and 482, is controlled by the 0 line 484 and a 1 line 486 from the control circuits of FIGURE 4f of the Forward Echo Exit register. The other pair, comprising control conductors 488 and 490 and gates 492 and 494, is controlled by a 0 line 496 and a 1 line 498 from the control circuits in FIGURE 4r of the Backward Echo Exit register. Equal, Low and High lines 500, 502 and 504 respectively from the Forward Echo Exit register indicate the status of the associative region in this register as compared to that in the Entry register. Continuing to the right in FIGURE 4f, the Equal line 500 and the Low line 502 are conditioned by the Forward Switch line 272 and the TS OFF line 170 to become the Set Auxiliary Bit-Entry register 0 line 484. The High line 504 is conditioned in a like manner to become the Set Bit-Entry register 1 line 486. At the bottom of FIGURE 4r, Equal, Low and High lines 510, 512 and 514 from the Backward Echo Exit register indicate the status of the associative region in this register as compared to that in the Entry register. Continuing to the right in FIGURE 4r, the Equal line 510 and the High line 514 are conditioned by the Backward Switch line 276 and the TS OFF line 170 to become the Set Auxiliary Bit-Entry register 1 line 498, and the Low line 512 is conditioned by the same lines as above to become the Set Auxiliary Bit-Entry register 0 line 496.

Taking Mask Bit d in FIGURE 4a as representative of the other Mask Bit positions of the Entry register, current from a source 520 is directed through a gate 522, when the TS OFF line is superconducting, through the 1 side of the switch 350 into a control conductor 524 of a read-in 1 cryotron having a gate 526 to set the Mask Bit trigger to 1. The current continues, to become a source for the read-out cryotrons when the Timing Signal is OFF. A gate 528 of read-out 1 cryotron provides a path to the lower pair of read-out cryotrons of Data Bit d trigger of the Entry register so that if a left path 530 is superconducting indicating a 1, current is provided to a Compare 1 line 532 and, if a right path 534 is superconducting indicating a 0, current is provided to a Compare 0 line 536. Thus, a Mask Bit of 1 accompanying a Data Bit indicates that the Data Bit should be included in the associative region for the purpose of comparison. If the Mask Bit d trigger is set to 0 via switch 350 in the 0 position feeding a control conductor 538, a right path 540 of the Mask Bit trigger is superconducting, and current is provided through a gate 542 of a read-out 0 cryotron to a No Compare line 544. A Mask Bit of 0 indicates that the Data Bit associated therewith is not to be used in the comparison of the associative regions. The way in which the No Compare line 544, Compare 0 line 536 and Compare 1 line 532 control the Compare circuits is discussed later. When the Timing Signal is ON, current from the source 520 is fed directly to the read gates 528 and 542 of the read-out cryotrons of the Mask Bit d trigger of the Entry register.

Read-out from exit registers

A current source 550 to the left of Mask Bit d in FIGURE 4a feeds a circuit including a gate 552 which branches into an Exit 1 line 554 and an Exit 0 line 556. The Exit 1 line 554 includes a gate 672 in the Auxiliary Bit position of the Forward Exit register (FIGURE 4d), a gate 560 in the Auxiliary Bit position of the Backward Exit register (FIGURE 4p) and a read-out coil 562 and the line goes to a negative terminal. The Exit 0 line 556 includes a gate 564 in the Auxiliary Bit position of the Forward Exit register (FIGURE 4d), a gate 566 in the Auxiliary Bit position of the Backward Exit register (FIGURE 4p) and a read-out 0 coil 568 and goes to a negative terminal. In like fashion, a line 570 from the read-in gates of Data Bit d feeds an Exit 1 line 572 which includes a gate 574 in the Forward Exit register, a gate 576 in the Backward Exit register, and a read-out 1 coil 578 and the line goes to a negative terminal. Another branch 580 of line 570 is labeled Exit 0 and includes a gate 582 in the Forward Exit register, a gate 584 in the Backward Exit register, and a read-out coil 586 connected to a negative terminal.

In FIGURE 4b, a line 588 from the read-in gates of Data Bit d–1 feeds an Exit 1 line 590, which includes a gate 592 in the Forward Exit register, a gate 594 in the Backward Exit register and a read-out 1 coil 596 which is connected to a negative terminal. The line 588 also feeds an Exit 0 line 598, which includes a gate 600 in the Forward Exit register, a gate 602 in the Backward Exit register and a read-out 0 coil 604 which is connected to a negative terminal. Also in FIGURE 4b, a line 606 from the read-in gate of Data Bit 1 feeds an Exit 1 line 608 which includes a gate 610 in the Forward Exit register, a gate 612 in the Backward Exit register, and a read-out 1 coil 614 which is connected to a negative terminal. The other branch of line 606 feeds an Exit 0 line 618 which includes a gate 619 in the Forward Exit register, a gate 620 in the Backward Exit register and a read-out 0 coil 622 which is connected to a negative terminal.

To control the Exit circuits as described above refer to FIGURE 4f where the Backward (trigger) line 282 includes control conductors 630, and FIGURE 4r where the same line includes a control conductor 632. Also, the Forward (trigger) line 280 includes a control conductor 634 in FIGURE 4f and a control conductor 636 in FIGURE 4r. Additionally, the TS OFF line 170 includes a control conductor 638 in FIGURE 4f and a control conductor 640 in FIGURE 4r. Finally, the TS ON line 164 includes a control conductor 642 in FIGURE 4f and a control conductor 644 in FIGURE 4r. Starting at a current source 646 at the right edge of FIGURE 4f, current is diverted through a gate 648 to a negative terminal if the Backward (trigger) line 282 is superconducting, but if the Forward (trigger) line 280 is superconducting, current passes through a gate 650 to another set of switches. There, current is diverted to a negative terminal via a gate 652 when the TS ON line 164 is superconducting, but if the TS OFF line 170 is superconducting, current passes to a Forward Exit Control line 654 via gate 656. Thus, with the Forward trigger ON and the Timing Signal OFF, the Forward Exit control line 654 is superconducting and provides current either to a control conductor 660 or to a control conductor 662 in the Data Bit 1 position of the Forward Exit register; either to a control conductor 664 or to a control conductor 666 in the Data Bit d–1 position; either to a control conductor 668 or to a control conductor 670 in the Data Bit d position; and either to a control conductor 672 or to a control conductor 674 in the Auxiliary Bit position. Accordingly, if the Data Bit 1 position of the Forward Exit register contains a 1 (a left path 676 superconducting and a right path 678 resistive) current from Forward Exit Control line 654 is directed through the control conductor 662 making the gate 618 resistive. Since the gate 610 in the Exit 1 line 608 is superconductive, current flows through the read-out 1 coil in FIGURE 4q for the Data Bit 1 position. If the Data Bit 1 position of the Forward Exit register contains a 0 (right path 678 superconducting), current from line 654 passes through the control conductor 660 making gate 610 in the Exit 1 line 608 resistive. Now, the Exit 0 line 616 passes current through superconductive gate 618 to the read-out 0 coil 622. In like fashion, the contents of Data Bit d–1, Data Bit d, and Auxiliary Bit positions of the Forward Exit register are placed in the Exit circuits.

Referring now to FIGURE 4r, a Backward Exit Control line 690 is supplied with current when the Backward (trigger) line 282 provides current to control conductor 632 and when the TS OFF line 170 provides current to control conductor 640. Current through the Backward Exit Control line 690 conditions the Data Bit position and Auxiliary Bit position of the Backward Exit register to place their contents in the Exit circuits in the same way that was explained with reference to the reading out of the Forward Exit register into the Exit circuits.

Comparing circuits

The comparing circuits are principally the same with only minor modifications, and those for Word register 1 shown in FIGURES 4d, 4e and 4f will be explained as representative of all.

Starting at the lower left corner of FIGURE 4d, a current source 700 has two possible paths either through a circuit including a gate 702 or a circuit including a gate 704. The gate 702 has a control conductor 706 in a right path 708 of the VB trigger of Word register 1, and the gate 704 has a control conductor 710 in a left path 712 of the same trigger. Accordingly, the path chosen depends upon the status of the Vacancy Bit. If the VB is 1, current flows in the upper branch to the comparing circuit of the Auxiliary Bit trigger, if the VB is a 0 the lower brach is superconducting, and the current flows through a Low line 714 to FIGURE 4f, bypassing the remainder of the comparing circuits of Word register 1 since a VB of 0 indicates an available register which may be taken as having a data content lower than any register having a VB of 1.

If the VB is 1, current in the upper branch may take any one of four paths in the Auxiliary Bit position, which paths are controlled by the No Compare line 384, the 0 Compare line 400, a left path 720 of the AB trigger, a right path 722 of the AB trigger, and the 1 Compare line 402. If the No Compare line 384 is superconductive due to the AB Mask being 0, current flows through a control conductor 724 in the top path and a control conductor 726 in the bottom path thereby blocking the top and the bottom paths. Since there is no current in the 0 Compare line 400 and the 1 Compare line 402, one of the two middle paths is superconducting depending upon the state of the trigger. Therefore, current flows into an Equal line 728 to the input of the adjacent lower order comparing circuit for Data Bit d of Word register 1 to effect a further comparison.

If there is a 0 in the Auxiliary Bit position of the Entry register, the 0 Compare line 400 is superconducting blocking the top two paths of the comparing circuit. If the AB trigger contains a 0 (the right path 722 superconducting), the bottom path is blocked, but the third path from the top is superconductive so that current is directed into the Equal line 728. However, if the AB trigger contains a 1 (the left path 728 superconducting), the bottom path is superconductive and current is fed into a High line 730 which line passes to the right through FIGURE 4e and on to FIGURE 4f without further testing of the lower order position of Word register 1.

If the Auxiliary Bit position of the Entry register contains a 1, the Compare line 402 is superconducting and blocks the two bottom paths of the Compare circuit of the AB trigger of Word register 1. If the trigger contains a 1, the second path from the top is superconducting and current is directed on the Equal line 728 to the adjacent lower order for further comparison. If the VB trigger contains a 0, the top line is superconducting furnishing current to the low line 714 without further comparison in the lower orders.

Thus, assuming Mask Bits of 1, tests are made of all bit positions of the Word register starting at the highest order as long as the bits in a Word register are equal to the bits in the Entry register. The first bit position at which the bit of a Word register is either higher or lower than the bit of the entry register immediately gives an indication that the whole word is either higher or lower than the word in the Entry register. As is evident from the circuits, the comparison is made simultaneously in the Word registers.

Comparing circuits are also provided for the Data Bit positions of the Forward Echo Exit register of FIGURES 4d and 4e and the Backward Echo Exit register of FIGURES 4p and 4q so that the last outgoing word may be used in the comparison. An Auxiliary Bit is not used for comparison in the Forward and Backward Echo Exit registers since it is not needed for a comparison with an incoming word, a word last extracted, and the words stored in memory.

In FIGURE 4f, the Forward Switch line 272 makes the Comparison circuits of the Forward Echo Exit register effective when the Forward switch is ON. Similarly, in FIGURE 4r, the Backward Switch line 276 conditions the Comparing circuits of the Backward Echo Exit register.

In approximately the center of FIGURE 4f, a Remembering trigger is shown for Word register 1. The Equal, Low and High lines 728, 714 and 730, respectively, enter from the lower left. Assuming an Exit operation specifying the associative memory mode of operation, in which case the Forward-Backward switch is in the Forward position, an equal condition should be recognized and a Match line 740 energized to transfer the contents of the Word register to the Forward Exit register. If the Equal line 728 is superconducting and the Timing Signal is ON, current from the Equal line flows through a gate 742, through a gate 744, through a control conductor 746 having a gate 748 in series with the Exit line 198, through a control conductor 750 having a gate 751 in a Previous Select line 752, through a gate 754 having a control conductor 756 in series with the Entry line 202, through a control conductor 758 having a gate 759 and into the Match line 740. The Exit line 198 includes a control conductor 770, a control conductor 772, a control conductor 774, a control conductor 776, the gate 748, a gate 778, a control conductor 780, and a control conductor 782 in FIGURE 4f. Current is passed through the Exit line 198, through control conductors 770, 772, 774 and 776 to the gate 748 (now resistive due to current in the Equal line 728) and into a Previous Match line 784. Current in the line 784 indicates to Word registers below that a match has been made and prevents other equal conditions, if existing in word registers below, from energizing Match lines. This insures that only the first word of a group having equal values in the associative regions is retrieved in one operation. The Previous Match line 784 includes a gate 786 having a control conductor 788 in the Low line 714, a gate 790 having a control conductor 792 in series with the High line 730, a gate 794 having a control conductor 796 in series with a read-out 0 gate 798 of the Remembering trigger, a control conductor 800 having a gate 802 in series with a Transfer Down line 804, and a control conductor 806 having a gate 808 in series with a Dummy In line 810.

Referring now to the Remembering trigger in FIGURE 4f, current into the Match line 740 from the Equal line 728 via the control conductor 758 makes the gate 759 in a right path 820 of the trigger resistive so that the trigger is set to 1 (a left path 822 superconducting). Thus, when the Timing Signal is OFF making the gate 744 resistive, current in the Equal line 728 is diverted through a gate 824, now superconductive, to the read-out cryotrons of the Remembering trigger. With this trigger set to 1, the current passes through a read-out gate 826 and through control conductors 828 and 830 to a negative terminal to maintain current in the Previous Match line 784 even though the Equal line is resistive due to the Timing Signal OFF line 170 and a gate 744 included therein. In effect, the Previous Match line is latched. The Remembering trigger remembers during the following TS OFF time when a new word is being read into the Entry register which word register has been matched (or selected) during the Previous TS ON or B time. This is necessary so as to complete one operation while beginning a new one.

Continuing with an Exit operation with the Timing Signal ON, current in the Low line 714 passes through a gate 832, makes a gate 836 resistive by energizing its control conductor 788 and directs current from the Exit line 198 into a No Previous Match line 838. The current in the Low line 714 flows through a control conductor 840 in the left path 822 of the Remembering trigger to a negative terminal to set the trigger to the 0 state. Current in the High line 730 passes through a gate 842, through the control conductor 792, through a control conductor 844, through a gate 846 (now superconductive) since current in the Exit line 198 is flowing through the control conductor 774, and through the current conductor 840 to the negative terminal. Note that the current from the High line has been diverted to the control conductor in the Low line to set the trigger to the 0 state as was the case with the Low condition. Passage of current from the High line through the control conductor 792 makes the gate 790 resistive and routes current in the Exit line 198 to the No Previous Match line 838. With the Remembering trigger set to 0 read-out current through gate 798 and control conductor 796 maintains current in the No Previous Match line 838 with the Timing Signal OFF.

The No Previous Match line 838 and the Previous Match line 784 continue through the memory control circuits of FIGURES 4i, 4l, 4o and 4r. Referring now to FIGURE 4i, assume that Word register 1 has been matched and that Word register 2 has been matched as well. With these conditions imposed, current is furnished on the Previous Match line 784 and on an Equal line 850 to the Memory Control circuits of Word register 2. The current in Previous Match line 784 passes through control conductors 852, 854, 856, 858 and 860 in FIGURE 4i making their respective gates resistive. Current from the Equal line 850 passes through gates 862 and 864 and through control conductors 866 and 868, but a resistive gate 894 having the control conductor 870 energized by the Previous Match line 784 diverts the current to a branch including a superconductive gate 872 which passes the current to the negative terminal via a read-in 0 control conductor 874. In contrast to the Remembering trigger of Word register 1 which is set to 1 for an equal condition, the Remembering trigger of Word register 2 is set to 0 for an equal condition because of the previous match indicated by current on the Previous Match line 784 so that only one Remembering trigger is set to a 1 for a single operation. Now, with the Timing Signal OFF line 170 superconducting, current from the Equal line 850 passes through a gate 880, through a read-out 0 gate 882 of the Remembering trigger of Word register 2 and through control conductors 884 and 886 to a negative terminal. The overall result is that current flowing in the Previous Match line 784 of FIGURE 4i is maintained.

Consider now the case where the No Previous Match line 838 centers FIGURE 4i superconducting, the Equal line 850 for Word register 2 is superconducting and the Timing Signal is ON. Current from Equal line 850 passes through the gate 862, the gate 864, the control conductor 866, the control conductor 868, the gates 890, 892 and 894, a control conductor 896 and to a Match line 898. Current in control conductor 896 sets the Remembering trigger to 1. The control conductor 866 shifts the current from the No Previous Match line 838 to a Previous Match line 784. With the Timing Signal OFF, current from the Equal line 850 passes through the gate 880, through a read-out 1 gate 900 and control conductors 902 and 904 to a negative terminal. Thus, without current on the Equal line 850, current from the No Previous Match line 838 is directed through a gate 906 to maintain current in the Previous Match line 784.

The same circuits are used on an Entry operation and the High line becomes the Select line and operates the Remembering trigger. Further, the current flowing down the Entry line becomes either the Previous Select or No Previous Select. For example, assume an Entry operation with the Timing Signal ON, a high condition in Word register 2 as indicated by current in a High line 920 entering FIGURE 4i from the left hand and a No Previous Select as indicated by current in a line 918. Current on the High line 920 passes through a gate 922, through a control conductor 924, through a control conductor 926, a gate 928, a gate 930, a gate 932, a control conductor 934 and to a Select line 936. Energizing control conductor 926 makes a gate 940 resistive to divert the No Previous Select current on the line 918 to a Previous Select line 942. Current through the control conductor 934 having a gate in a right path 944 of the Remembering trigger of Word register 2 sets the trigger to a 1. With the Timing Signal OFF, current in the TS OFF line 170 flows through a control conductor 948 making the gate 922 resistive which directs the current through a superconductive gate 950, the read-out 1 gate 900 and control conductors 902 and 904 to the negative terminal. Since the gate 940 which previously directed the No Previous Select current into the line 942 is now superconductive, a gate 952 controlled by control conductor 904 directs the No Previous Select current into the Previous Select line 942.

For the instance when a Low line 954, the TS ON line 164 and the No Previous Select line 918 are superconducting, current from the Low line passes through a gate 956, control conductors 958 and 960 and the read-in 0 control conductor 874 to the negative terminal. A gate 962 is made resistive by current in the control conductor 960 and prevents current in the No Previous Select line 918 from being diverted to the Previous Select line 942 so that the current continues on a No Previous Select line 964. The Remembering trigger of Word register 2 is set to 0 as a result of current in control conductor 874. Thus, with the Timing Signal OFF, current from the Low line 954 passes through a gate 966, through a read-out 0 gate 882, and through control conductors 884 and 886 to a negative terminal. Thus, No Previous Select current is maintained in the No Previous Select line 964.

The Forward-Backward switch is set to Forward on an Exit operation, but for an Entry operation, it may be set to either Forward or Backward. Accordingly, the effect of its being set to Backward is discussed with reference to the Selection portion of the Memory Control circuits. Briefly, in the Backward mode, current in an Equal line is transferred to the High line to indicate a selection. In FIGURE 4f, with the Timing Signal ON, current in the Equal line 728 flows through a gate 970 because its control conductor 972 in series with the Forward Switch line 272 is not provided with control current and the gate 742 having a control conductor 974 in series with the Backward Switch line 276 is now resistive. The operation of the Remembering trigger and the latch on Select lines is the same as if the Forward-Backward switch were set to Forward. The effect of the Forward and Backward (trigger) lines on a transfer operation is described later.

Forward entry

Referring to FIGURE 4a where the Data Bit d position of the Eentry register is shown, if the TS OFF line 168 is superconducting, current from a source 980 passes through a gate 982, having a control conductor 984 in series with the TS ON line 162, to the switch 352. Assuming the switch set to 1, as shown, current flows through a read-in 1 control conductor 985 and into the line 570. Assuming a 0 in the Data Bit d position of the Forward Exit register, current on the line 570 takes the path 580 and a 0 is read into the Data Bit d position of the Exit circuits (0 coil 586, FIGURE 4p, energized). If the Data Bit d switch is set to 0, current is directed through a read-in 0 conductor 986 to the line 570. Either the path 534 or the path 530 is made resistive to set the trigger appropriately. The two read-out pairs of cryotrons are not provided with gate current from source 520 through gate 522, the "one" side of switch 350, control conductor 524 and gate 528. When the TS ON line 162 is energized, current from the source 980 is steered through the gate 990 to three paths 992, 994 and 996. The paths 992 and 996 include gates 998 and 1000 having corresponding control conductors 1002 and 1004 in series with the Entry line 344. Accordingly, for an Entry operation, presently being described, current is steered into the path 994 and through a gate 1006 having a control conductor 1008 in series with the Exit line 347, not superconducting. The top pair of read-out cryotrons include a read-out 0 gate 1010 having a control conductor 1012 in series with the path 530 and a read-out 1 gate 1014 having a control conductor 1016 in series with the path 534. The gates 1010 and 1016 switch the current in the center path 994 either to an Entry 1 line 1018 or to an Entry 0 line 1020 according to the state of the trigger. Following these lines through FIGURES 4d, 4g, 4j, 4m and 4p it will be noted that control conductors are included in the lines at the Data Bit d positions of the Forward Exit register, Dummy register 2, Dummy register X+1, Dummy Register W and the Backward Exit register, and gate conductors are included in these lines in the Data Bit d positions of Word register 1, Word register 2, Word register X+1, and Word register W. Therefore, these Entry lines 1018 and 1020 and other like lines for other bit positions are a bus to transfer data to the registers. However, it is emphasized that the gates of control conductors included in the dummy registers (the Forward and Backward Exit registers, which are dummy registers, as well) are fed by Select lines, which lines are operated during an Entry operation. The Select line of the Forward Exit register is operated during an Exit operation. The control conductors of the gates included in the word registers are fed by Match lines, which lines are only operated during an Exit operation. Therefore, it may be said that Entry 0 and 1 lines are used to control the storage of data from the Entry register into a dummy register during an Entry operation and are used to transfer a word from a Word register selected by a Match condition to the Forward Exit register during an Exit operation. The Entry 1 line 1018 includes a control conductor 1022, a gate 1024, a control conductor 1026, a gate 1028, a control conductor 1030, a gate 1032, a control conductor 1034, a gate 1036 and a control conductor 1038. The Entry 0 line 1020 includes a control conductor 1040, a gate 1042, a control conductor 1044, a gate 1046, a control conductor 1048, a gate 1050, a control conductor 1052, a gate 1054, and a control conductor 1056. Thus, if the Data Bit d position of the Entry register is storing a 1 (left path 530 superconducting) and the Timing Signal is ON, current from source 980 flows through gate 990, path 994, gate 1006, gate 1014, and Entry 1 line 1018. Assuming a Select line 1060 superconducting and entering the Data Bit d position of the Forward Exit register (FIGURE 4d), current in the Entry 1 line 1018 passing through control conductor 1022 makes a gate 1062 resistive so that current in the Select line 1060 passes through a read-in 1 control conductor 1064, through a gate 1066 (now superconducting) and to the Select line entering the Auxiliary Bit position of the Forward Exit register. The Data Bit d trigger of the Forward Exit register is now in the 1 state. The entire Entry operation is best understood by an assumed operation to follow.

Example of a forward entry operation

To illustrate the principles of the invention described with reference to FIGURES 1 and 2 and to further explain the circuits of FIGURES 4a through 4r, it will be assumed initially that the memory system is operating in the self-sorting mode, i.e., EE switch 180 set to Entry, and that the memory is empty (all bistable devices reset to 0). To describe the memory system precisely let x=2 and w=4 so that there are four word registers and five dummy registers, as shown in the tabulation set forth previously where the invariables above were assigned the same values, and let d=3 so that each register has three data bit positions as assumed in the tabulation of registers above.

Defining the operation further, let the following numbers be placed in the Entry register in sequential order from top to bottom:

| Decimal number | Binary equivalent |
|---|---|
| 3 | 011 |
| 1 | 001 |
| 5 | 101 |
| 2 | 010 |
| 6 | 110 |
| 4 | 100 |
| 2 | 010 |
| 1 | 001 |

All Mask Bit switches 349, 350, 354 and 358 are assumed to be set to 1 until advised to the contrary so that all three bit positions will be included in the comparison. The Auxiliary Bit Mask switch 349 will be treated in the same manner by a setting to the 1 position which specifies that the Auxiliary Bits are to be used in the Comparison operation, which is normal for an Entry operation as will be recalled from the discussion earlier. The Vacancy Bit switch 348 will be continuously in the 1 position because 1's are required to indicate the availability status of the register in which the associated word resides.

For all of the cycles of the operation described above, the VB switch 348, the Auxiliary Bit Mask Control switch 349, the Data Bit 3 Mask switch 350, the Data Bit 2 Mask switch 356, and the Data Bit 1 Mask switch 358 are in the 1 position. The Entry-Exit switch 180 is set to Entry and the Forward-Backward switch 256 is set to Forward. At the beginning of the first cycle, Data Bit 3 switch 352 is set to 0, Data Bit 2 switch 356 is set to 1 and Data Bit 1 switch 360 is set to 1, the combination of settings representing the number 3 in the binary notation of 011.

With the Timing Signal switch 110 in the OFF position (the A part of the cycle), the TS OFF line 168 is superconducting and the Entry register triggers are set. In FIGURE 4a, current from source 362 passes through the gate 364, the 1 side of the VB switch 348, and the read-in 1 control conductor 368 to the negative terminal setting the trigger to 1. Current from the source 376 passes through the 1 side of the Auxiliary Bit Mask Control switch 349, through the test line 408, through a read-out 0 gate 1080, through the 0 line 412, through the read-in 0 control conductor 378, through the read-out 0 gate 382, and to the No Compare line 384 setting the Mask Control trigger to 0 and indicating that memory is not full (VB position of Forward Exit register contains a 0) which eliminates comparison on the Auxiliary Bits. Current from the source 520 flows through the 1 side of the Mask Bit 3 switch 350, through the read-in 1 control conductor 524, through the read-out 1 gate 528 to the read-out gates of the Data Bit 3 position of the Entry register setting the Mask Bit 3 trigger to 1. Current flows from the source 980, through the gate 982, through the 0 side of the Data Bit 3 switch 352, through the read-in 0 control conductor 986 to the line 570 setting the trigger to 0. In FIGURE 4b the Mask Bit 2, Data Bit 2, Mask Bit 1, and Data Bit 1 triggers are set to 1's. When the Timing Signal is turned ON (the B part of the cycle), current from the source 362 (FIGURE 4a) passes through a gate 1082, through a read-out 1 gate 1084 to an Entry 1 line 1086. Current from a source 376 passes through a gate 1088, through the read-out 0 gate 382 and to the No Compare line 384. Current from the source 520 passes through the gate 988, through read-out 1 gate 528, through a read-out 0 gate 1090 to the 0 Compare line 536. In FIGURE 4b, current from the source 1092 passes through a gate 1094, through a read-out 1 gate 1096 of Mask Bit 2, through a read-out 1 gate 1098 to a 1 compare line 2000. In line fashion, a 1 Compare like 2002 is energized.

To read the contents of the Entry register into a dummy register, one of the dummy registers must be conditioned and this requires that a Select line be made superconducting by the comparing circuits. With memory empty, all comparing circuits should indicate a Low condition. Referring to FIGURE 4d, a current source 2004 associated with the Forward Echo Exit register passes current through a read-out 0 gate 2006, to the Low line 502 bypassing all of the comparing circuits of the Forward Echo Exit register. In FIGURE 4f, current in the Low line 502 continues on the Low line since gate 2008 is resistive due to the Forward (Switch) line 272 superconducting. In FIGURE 4d, during TS OFF time the source 700 associated with Word register 1 provides current to the Low line 714 via the gate 704 through a gate 2010 in FIGURE 4f, through the read-out 0 gate 798 of the Remembering trigger, through the control conductor 796 and through a control conductor 2012 to a negative terminal. Accordingly, current in the Entry line 202 passes through a gate 2014, a gate 2016, a control conductor 2018, and a control conductor 2020 to the No Previous Select line 918. Similarly, No Previous Select current is passed through control circuits of the remaining Word registers to FIGURE 4r where a current source 2022 furnishes current through a Previous Select gate 2024 through a pair of Match gates 2026 and 2028, and through a TS OFF gate 2030 to a Select line 2032. Summarizing the condition of 1 and 0 Entry lines passing through the Backward Exit register (Dummy register 5) of FIGURES 4p and 4q, an Entry 1 line 2034 for the VB position, an entry 0 line 2036 for the AB position, an Entry 0 line 1020 for the Data Bit 3 position, an Entry 1 line 2040 for the Data Bit 2 position and an Entry 1 line 2042 for the Data Bit 1 position are superconducting. Thus, following the Select line 2032 through the Backward Exit register, current is directed through a read-in 1 control conductor 2044 setting the Data Bit 1 trigger to 1, through a read-in 1 control conductor 2046 setting the Data Bit 2 trigger to 1, through a read-in 0 control conductor 2048 setting the Data Bit 3 conductor to 0, through a read-in 0 control conductor 2050 setting the Auxiliary Bit position to 0 and through a read-in 1 control conductor 2052 setting the Vacancy Bit trigger to 1. It should be pointed out that Select lines of the other dummy registers are not made superconducting because each gives a Low indication. For example, in FIGURE 4d, current from the source 700 is directed through a read-out 0 gate 704 to the Low line 714, and in FIGURE 4f, the Low line passes through the gate 832, the control conductor 788, a control conductor 2054 and the read-in 0 control conductor 840 to a negative terminal. This current not only sets the Remembering trigger to 0 but passes current from the Entry line 202 to the No Previous Select line 918. However, the Select line is not energized. The Select lines for registers other than the Forward Exit register operate with the same result.

As explained previously, when the Timing Signal is ON, the content of the VB1 trigger is placed in the VB2 trigger and the content of EE1 trigger is transferred to the EE2 trigger.

During the A part of the second cycle, the number 1 (001) is placed in the Entry register and the number 3 (011) and its Vacancy Bit of 1 are transferred to Word register 4. The latter operation will be considered first for continuity. In FIGURE 4r, a current source 2058 provides current through a gate 2060 having a control conductor 2062 in series with the Backward line 282, through a gate 2064 having a control conductor 2066 in series with the Previous Match line 942, through a gate 2068 having a control conductor 2070 in series with the Previous Match line 899, through a gate 2072 having a control conductor 2074 in series with the No Previous Match line 838 and through a gate 2076 having a control conductor 2078 in series with the TS ON line 164 to a transfer Up line 2080. From right to left in FIGURES 4q and 4p, the Transfer Up line 2080 furnishes current to a series of control conductors 2082, 2084, 2086, 2088, 2090, 2092, 2094, 2096, 2098, 2100, which block current to the read-in cryotrons of the Backward Echo Exit register. The Transfer Up line 2080 goes up and to the right across FIGURES 4p and 4q to a line 2102 to become a current source for read-in cryotrons of Word register 4. Note that this line may also feed a line 2104 to the read-in cryotrons of the Backward Echo Exit register, but in this instance these cryotrons are blocked as stated above. Following the line 2102, current goes through a read-in 1 control conductor 2106, a gate 2107, a read-out 1 gate 2108 to set a 1 into the Data Bit 1 trigger of Word register 4; through a read-in 1 control conductor 2110, a gate 2112 and a read-out 1 gate 2114 to set a 1 into the Data Bit 2 trigger of the Word register 4; through a read-in 0 control conductor 2116, a gate 2118 and a read-out 0 gate 2120 to set the Data Bit 3 trigger to a 0; through a read-out 0 control conductor 2122, a gate 2124, and a read-in 0 control conductor 2126 to set the AB trigger to 0; and through a read-in 1 control conductor 2128, a gate 2130, and a read-out gate 2132 to a negative terminal to set the VB trigger of Word register 4 to 1. Actually, the other Transfer Up lines are energized but there is no apparent effect at this time since the remainder of the dummy registers above Dummy register 5 contains 0's.

Continuing with the A part of cycle 2, Data Bit 3 switch 352 is set to 0, Data Bit 2-switch 356 is set to 0, and Data Bit 1 switch 360 is set to 1 and the Data Bit triggers register the appropriate values.

In the B part of cycle 2, the comparison is between the number 3 contained in Word register 4 and the number 1 contained in the Entry register. Starting with the Forward Echo Exit register, the VB trigger contains a 0 and the source 2004 immediately provides a low indication on the Low line 502. The same result is obtained in Word registers 2 and 3 so that the No Previous Select line 964 entering FIGURE 4o is superconducing. In FIGURES 4m and 4n, the VB trigger is set to 1 and a gate 2136 passes current to the comparing circuits of the Auxiliary Bit where the No Compare line 384 and the right path of the AB trigger condition control conductors so that current pases through gates 2138 and 2140 to the Equal line. In the Data Bit 3 position of the Word register 4, comparison is made between a 0 stored therein and a 0 stored in the corresponding position of the Entry register. Current in the 0 Compare line 536 and a right path of the Data Bit 3 trigger direct current through a gate 2144 having a control conductor in a left path of the trigger and through a gate 2146 having a control conductor in series with the 1 Compare line to the Equal line. In the Data Bit 2 position of Word register 4 comparison is made between a 1 stored therein and a 0 stored in the corresponding position of the Entry register. Current in a 0 Compare line 2048 and a left path of the Data Bit 2 trigger of Word register 4 directs current through a gate 2150 having a control conductor in series with a No Compare line 2152, through a gate 2154 having a control conductor in series with a right path of the trigger and through a gate having a control conductor in series with the 1 Compare line 2000 to the High line. The High line passes on and enters FIGURE 4o where it provides current through a gate 2156 having a control conductor in series with the TS OFF line 170, through a control conductor 2158 having a gate 2160, through a control conductor 2162 having a gate 2164 in series with the No Previous Select line 964, through gates 2166, 2168 and 2170 (since a gate 2172 is resistive because of passage of No Previous Select current through a control conductor 2174) and through a read-in 1 control conductor 2176 to the Select line. The Select line, now energized, causes the digit 1 and its VB of 1 to be entered in Dummy register 4 in the manner previously described with reference to Dummy register 5. In FIGURE 4o, current in the No Previous Select line 964 is transferred to the Previous Select line 942 via the gate 2164, now resistive. The Remembering trigger associated with Word register 4 and Dummy register 4 is set to 1 by means of control conductor 2176 and its gate in the right path of the trigger. At the end of cycle 2, Word register 4 contains the digit 3 and a VB of 1, Dummy register 4 contains the digit 1 and a VB of 1, and the VB2 and EE2 triggers have been set.

During the A part of cycle 3 (TS OFF), the digit 1 is moved from Dummy register 4 to Word register 3, the digit 5 is placed in the Entry register, and the output of the Remembering trigger of FIGURE 4o is used to maintain the status of the Previous Select line. In FIGURE 4o, current from the High line passes through a gate 2180 having a control conductor in series with the TS ON line 164, through a read-out 1 gate 2182, through a control conductor 2184 having a gate in series with a No Previous Match line 838 and through a control conductor 2186 having a gate 2188 in series with the No Previous Select line 964 to a negative terminal. The No Previous Select current is now directed to the Previous Select line 942 via a gate 2190 to maintain this indication. It is pointed out that a change of the state of the Equal, Low and High lines does not cut off current to the read-out 1 gate 2182 since gates corresponding to 2180 are present on the TS ON line 164 to preserve this condition until the TS ON line becomes superconducting during B time. Also, in FIGURE 4o, current from a source 2192 flows through a gate 2194 having a control conductor in series with the Backward line 282, through a gate 2195 (now superconductive due to the new path for the No Previous Select current), through gates 2196 and 2198, and through a gate 2200 having a control conductor in series with the Exit (VB1) line to a Transfer Up line 2202. Current from this line passes through a series of control conductors 2204, 2206, 2208, 2210, 2212, 2214, 2216, 2218, 2220 and 2222 to block the transfer downwardly, and through a series of control conductors 2224, 2226, 2228, 2230, 2232, 2234, 2236, 2238, 2240 and 2242, through a Transfer Up line 2244, through a gate 2246 having a control conductor in series with the TS ON line 164, through a Dummy Out line 2248, through a read-in 1 control conductor 2250, a gate 2252, a read-out 1 gate 2254, through a Dummy Out line, through a read-in 0 control conductor 2256, through a gate 2258, a read-out 0 gate 2260, through a Dummy Out line, through a read-in 0 control conductor 2262, through a gate 2264, through a read-out 0 gate 2266, through a read-out 0 gate 2268, through a gate 2270, through a read-in 0 gate 2272, through a read-in 1 control conductor 2274, through a gate 2276, and through a read-out 1 gate 2278 to a negative terminal. Word register 3 no contains a VB of 1 and the binary number 1. Note that the Transfer Up lines leaving the Memory Control circuits are made superconductive by the absence of current in the Previous Select lines and in the Exit (VB1) lines so that all Transfer Up lines above the selected register are energized. Thus, all Word registers controlled thereby transfer their contents upwardly to an adjacent dummy register. The number 5 is placed in the Entry register by setting the Data Bit 3 switch 352 to 1, the Data Bit 2 switch 256 to 0 and the Data Bit 1 switch 360 to 1.

During the B part of cycle 3, the number 3 in Word register 4 and the number 1 in Word register 3 are transferred to Dummy register 4 and Dummy register 3 respectively by switching the current from the Dummy Out lines to the Dummy In lines. In FIGURE 4o for example, when the Timing Signal is ON, current from the Transfer Up line 2244 is directed through a gate 2280 having a control conductor in series with the TS OFF line 170, through a Dummy In line 2282, down and to the left through a read-out 1 gate 2284 of Word register 4, through a gate 2286, through a read-in 1 gate 2288 of Dummy register 4 through a Dummy In line, through a read-out 1 gate 2290 of Dummy register 4, through a gate 2292, through a read-in 1 gate 2294 of Dummy register 4, through a Dummy In line, through a read-out 0 gate 2296, through a gate 2298, through a read-in 0 control conductor 2300 of Data Bit 3 of Dummy register 4, through a read-in 0 control conductor 2302 of the AB position of Dummy register 4, through a gate 2304, through a read-out 0 gate 2306 of the AB position of Word register 4, through a read-out 1 gate 2308 of the VB position of Word register 4, through a gate 2310 and through a read-in 1 control conductor 2312 of the VB position of Dummy register 4 to a negative terminal. This causes the binary number 3 and its VB of 1 to be read into Dummy register 4. The binary number 1 is transferred in the same manner from Word register 3 to Dummy register 3 by a Transfer Up line 2314 and a Dummy In line 2316 leaving FIGURE 4l at the left.

Continuing with the B part of cycle 3, a comparison is made between the numbers 1, 3 and 5. In word register 3, the Data Bit 3 position immediately gives a low indication since the trigger is set to 0 (a right path 2320 superconducting) and a 1 Compare line 2322 is superconducting to direct current through an upper path 2324 of the Comparing circuit to a Low line 2326. In FIGURE 4l, current passes through a gate 2328, a control conductor 2330, a control conductor 2332 having a gate 2334 and a control conductor 2336 to a negative terminal. The gate 2334 maintains the current in the No Previous Select line 964, and the control conductor 2336 drives a gate 2338 to set the Remembering trigger to 0. In like fashion, comparison of a 0 in the Data Bit 3 position of Word register 4 with a 1 in the corresponding position of the Entry register yields a low indication on a Low line 2340 via an upper path 2342 of the Comparing circuit. The Remembering trigger of FIGURE 4o is set to 0 and the No Previous Select line leaves FIGURE 4o superconducting. In FIGURE 4r, current is passed from the source to the Select line 2032 via gates 2024 and 2030 to cause the Backward Exit register to store the binary number 5 and a VB of 1. At the end of cycle 3, Dummy register 3 is storing a 1, Dummy register 4 is storing a 3, and Dummy register 5 (Backward Exit register) is storing a 5, all in the binary notation.

During the A part of cycle 4, numbers 1, 3 and 5 are moved upwardly from dummy registers to word registers, and the digit 2 is placed in the Entry register. In FIGURE 4r, the Transfer Up line 2080 passes into circuits of FIGURES 4p and 4q to inhibit the Backward Echo Exit register up and across the top of these figures to become the line 2102 which weaves through read-in control conductors of Word register 4 and read-out gates of the Backward Exit register to transfer the contents of the latter to the former. Similarly, the Transfer Up line 2202 of FIGURE 4o inhibits Word register 4 and conditions circuits and also the Dummy Out line 2248 to place the binary number 3 and a VB of 1 in Word register 3. Also the Transfer Up line 2314 of FIGURE 4l causes the binary number 1 and its VB of 1 to be transferred from Dummy register 3 to Word register 2. At the same time, the binary number 2 is placed in the Entry register by the setting of the switches 352, 356 and 360 to 0, 1, 0 respectively.

In the B part of cycle 4, a comparison is made which results in the digit 2 entering Dummy register 3 and the digit 1 being moved from Word register 2 to Dummy register 2. Beginning at a current source 2346 in FIGURE 4g, the path taken is through gate 2348 having a control conductor in a left path of the trigger, through a gate 2350 having a control conductor in the 1 Compare line 402, through a gate 2352 having a control conductor in the left path of the DB2 trigger, through a gate 2354 having a control conductor in the 1 Compare line 532 to the Equal line, through a gate 2356 having a control conductor in series with a No Compare line 2358, through a gate 2360 having a control conductor in series with a 0 Compare line 2048 and through a gate 2362 having a control conductor in the left path of the DB2 trigger to the Low line 954. Current on the Low line enters FIGURE 4i where it maintains current in the No Previous Select line 964 and sets the Remembering trigger to 0. In FIGURE 4j, current from a source 2363 passes through a gate 2364 having a control conductor in series with a right path of the VB trigger of Word register 3, through a gate 2366 having a control conductor in the left path of the AB trigger, through a gate 2368 having a control conductor in series with the 1 Compare line 402, through a gate 2370 having a control conductor in the left path of the DB3 trigger, through a gate 2372 having a control conductor in series with the 1 Compare line 2322, through an Equal line, through a gate 2374 having a control conductor in the 0 Compare line 2048, through a gate 2376 having a control conductor in series with a right path of the DB2 trigger, through an Equal line, through a gate 2378 having a control conductor in series with a No Compare line, through a gate 2380 having a control conductor in series with a right path of the DB1 trigger and through a gate 2382 having a control conductor in series with a 1 compare line to a High line 2384 which enters FIGURE 4l. The High line 2384 switches the No Previous Select current from the line 964 to the Previous Select line 942, sets the Remembering trigger to 1, and energizes a Select line 2386 to place the contents of the Entry register in Dummy register 3 in the manner described previously. In FIGURE 4i, current from a source 2388 passes to a Transfer Up line 2390 (as described with reference to FIGURE 4o, which energizes a Dummy In line 2392 to transfer the contents of Word register 2 to Dummy register 2. At the end of cycle 4, Word register 4 contains a 5, Word register 3 contains a 3, Dummy register 3 contains a 2, and Dummy register 2 contains a 1. Additionally, each contain a VB of 1 and an AB of 0.

In the A part of cycle 5, the digit 2 in Dummy register 3 is transferred to Word register 2 by steering the current from the Dummy In line 2316 of FIGURE 4l to a Dummy Out line 2394, and the digit 1 in Dummy register 2 is transferred to Word register 1 by steering the current from the Dummy In line 2392 of FIGURE 4i to a Dummy Out line 2396. The digit 6 in binary notation is placed in the Entry register by setting the DB3 switch 352 to 1, the DB2 switch 356 to 1 and the DB1 switch 360 to 0. At the end of A time of cycle 5 the Entry register contains 6, Word register 1 contains 1, Word register 2 contains 2, Word register 3 contains 3, and Word register 4 contains 5.

During the B part of cycle 5, the usual comparison is made and since the number 6 in the Entry register is larger than any number in memory, the 6 is entered in the Backward Exit register (Dummy register 5). Word registers 1, 2, 3 and 4 provide low indications on the Low line 714 (FIGURE 4f), the Low line 954 (FIGURE 4i), the Low line 2326 (FIGURE 4l) and a Low line 2340 (FIGURE 4o) so that the No Previous Match line 964 enters FIGURE 4r superconducting. Thus, in FIGURE 4r, current is provided from the source 2022 through gates 2024, 2026, 2028, and 2030 to the Select line 2032 which conditions the Backward Exit register to store the binary equivalent of 6 and VB of 1. The Remembering triggers associated with the Low lines mentioned above are set to 0 and the Transfer Up lines 2390, 2314 and 2202 move the digit 2 from Word register 2 to Dummy register 2, the digit 3 from Word register 3 to Dummy register 3 and the digit 5 from Word register 4 to Dummy register 4, respectively. Significantly, the digit 1 is moved from Word register 1 to the Forward Exit register by the Dummy In line 810 which receives current from a source at the lower right corner of FIGURE 4f through a gate 2400, a gate 2402, the gate 808, a gate 2404, a gate 2406 and a gate 2408. The current passes through the Dummy In line 810, through a read-out 1 gate 2410 of the DB1 trigger, of Word register 1, through a read-in 1 control conductor 2412 of the DB1 trigger of the Forward Exit register, through a read-in 0 control conductor 2414 in the adjacent position, through a read-out 0 gate 2416, through a Dummy In line 2418, through a read-out 0 gate 2420, through a read-in 0 gate 2422, through a read-in 0 control conductor 2424, through a read-out 0 gate 2426, through a read-out 1 gate 2428 and through a read-in 1 control conductor 2430 to a negative terminal so that a digit 1 in the binary notation and a VB of 1 are placed in the Forward Exit register. It will be recalled from a previous description that when a 1 is entered in the VB position of the Forward Exit register, the Auxiliary Bit Mask Control trigger is used to determine when a comparision is effected using the Auxiliary Bit position.

In the A part of cycle 6, a digit 4 is placed in the Entry register, the digit 1 is transferred both to the Forward Echo Exit register and to the Exit circuits, the digit 2 is transferred from Dummy register 2 to Word register 1, the digit 3 is transferred from Word register 2 to Dummy register 2, the digit 5 is transferred from Dummy register 4 to Word register 3 and the digit 6 is transferred from Dummy register 5 to Word register 4. In FIGURE 4f, the Forward Exit Control line 654 is superconducting via gates 650 and 656 to supply current through a gate 2440 having a control conductor in series with the right path 678 of the DB1 trigger, through the control conductor 662 having a gate in series with the 0 Exit line 618, through the control conductor 664 having a control conductor in the left path of the DB2 trigger, through a gate 668 having its control conductor 574 in series with an Exit 1 line 572, through a gate 2444 having a control conductor in the left path of the DB3 trigger, through a control conductor 672 having its gate 2446 in series with the Exit 1 line 554 and through a gate 2448 having a control conductor in series with the left path of the AB trigger to a negative terminal. Accordingly, the read-out 1 coil 614 and the read-out 0 coil 604 in FIGURE 4q and the read-out 0 coil 586 and the read-out 0 coil 568 of FIGURE 4p are energized to place the digit 1 in the Exit circuits. This number is also placed in the Forward Echo Exit register by passage of current through a Transfer Up line 2450 in FIGURE 4f where current from a source 2452 passes through a gate 2454 having a control conductor in the Backward line 282, through a gate 2456 having a control conductor 772 in series with the Exit line 198, through a gate 2458 having a control conductor in the Exit (VB1) line 236, and through a gate 2460 having a control conductor in series with the TS ON line 164. The Transfer Up line 2450 passes current through a series of control conductors 2452, 2454, 2456, 2458, 2460, 2462, 2464, 2466, 2468 and 2470 and across the register to a Dummy Out line 2472 which feed a control line 2474. The line 2474 passes current through a read-in 1 control conductor 2476, a gate 2478, a read-out 1 gate 2480, a Dummy Out line, a read-in 0 control conductor 2482, a gate 2484, a read-out 0 gate 2486, a Dummy Out line, a read-in 0 line 2488, a gate 2490, a read-out 0 gate 2492, a read-out 0 gate 2494, a gate 2496, a read-in 1 control conductor 2498 and a read-out 1 gate 2500 to a negative terminal. This stores the digit 1 and a VB of 1 in the Forward Echo Exit register. The transfer from dummy registers to word registers occurs as a result of No Previous Select current flowing through the Memory Control circuits as previously explained to energize the Transfer Up line 2390 and Dummy Out line 2396 (FIGURE 4i), the Transfer Up line 2314 and Dummy Out line 2394 (FIGURE 4l), the Transfer Up line 2202 and Dummy Out line 2248 (FIGURE 4o), and the Transfer Up line 2080 in FIGURE 4r. The digit 4 in binary form is placed in the Entry register by setting the DB3 switch 352 to 1, the DB2 switch 356 to 0 and the DB1 switch to 0. At the end of the A part of cycle 6, the Entry register contains a digit 4, the Forward Echo Exit register contains a digit 1, Word register 1 contains a digit 2, Word register 2 contains a digit 3, Word register 3 contains the digit 5 and Word register 4 contains a digit 6.

During the B part of cycle 6, a dummy register is selected and the contents of the Entry register placed therein and the contents of word registers above the selected dummy register are moved upwardly into adjacent dummy registers. The 4 in the Entry register and the 5 in Word register 3 provide a high indication on the High line 2384 in FIGURE 4l, which energizes the Previous Select line 942, sets the Remembering trigger to 1, and energizes Select line 2386 to Dummy register 3. Low indications are furnished on Low lines 714 and 954 to provide No Previous Select current. The number 4 and its VB of 1 are then entered in Dummy register 3.

Returning for the moment to the A part of cycle 6, setting of the AB Mask Control switch 349 to the 1 side provided current on the Test line 408 through a read-out 1 gate 2510, through the 1 line 410, through the read-in 1 control conductor 416 and through the read-out 1 gate 388 to the read-out cryotrons of the AB trigger which is set to 0. During the B part of cycle 6, current from the source 396 of FIGURE 4a is passed through the gate 1088, through the read-out 1 gate 388 of the Mask Control trigger, through the read-out 0 gate 392 of the AB trigger to energize the 0 Compare line 400 so that the Auxiliary Bits are included in the comparison. Referring to the paragraph above where the comparison in the B part of cycle 6 was described, the Forward Echo Exit register yields a low indication on the Low line 502 which is diverted to a negative terminal by the TS ON line. However, when the TS OFF line 170 is superconducting current is provided to the 0 line 484 which goes to the read-in 0 gate 488 of the Auxiliary Bit trigger of FIGURE 4a. This is the first time that a significant digit has been placed in the Forward Echo Exit register which would influence the comparison. In subsequent cycles successive comparisons are made, and when the value in the Forward Echo Exit register is higher than the value in the Entry register, the number in the Entry register will begin a new group and have its Auxiliary Bit set to 1 via the circuits controlling the 1 line 486 in FIGURE 4f.

During the A part of cycle 7, a digit 2 is placed in the Entry register, the digit 2 in the Forward Exit register is stored in the Forward Echo Exit register and sent to the Exit circuits, and the digits 4 and 3 are moved upwardly from dummy registers into adjacent word registers in the usual way. Under the first-in, first-out rule, it is proper for the digit 2 previously stored in memory to be ejected out and for this reason the previously stored digit 2 was placed in the Forward Exit register during the B part of cycle 6.

Continuing with the B part of cycle 7, the digit 2 is sent directly to the Forward Exit register because the comparison of 2 in the Entry register with the 3 in the Word register 1 provides a high indication on the High line 730 in FIGURE 4f, which causes the Select line to the Forward Exit register to be superconducting. The numbers in Word registers 1, 2, 3 and 4 do not move because of Previous Select current.

In the A part of cycle 8, a digit 1 is placed in the Entry register and the digit 2 is placed in the Forward Echo Exit register and also sent to the Exit circuits as described previously. Then, a comparison of the 1 and the 2 provides current on the High line 504 in FIGURE 4f to the 1 line 486, which line enters FIGURE 4a and sets the AB trigger to the 1 state. Accordingly, an AB of 1 accompanies the digit 1 to Dummy register 5 where a new group is started.

It is apparent from the description above that words are ejected from memory in sequence as the sorting process continues until a new group occupies memory, and thereafter another group of words in sequence leaves memory.

Exit operation

To illustrate an Exit operation, it will be assumed that the memory is in the following state. Word register 1 contains the digit 3, Word register 2 contains the digit 4, Word register 3 contains the digit 5 and Word register 4 contains the digit 6. All words include a Vacancy Bit of 1. During the A part of this cycle, the Entry switches are in the following positions: The VB switch 348 is set to 1, the AB Mask Control switch 349 is set to 0, the Mask Bit switch 350 is set to 1, the DB3 switch 352 is set to 1, the Mask Bit switch 354 is set to 1, the DB2 switch 356 is set to 0, the Mask Bit 1 switch 358 is set to 1, the DB1 switch is set to 1, the TS switch 110 is set to OFF, the EE switch 180 is set to Exit, and the FB switch 256 is set to Forward. The Data Bit switch settings specify the digit 5, which is the information on which retrieval is based.

The VB trigger of the Entry register is set to 1 in the usual way. The Mask Control trigger is set to 0 by current from the source 376, through the read-in 0 control conductor 378 and through the read-out 0 gate 382 to the No Compare line 384. The DB triggers are set according to the switches, and corresponding Mask Bit triggers are set to 1's to provide current to the read-out cryotrons of their DB triggers. For example, during the B part of the first Exit cycle, current from the source 520 in FIGURE 4a passes through a gate 988, the read-out 1 gate 528 in the Mask Bit 3 trigger and through a read-out gate 2516 to the 1 Compare line 532. In like fashion, the 0 Compare line 2048 for the DB2 trigger and the 1 Compare line 2002 for the DB1 trigger are energized. The following chart shows the relationship of the numbers:

| Registers | DB3 | DB2 | DB1 | Decimal Value |
|---|---|---|---|---|
| Entry | 1 | 0 | 1 | 5 |
| W1 | 0 | 1 | 1 | 3 |
| W2 | 1 | 0 | 0 | 4 |
| W3 | 1 | 0 | 1 | 5 |
| W4 | 1 | 1 | 0 | 6 |

In Word register 1 (FIGURES 4d and 4e), a low indication is given in the DB3 position (FIGURE 4d) by current from the line 728 passing through the top compare path (made superconductive by current in the 1 Compare line 532 and the right path of the DB3 trigger) to the Low line 714. The Low line 714 enters FIGURE 4f where it provides current through the gate 832, the control conductor 788, the control conductor 2054, and the control conductor 840. As a result, current is passed from the Exit line 198 to the No Previous Match line 838, and the Remembering trigger is set to 0.

In Word register 2 (FIGURES 4g and 4h, a low indication is given in the DB1 position (FIGURE 4h) by current from an Equal line 2520 passing through the top path (made superconductive by current in the 1 Compare line 2002 and the right path of the DB1 trigger) to the Low line 954. The Low line operation in FIGURE 4i sets the Remembering trigger to 1 and provides current to the No Previous Match line 838, which leaves the figure at the bottom.

In Word register 3 (FIGURES 4j and 4k), an equal indication is given by passage of current from the source 2362 in FIGURE 4j through the gate 2364, through the gates 2366 and 2368 (due to No Compare and AB of 0) through a pair of gates 2522 and 2524 (due to absence of current in the 0 Compare line and right path of the DB3 trigger), through the Equal line, through a pair of gates 2526 and 2528 (due to absence of current in the left path of the DB2 trigger and the 1 Compare line), and through a pair of gates 2530 and 2532 (due to absence of current in the 0 Compare line and the right path of the DB1 trigger) to an Equal line 2534. In FIGURE 4l, the Equal line passes through gates 2536, 2538, control conductors 2540 and 2542, gates 2544, 2546 and 2548, and a control conductor 2550 to a Match line 2552. Current through the control conductor 2540 makes its gate 2554 resistive to steer current into the Previous Match line 784 leaving FIGURE 4l, and current through the control conductor 2550 sets the Remembering trigger to 1. The Match line 2552 passes through FIGURES 4j and 4k from right to left providing current through a read-out 1 gate 2558 having a control conductor in the right path of the DB1 trigger, through a control conductor 2560 having a gate 2562 in series with a 0 Entry line 2564, through a control conductor 2566 having a gate in series with the 1 Entry line 2040, through a read-out 0 gate 2568 having a control conductor in the left path of the DB2 trigger, through a read-out 1 gate 2570 having a control conductor in series with the right path 2320 of the DB3 trigger, through a control conductor 2572 having its gate 1050 in series with the 0 Entry line 2038 through a control conductor 2574 having a gate in series with the 1 Entry line 2576 and through a read-out 0 gate 2578 of the AB trigger to a negative terminal.

In Word register 4 (FIGURES 4m and 4n), a high indication is given in the DB2 position (FIGURE 4n) by current from an incoming Equal line 2580 passing through the gates 2150, 2154 and 2156 (due to the 0 Compare line 2048 and the left path of the DB2 trigger being superconducting and due to the No Compare line, the right path of the trigger and the 1 Compare line being resistive) to the High line. The High line enters FIGURE 4o and provides current through the gate 2156, the control conductors 2158 and 2162 and the gate 2172 to the negative terminal. The Remembering trigger is set to 0 and current remains in the Previous Match line 784.

In reading the contents of Word Register 3 into the Exit circuits, the Exit line 347 in FIGURE 4c is made superconductive so that current passes from the source 341 through the gate 345, through the control conductor 2602 of Data Bit 1 position and through like control conductors for Data Bit 2, Data Bit 3, and the Auxiliary Bit positions for the Entry register to a negative terminal. In the Data Bit 1 position of the Entry register, current from the source passes through a gate 2600 and into either one or the other of the Entry lines 2606 and 2564. Accordingly, in the DB1 position of Word Register 3 of FIGURE 4k, Match current from the line 2552 is diverted from the control conductor 2608 having a gate in series with the Entry 1 line 2042 and passes through the gate 2558 and the control conductor 2560. In like fashion, the Match line conditions the circuits of Word Register 3 to pass current on either the 1 or 0 Entry line in each position to enter the binary value in the Forward Exit circuits. In FIGURE 4f, the Select line 1060 is energized from a source through a gate 2782, a gate 2784 and a gate 2786. In FIGURE 4e, the Select line 1060 provides current to a read-in 1 control conductor since the Entry 1 line 2042 is superconducting, and thus a 1 is entered in the Data Bit 1 trigger of the Forward Exist register. Similarly, the contents of the other position of Word Register 3 are stored in the Forward Exit register. The remaining TS OFF operation for transferring the data from the Forward Exit register to the the Exit Circuits occurs during the next cycle in the manner described previously. Briefly, in FIGURE 4b, current is provided through the switch 360 to either one or the other of the read-in control conductors to the Exit 1 line 606 and to the Exit 0 line 619. In FIGURE 4f, the Forward Exit control line 654 is energized to provide current to FIGURE 4e through the read-out 1 gate 2440 and the control conductor 662, through the control conductor 664 and read-out 0 gate 2442, and in FIGURE 4d, through a read-out 1 gate, and Exit 0 control conductor 670 for the Data Bit 3 trigger and through the Exit 1 control conductor 2446 and the read-out 0 gate 2448 to the negative terminal 654. The result is that the Exit circuit of FIGURES 4p and 4q indicate an Auxiliary Bit of 0 by the 0 coil 568 being energized and indicate the number 5 (101) by the 1 coil 578, the 0 coil 604 and the 1 coil 614 being energized.

Assume an Exit operation as above except that the Mask bit 3 switch is set to 0. During the A part of the cycle, current from the source 520 in FIGURE 4a passes through the gate 522, through the 0 side of the switch 350, through a read-in 0 control conductor 538 and through a read-out 0 gate 542 to the No Compare line 544. During the B part of the cycle, current from the source 520 passes through the gate 988 and through the read-out 0 gate 542 to the No Compare line. Referring to the comparing circuits of the DB 3 trigger in Word register 3 (FIGURE 4j), the No Compare line 544 passes through control conductors 2610 and 2612 having gates 2614 and 2616 included in the top and bottom comparing paths. The trigger is in the 1 state making the gate 2370 resistive so that current is directed through the gates 2522 and 2524 to the Equal line. Comparison proceeds in the lower order positions to produce a match. Returning to FIGURE 4a, the 1 Entry line 1018 is energized as described in the preceding example and the Match line 2552 operating therewith provides a signal to the Exit circuits to energize the read-out 1 coil 578. Thus, the Masked Data Bit position of the match word is read out although the position was not used in the comparison.

Another Exit operation will be described only briefly to illustrate an important feature. Using the previous Exit example, set the Mask Bit 1 switch to 0 instead of the Mask Bit 3 switch. This will inhibit comparison in the lowest order (DB1) and the following comparison is made:

| Registers | Decimal Value in Register | DB3 | DB2 | Comparison |
|---|---|---|---|---|
| Entry | 5 | 1 | 0 | |
| W1 | 3 | 0 | 1 | Low. |
| W2 | 4 | 1 | 0 | Equal. |
| W3 | 5 | 1 | 0 | Do. |
| W4 | 6 | 1 | 1 | High. |

Therefore, the 4 from Word register 2 will be retrieved, since only DB3 and DB2 are specified and the 4 is in the upper of the two word registers giving an Equal indication. The comparison will be readily understood from the previous examples, and the description here will concern operation of the Equal lines 850 and 2534 for Word registers 2 and 3 respectively. Referring to FIGURE 4i, the Match line 898 is energized via gate 864, control conductors 866 and 868, gates 890, 892 and 894 and control conductor 896. The current from the No Previous Match line 838 is then transferred to the Previous Match line 784 leaving FIGURE 4i because of current passing through the control conductor 866. In FIGURE 4l, the Equal line 2534 passes current through gates 2536 and 2538, control conductors 2540 and 2542 and then the current is steered through a gate 2620 since the control conductor fed by the Previous Match line 899 makes its gate 2548 resistive. The Equal current then passes through the control conductor 2336 to a negative terminal setting the Remembering trigger to 0. The result is that the contents of Word register 2 are placed in the Exit circuits.

Reading out is nondestructive, and the Exit examples thus far have always included a VB of 1 in the Entry register so that the word extracted is preserved in memory for repeated use. With this in mind, it is apparent that when equal words exit in memory and when like associative regions are addressed as in the preceding example, only the first (uppermost) of the equal words is retrieved and that the second word is not available until the first word has been erased from memory by including a VB of 0 with the address bits placed in the Entry register.

Consider the immediately preceding example with the only change being that the VB switch is set to the 0 side. Current from the source 362 passes through the gate 364, the 0 side of the switch and through the read-in 0 control conductor 372 to the negative terminal to set the VB trigger to 0. Later, with the Timing Signal ON, current passes through the gate 1082 and through a read-out 0 gate 2622 to an Entry 0 line 2624. Further, current passes through the TS ON line 10, through the read-out 0 gate 246 of the VB1 trigger (FIGURE 4a) in the Entry register and through the read-in 0 control conductor 250 of the VB2 trigger (FIGURE 4c) to set the latter to 0. In FIGURE 4c, the Exit TS OFF line 230 is only effective to pass current through the read-out 0 gate 244 on the A part of the cycle following the Exit cycle in which the VB of 0 was entered so that the $\overline{\text{Exit}}$ ($\overline{\text{VB1}}$) line 240 is superconducting under these conditions. Thus A, B and A portions are required to complete this operation. An equal condition results from comparing the associative region of the Entry register with the associative region of Word register 2 as in the preceding example. In FIGURE 4i, the Match line 898 is superconducting and operates circuits in Word register 2 to read its contents into the Exit circuits of FIGURES 4p and 4q. Note in FIGURE 4g that the 0 Entry line 2624 is not controlled by the Match line in Word register 2 so that the VB trigger therein remains set to 1. Also, in FIGURE 4i, the Equal line 850 sets the Remembering trigger to 1 via the control conductor 896, and this provides one condition for energizing a Transfer Down line 2626.

In the previous Exit examples using a VB of 1 in each instance, a source 2628 provided current through a gate 2630 having a control conductor in series with the Backward line 282 and either through a line including gates 2632, 2634 and 2636 or through a line including a gate 2638 to a negative terminal. For a Previous Match condition, the current was directed through the gate 2638 having a control conductor in series with the No Previous Match line; for a No Previous Match condition, the current was directed through the gates 2632 and 2634 and through the gate 2636 having a control conductor in series with the No Previous Match line to a line 2640. In each instance, the Exit (VB1) line 236 was superconducting and furnished current to a control conductor 2642 making its gate 2644 resistive so that current in the line 2640 passes through a gate 2646 having a control conductor in series with the $\overline{\text{Exit}}$ ($\overline{\text{VB1}}$) line 240 to a negative terminal. In the present example, with Word register 2 matched, the VB is 0 so that the $\overline{\text{Exit (VB1)}}$ line 240 is superconducting during TS OFF time following the Exit cycle. Accordingly, current from the line 2640 passes through the gate 2644 to the Transfer Down line 2626. In FIGURE 4f, the Transfer Down line 804 is made resistive because it includes gates blocked by either the Previous Match or No Previous Match lines. Recalling that read-out is nondestructive, Dummy register 2 contains the word stored in Word register 1 and by moving the contents of Dummy register 2 into Word register 2, the latter's previous contents are deleted by reading in the digit 3 and its VB of 1. More specifically, the Transfer Down line 2626 enters FIGURE 4h and includes control conductors 2650, 2652, 2654 and 2656 and then enters FIGURE 4g and includes control conductors 2658, 2660, 2662, 2664 2666 and 2668 to block Transfer Up circuits from Word register 2 in both figures. The Transfer Down line continues from left to right through FIGURES 4g and 4h and includes control conductors 2670, 2672, 2674, 2676, 2678, 2680, 2682, 2684, 2686 and 2688 to block Transfer Up circuits to Word register 1. In FIGURE 4i, the Transfer Down lines feed the Dummy Out line 2396 via a superconductive gate 2690 having a control conductor in series with the TS ON line 164, now resistive. The Dummy Out line 2396 passes current through a read-in 1 control conductor 2692 in Word register 2, a read-out 1 gate 2694 in Dummy register 2, a read-in 1 control conductor 2696 in Word register 2, a read-out 1 gate 2698 in Dummy register 2, and in like fashion, through a read-in 0 control conductor 2700, a read-out 0 gate 2702, a read-out 0 control conductor 2704, a read-in 0 gate 2706, a read-in 1 control conductor 2708 and a read-out 1 gate 2710 to a negative terminal. The operation just described fills the gap left by a word extracted while using a VB of 0, and storage locations are made available in the upper portion of memory.

It will now be appreciated that a subsequent Exit operation in which DB3 and DB2 are addressed with 1 and 0 respectively will retrieve the digit 5 and its VB of 1 from Word register 4 since there could not be a match in Word register 2 because of its new contents.

Consider that the Auxiliary Bit Mask Control switch 349 is set to 1. With TS OFF, current from the source 376 is directed through the 1 side of the switch, through the gate 404, through a read-in 0 conductor 378, through a read-out 0 gate 382 to the No Compare line 384 to prevent comparing on an Exit operation.

Backward entry mode

The Backward Entry operation is much the same as the Forward Entry operation except that the Transfer Down lines are used instead of the Transfer Up lines and the Backward Exit register (Dummy register 5) and Backward Echo Exit register are used instead of the Forward Exit register and Forward Echo Exit register respectively. An additional exception is that in the Backward Mode, the indication of a new group of words filling memory (recall Auxiliary Bits of 1 were used in the Forward Mode) is the recognition of a 0 in the AB position of the Backward Exit register, and this indication is used to change all Auxiliary Bits except the one in the Backward Exit register to 1. Furthermore, if the switch 256 is in the Backward position, current is supplied immediately to the Backward switch line 276 in FIGURE 4c. The Forward-Backward trigger, however, stays in the Forward state until current is provided on the TS ON-Word Register 1-Vacancy Bit 1 line 268 from FIGURE 4d indicating that memory is full and sets the trigger to Backward. If the contents of the associative region of the incoming word is equal to the contents of a like region of a word in memory, the incoming word enters the register just above its equal. This is necessary in the Backward mode to preserve words having equal values in the associative region in the order in which they are received. If there are no words in memory having the same content in the associative region, the incoming word enters the dummy register just above the word register having a value in the associative region greater than the value in the same region of the incoming word. As the memory is filling up in the Backward mode, the Auxiliary Bit of the incoming word is set to 1.

When the memory becomes full, the FB trigger is set to Backward as mentioned above so that upon entry of the next word, the word with the largest value in the associative region is transferred to the Backward Exit register. The ejected word is either the incoming word or the word occupying the bottom word register. If the latter is true, then the incoming word enters the dummy register above the word register containing a value in the associative region equal to or greater than the value in the associative region of the incoming word. The contents of this dummy register and all dummy registers below are shifted downwardly to adjacent word registers to fill up the bottom word register whose contents were transferred to the Backward Exit register. The word passing to the Exit circuits is also transferred to the Backward Echo Exit register. The contents of the associative region is compared with the content of the Backward Echo Exit register to determine if the incoming word should start a new group. If the value of the associative region of the incoming word is greater than the value of a like region in the Backward Echo Exit register, the incoming word falls outside the sequence of words in memory, its Auxiliary Bit is set to 0, and it starts a new group in memory at the top word register. Further entries which fall outside the old group merge into the new group. When the new group fills memory and one of its words is ejected, the Auxiliary Bit of the Backward Exit register being 0 indicates that a new group is to be started and, accordingly, the Auxiliary Bits in the other registers are set to 1.

Following the Backward Switch line 276 from FIGURE 4c into FIGURE 4f, it includes control conductors 2720, 2722 and 2724, each having a gate in series with a one of the Equal, Low and High lines 500, 502 and 504 respectively. These gates divert the current in the superconducting one of the Equal, Low and High lines to a negative terminal, thus rendering the comparing circuits for the Forward Echo Exit register ineffective from the time the FB switch is set to Backward. Continuing with the Backward Switch line 276 in FIGURE 4f, it includes the control conductor 974 having a gate 742 in series with the Equal line 728. When resistive, the gate 742 directs Equal current to the High line and through the gate 842 and other circuits described previously so that a word having a value in the associated region equal to that of a word in memory is placed above the latter. Similar circuits are controlled by the Backward Switch lines in FIGURES 4i ,4l and 4o. In FIGURE 4r, the line passes current through control conductors 2728, 2730 and 2732 having gates for preventing the current on a one of the Equal, Low and High lines 510, 512 and 514 respectively from passing to the negative terminal. This makes the comparison circuits of the Backward Echo Exit register effective when the switch is set to Backward.

In the Backward Mode before the memory is full, incoming words are provided with an Auxiliary Bit of 1. In FIGURES 4p and 4q, the Backward Echo Exit register is vacant (contains all 0's), and the VB trigger having its right path superconducting leaves a gate 2732 in the High line superconductive. Current from a source 2734 passes through the gate 2732 to the High line 514, which goes to FIGURE 4r. Thus, it provides current to the 1 set Auxiliary Bit line 498 via gates 2736 and 2738. In FIGURE 4a, the line 498 sets the AB trigger to 1 and this value is stored in the appropriate register with the incoming word in the Entry register.

In FIGURE 4d, when the VB trigger of Word register 1 contains a 1, current from the TS ON line 162 passes through a gate to the line 268 which goes to FIGURE 4c. There, with the switch set to Backward, current passes through the gate 266 and the control conductor 286 to a negative terminal setting the trigger to 1 (Backward state). The Backward (trigger) line 282 is now superconducting and conditions the control conductor 296 to make the gate 302 resistive. Accordingly, current from the source 298 passes through the gate 300, the gate 336, and the gate 340 (TS OFF) to supply the TS OFF-Entry Backward line 342. In FIGURE 4p, the line 342 provides current to the negative terminal via the gate 450 when the AB trigger is set to 1, but when the AB trigger is set to 0 current passes through the gate 456 and control conductors 458, 460, 462, 464, 466, 468, 470 and 472 to a negative terminal to set each of the AB triggers to the 1 state except for the AB trigger in the Backward Exit register.

The Backward (trigger) line 282 originating in FIGURE 4c provides current to the control conductor 630 to block the Forward Exit Control line 654; provides current to a control conductor 2740 to block the path to the Select line used during an Exit operation; provides current to a control conductor 2742 to block the Transfer Up line 2450; provides current to a control conductor 636 to block the Dummy In line 810; provides current to a control conductor 2744 to furnish current for a path to the Transfer Down line 2626; provides current to a control conductor 2746 to block a path (used for an Exit operation) feeding the Transfer Down line 2626; provides current through a control conductor 2748 to block the Transfer Up line 2390; provides current through a control conductor 2750 to steer current toward a Transfer Down line 2752; provides current through a control conductor 2754 to block current to the Transfer Up line 2314; provides current through a control conductor 2756 to steer current toward a Transfer Down line 2750; provides current through a control conductor 2760 to block current to a path (used for an Exit operation) feeding the Transfer Down line 2750; provides current through a control conductor 2762 to block current to the Transfer Up line 2202; provides current through the control conductor 632 to steer current into the Backward Exit Control line 690; provides current through a control conductor 2764 to steer current toward a Dummy In line 2766; and provides current through the control conductor 2062 to steer current toward a Transfer Down line 2768 to a negative terminal.

Referring now to FIGURE 4p, assume that the Backward Echo Exit register contains a word having a VB of 1, current from the source 2734 is directed through a gate 2770 having a control conductor in series with the right path of the VB trigger to the comparing circuits. Assuming that the DB 3 trigger is set to 0 and 1 Compare line 2322 is superconducting, the top path of the comparing circuits directs current to the Low line 512. In FIGURE 4r, the Low line passes current through a gate 2772, through a gate 2774 (TS OFF time), through a 0 Set Auxiliary Bit-Entry Register line 496 which goes to FIGURE 4a, and through the read-in 0 control conductor 488 to a negative terminal. Thus, for a low condition of the Backward Echo Exit register the AB of the incoming word is set to 0.

No match indicator

In FIGURE 4r, a No Match Indicator coil 2780 is energized by current from the No Previous Match line 838 during an Exit operation. Therefore, if the word addressed is not present in memory, the fact is positively indicated. Without such a device, the word could be repeatedly addressed and much time consumed unnecessarily. The indication may be used in the computer to alter the program in a suitable manner.

General

A feature is included to insure that the gap in memory is closed when a word has been extracted from memory using a VB of 0. Referring to FIGURE 4i, it will be remembered that the Transfer Down line 2626 was energized to condition circuits for placing the contents of Dummy register 2 in Word register 2 and further to condition circuits to prevent a transfer from Dummy register 2 to word register 1. The Transfer Down line entering FIGURE 4i from FIGURE 4h feeds Dummy In line 2392 and Dummy Out line 2396 so during TS ON time (B part of the Exit cycle), the line 164 furnishes current to a control conductor which makes the gate 2690 resistive. Current from the Transfer Down line is steered into the Dummy In line 2392 which transfers the contents of Word register 1 into Dummy register 2. Thus, if the image of the word is not present in Dummy register 2, as could be the case, the proper word is entered in Dummy register 2 for transfer to Word register 2 during the following TS OFF time when the Dummy Out line 2396 is energized.

Also, on an Exit operation, the word in the Entry register is placed in the Forward Exit register. In FIGURE 4f, the Select line is energized by current from a source passing through a gate 2782, a gate 2784, and a gate 2786, superconducting when the TS is ON. The Select line conditions read-in cryotrons in the triggers of the Forward Exit register to accept the contents of the match register from the Entry lines in the manner described before. In FIGURE 4f, current is provided from the source 2452 through a gate 2454, through a gate having a control conductor in series with the Entry line 202, through a gate having a control conductor in series with the Exit (Vacancy Bit 1) line 236 and through a gate having a control conductor in series with the TS ON line 164 to the Transfer Down line 804. The Transfer Down line passes through the circuits of FIGURES 4d and 4e to transfer the contents of the Forward Exit register into Word Register 1. Note especially that the control conductors 2468 and 2470 of the VB position of the Forward Exit register are not energized, and if an Exit operation is performed with a VB of 0, the 0 is transferred from the Forward Exit register to Word Register 1 so that Word Register 1 becomes available.

The overflow or ejection operation has been described, but it should be pointed out that an occasion may arise when it is desirable to clear memory by the passage of the data stored therein to the Exit circuits. One way of so doing is to enter successively all 1's which will give either an equal or a low indication and press the data upwardly and out to the Exit circuits in the Forward mode. Entering all 0's would perform the same function in the Backward mode. Still another method of clearing memory is to set aside the highest order bit for this purpose. When a succession of 1's are entered in that position, all words in memory will be low with respect to the incoming dummy word and ejection will result.

It may be useful for some applications to enter words having Vacancy Bits of 0. The words are entered in the normal way because the Vacancy Bits are not included in the comparison which selects a location in memory. However, in attempting to retrieve a stored word having a VB of 0 by an Exit operation, a low indication is given on the Low line of the register in which the addressed word resides. Referring to FIGURE 4d, if the VB trigger is in the 0 state, the gate 702 is resistive and current is diverted to the Low line 714 which bypasses the comparing circuits. Accordingly, the No Match Indicator 2780 is energized. In this way, words in memory may be placed in one of two groups, those which may be retrieved by an Overflow operation and those which may be retrieved either by overflow or by an Exit operation.

Throughout the description where the term "current" is used, it will be understood that control current of the proper magnitude is meant. It will be appreciated that a resistive gate is not entirely so and the small current flowing therethrough may be ignored.

It will be noted that the comparison circuits are energized during A and B times since there are two paths supplying current thereto. One path is through the switch when the Timing Signal is ON and the other is directly from the source. However, movement of words in memory occurs during both parts of the cycle so it is when the stable condition is achieved that the output of the comparison circuits are used in the Memory Control circuits. Near the end of A time stability is assured so that in B time the comparison outputs are used for Match or Select. In the case of the latch described before, it will be apparent from an examination of the read-out cryotrons of the Remembering trigger that regardless of the condition of the Equal, Low and High lines, the TS OFF line diverts the current present on at least one of these lines to the read-out pair of cryotrons. The comparison operation may be thought of as occurring during B time.

While the inevntion has been particularly shown and described with reference to a preferred embodiment thereof, it will be understood by those skilled in the art that the foregoing and other changes in form and details may be made therein without departing from the spirit and scope of the invention.

What is claimed is:

1. In a data processing system, apparatus comprising storage means having a plurality of storage locations, each location for storing signals representing a unit of information, control means for conditioning said storage means to store signals representing units of information in said storage locations in a predetermined order based upon an assignment of rank to each unit in accordance with the information content in a portion of the unit, and retrieval means operable in response to said control means for suucessively extracting signals representing a unit of information from said storage means in the predetermined order.

2. In a data processing system, apparatus comprising storage means having a plurality of storage locations, each location for storing signals representing a unit of information, control means including comparing circuits for conditioning said storage means to store signals representing units of information in said storage locations with associative regions of said units arranged in a predetermined order and retrieval means operably associated with said storage means and said comparing circuits for extracting successively units of information represented by signals from said storage means in the predetermined order arranged according to associative region of the units of information.

3. In a data processing system, apparatus comprising storage means having a plurality of storage locations, each location for storing signals representing a unit of information, entry means providing signals representing a unit of information, means for comparing signals in a selected portion of said storage locations with signals in a like portion of the unit of information in said entry means, means for conditioning said storage means to store signals representing units of information in said storage locations and responsive to said comparing means for arranging storage order of said units of information in the sequence determined by signals in the selected portion of said storage locations, means conditioned by said comparing means for extracting the signals representing units of information in said storage means on the basis of a unique configuration of signals in any selected portion of the examined units of information and ejection means conditioned by said comparing means when the capacity of the storage means is exceeded for ejecting signals representing units of information in sequence by the content of the selected portion.

4. In a data processing system, apparatus comprising storage means having a plurality of storage locations, each location for storing signals representing a unit of information, entry means providing signals representing a unit of information, means for comparing signals in a selected portion of said storage locations with signals in said entry means, means for conditioning said storage means to store signals representing units of information in said storage locations and responsive to said comparing means for arranging storage of said units of information in the sequence determined by signals in the selected portion of said storage locations, and ejection means conditioned by said comparing means for ejecting signals representing units of information in sequential order by content of the selected portion.

5. In a data processing system, apparatus comprising storage means having a plurality of storage locations, each location for storing signals representing a unit of information, entry means providing signals representing a unit of information, means for comparing signals in a selected portion of said storage locations with signals in a region of the word in said entry means, and means for conditioning said storage means to store signals representing units of information in said storage locations and responsive to said comparing means for arranging storage of said units of information in the sequence determined by signals in the selected portion of said storage locations.

6. In a data processing system, apparatus comprising storage means having a plurality of storage locations, each location for storing signals representing a unit of information, addressing means storing signals associated with a selected region of a plurality of units of information which have like signal characteristics in said selected region, means for comparing signals in said selected region of said storage locations with corresponding signals in said addressing means and indicating a match with one of said plurality of units of information, and means conditioned by said comparing means when a match is indicated for extracting the signals representing the matched unit of information from said storage means.

7. The apparatus of claim 6 wherein the comparing means is adapted to indicate match with the one of said plurality of units of information first stored in said storage means.

8. In a data processing system, apparatus comprising storage means having a plurality of storage locations, each location for storing signals representing a unit of information, addressing means providing signals associated with a selected region of units of information in said storage means, which units have like signal characteristics in said region which bear a predtermined relationship to the signals provided by the addressing means, means for analyzing signals in said selected region of said storage locations and corresponding signals in said addressing means and indicating that the predetermined relationship exists between signals from one of said units of information and the signals from said addressing means, means conditioned by said analyzing means when the predtermined relationship is indicated for extracting the signals representing the one unit of information from said storage means, and means selectively conditioned by said addressing means for deleting the signals representing the extracted unit of information.

9. In a data processing system, apparatus comprising storage means having a plurality of storage locations, each location for storing signals representing a unit of information, addressing means providing signals associated with a selected region of units of information is said storage means, which units have like signal characteristics and bear a predetermined relationship to the signals provided by the addressing means, means for analyzing signals in said selected region of said storage locations and corresponding signals in said addressing means and indicating that the predetermined relationship exists between signals from one of said units of information and the signals from said addressing means, and means conditioned by said analyzing means when the predetermined relationship is indicated for extracting the signals representing the one unit of information from said storage means.

10. In a data processing system, apparatus comprising storage means having a plurality of storage locations, each location storing signals representing a unit of information, selection means for conditioning said storage means to store signals representing units of data in said storage locations, retrieval means for examining signals of a selected portion of the units of information and extracting signals representing a unit of information from said storage means on the basis of the content of the selected portion of the examined units of information, means storing the image of the signals representing the unit of information previously extracted from said storage device and means operating said selection means for comparing the signals representing the unit of information to be entered in said storage device with signals representing the units of information in said storage means and signals representing the image of the previously ertracted unit of information.

11. In a data processing system, apparatus comprising storage means having a plurality of word location, said locations storing signals representing words and the words being arranged in sequential order according to a selected portion of the words, entry means coupled to said storage means and storing signals representing incoming words, exit means coupled to said storage means and storing signals representing a word previously extracted from said storage means, means for comparing signals in the selected portion of said word locations with signals in corresponding regions in said entry means and exit means, and control means responsive to said comparing means for selectively transferring signals representing the word from said entry means to said exit means when the incoming word follows the previously extracted word in sequential order and from said entry means to said storage means when said incoming word is in sequential order with the selected portions of words in said storage means, said control means adapted to merge the incoming word with the words in said storage means as determined by signals in the selected portion of the words and transfer sigals representing a word at the beginning of the sequence of words in said storage means to said exit means.

12. Merging apparatus comprising an array of principal storage registers, intermediate storage registers interspersed with said principal storage registers, means coupling adjacent registers for the transfer of signals therebetween, means for storing signals representing units of data in said registers, entry means coupled to said intermediate storage registers for providing signals representing data stored in said entry means, comparing means means and selected signals stored in said principal storage registers for selecting a one of said intermediate registers and operating said storing means to place the data represented by the selected signals in said entry means in sequence with said data represented by selected signals in said registers.

13. In a memory system, apparatus comprising an array of storage devices, each comprising first and second storage locations coupled together for the transfer of signals representing words therebetween, means coupling adjacent storage devices for the transfer of signals therebetween, entry means coupled to said first storage locations providing signals representing a word therein and providing signals representing data in a region of the word in said entry means, comparing means controlled jointly by the signals representing data in the selected region of the word in said entry means and signals representing data in like regions of the words stored in said second storage locations for storing the signals representing a word from the entry means in a one of said first storage locations so that signals representing the data in the region of the word from the entry means is in sequential order with data in like regions of words in said second locations.

14. In a memory system, apparatus comprising an array of storage devices, each comprising first and second storage locations coupled together for the transfer of signals representing words therebetween, means coupling adjacent storage devices for the transfer of signals therebetween, entry means coupled to said first storage locations providing signals representing a word therein and providing signals representing data in a region of the word in said entry means in response to instruction signals which define the region, and comparing means controlled jointly by the signals representing data in the selected region of the word in said entry means and signals representing data in like regions of the words stored in said second storage locations for storing the signals representing a word from the entry means in a one of said first storage locations which places signals representing the data in the region of the word from the entry means in sequential order with data in like regions of words in said second locations.

15. In a data processing system, apparatus comprising storage means having a plurality of storage locations, each location for storing signals representing a unit of information and coupled to adjacently positioned locations for transfer of signals therebetween, addressing means storing signals associated with a particular region of units of information which have like signal characteristics, means for comparing signals in said particular region of said storage locations with corresponding signals in said addressing means and indicating a match with one of said units of information, means conditioned by said comparing means when a match is indicated for extracting the signals representing the matched unit of information from said storage means and for defining two groups of words with respect to the matched word, and means selectively conditioned by said addressing mean for transferring jointly the signals representing words in one of the groups into adjacent storage locations so that the storage location from which the word was extracted receives another word and consecutive storage locations contain signals representing units of information.

16. In a data processing system, apparatus comprising storage means having a plurality of storage locations, each location for storing signals representing a unit of information and coupled to adjacently positioned locations for transfer of signals therebetween, means storing signals representing units of information in said storage means, addressing means providing signals associated with a particular region of units of information which have like signal characteristics, means for comparing signals in said particular region of said storage locations with corresponding signals in said addressing means and indicating a match with one of said units of information, means conditioned by said comparing means when a match is indicated for extracting the signals representing the matched unit of information from said storage means and for defining a lower order group and a higher order group with respect to the latched word, and means selectively conditioned by said addressing means for transferring jointly the signals representing words of the lower order group into adjacent storage locations so that the storage location from which the word was extracted receives a lower order word and consecutive storage locations are storing signals representing units of information.

17. Merging apparatus comprising an array of principal storage registers, intermediate storage registers interspersed with said principal storage registers, means coupling adjacent registers for the transfer of signals therebetween, means for storing signals representing units of data in said registers, entry means coupled to said intermediate storage registers for providing signals representing data stored therein, exit means coupled to said array for receiving signals representing data from said array comparing means controlled jointly by said signals from said entry means and signals stored in said principal storage registers for selecting a one of said intermediate registers and operating said storing means to place the data represented by said signals in said entry means in sequence with said data in said registers, and means controlled by said coupling means for transferring signals representing the low word of the sequence to said exit means.

18. In a data processing system, apparatus comprising storage means having a plurality of word locations, said locations storing signals representing words and the words being arranged in sequential order according to a selected portion of the words, entry means coupled to said storage means and providing signals representing an incoming word, exit means coupled to said storage means for passage of signals representing a word extracted from said storage means, means for comparing signals in the selected portion of said word locations with signals in corresponding regions in said entry means, and control means responsive to said comparing means for selectively transferring signals representing the word from said entry means to said storage means when said incoming word is in sequential order with the selected portions of words in said storage means, said control means adapted to merge the incoming word with the words in said storage means as determined by signals in the selected portion of the words coincidentally with the transfer of signals representing a word at the beginning of the sequence of words in said storage means to said exit means.

19. In a data processing system, apparatus comprising storage means having a plurality of storage locations, each location for storing signals representing a unit of information, entry means providing signals representing a unit of information, means for comparing signals in a selected portion of said storage locations with signals in said entry means, means for conditioning said storage means to store signals representing units of information in said storage locations and responsive to said comparing means for arranging storage of said units of information in the sequence determined by signals in the selected portion of said storage locations, means conditioned by said comparing means for extracting the signals representing units of information in said storage means on the basis of a unique configuration of signals in the selected portion of the examined units of information, and ejection means conditioned by said comparing means for ejecting signals representing a unit of information selectively from the low order and the high order of the sequence.

20. In a data processing system, apparatus comprising storage means having a plurality of storage locations, each location for storing signals representing a unit of information, entry means storing signals representing a unit of information, means for comparing signals in a selected portion of said storage locations with signals in said entry means, means for conditioning said storage means to store signals representing units of information in said storage locations and responsive to said comparing means for arranging storage of said units of information in the sequence determined by signals in the selected portion of said storage locations, and selectively operable ejection means conditioned by said comparing means when the capacity of the storage means is exceeded and the ejection means is in one mode for ejecting signals representing a unit of information from the low order of the sequence and when the ejection means is in the other mode for ejecting signals representing a unit of information from the high order to the sequence.

21. In a data processing system, apparatus comprising storage means having a plurality of word locations, said locations storing signals representing words and the words arranged in sequential order according to a selected portion of the words, entry means coupled to said storage means and storing signals representing an incoming word, exit means coupled to said storage means and storing signals representing a word previously extracted from said storage means, means for comparing signals in the selected portion of said word locations with signals in corresponding regions in said entry means and exit means, and control means responsive to said comparing means for selectively transferring signals representing the word from said entry means to said exit means when the incoming word follows the previously extracted word in sequential order and from said entry means to said storage means when said incoming word is in sequential order with the selected portions of words in said storage means, said control means adapted to merge the incoming word with the words in said storage means as determined by signals in the selected portion of the words and transfer signals representing a word at the end of the sequence of words in said storage means to said exit means.

22. In a data processing system, apparatus comprising storage means having a plurality of word locations, said locations storing signals representing words and the words arranged in sequential order according to a selected portion of the words, entry means coupled to said storage means and storing signals representing an incoming word, exit means coupled to said storage means and storing signals representing a word previously extracted from said storage means, means for comparing signals in the selected portion of the word locations with signals in corresponding regions of the word in said entry means and said exit means, and control means responsive to said comparing means for selectively transferring signals representing the incoming word from said entry means to said exit means when the selected portion of the incoming word follows the previously extracted word in sequential order and for selectively transferring signals representing the incoming word from said entry means to said storage means and when the selected portion of the incoming word is in sequential order with the selected portion of the words in said storage means merged therewith and when the selected portion of the incoming word is within the sequence of ejected words placed at the high order end of the sequence and the inoming word provided with a signal which specifies the word to be of higher order than any word in the sequence in the storing means and to transfer signals representing a word at the low order end of the sequence of words in said storage means to said exit means.

23. In a data processing system, apparatus comprising storage means having a plurality of word locations, said locations storing signals representing words and the words arranged in sequential order in a first group according to a selected portion of the words, entry means coupled to said storage means and storing signals representing an incoming word, exit means coupled to said storage means and storing signals representing a word previously extracted from said storage means, means for comparing signals in the selected portion of the word locations with signals in corresponding regions of the word in said entry means and said exit means, and control means responsive to said comparing means for selectivity transferring signals representing the word from said entry means to said exit means when the selected portion of the incoming word follows the previously extracted word in sequential order and for selectively transferring signals representing the incoming word from said entry means to said storage means and when the selected portion of the incoming word is in ssequential order with the selected portion of the words in the first group in said storage means to be merged therewith and when the selected portion of the incoming word is within the sequence of ejected words placed at the high order end of the sequence provided with a signal which specifies the word to be of higher order than the word of the first group in the storage means and to transfer signals representing a word at the low end of the first group of words in said storage means to said exit means.

24. In a data processing system, apparatus comprising storage means having a plurality of storage locations, each location for storing signals representing a unit of information and a retrieval signal, entry means storing signals representing a unit of information, means for comparing signals in a selected portion of said storage locations with signals in said entary means, means for conditioning said storage means to store signals representing unit of information and to store selectively a retieval signal in said storage locations and responsive to said comparing means for arranging storage of said units of information in the sequence determined by signals in the selected portion of said storage locations, means conditioned by said comparing means for extracting the signals representing units of information from locations in said storage having retrieval signals on the basis of a unique configuration of signals in the selected portion of the examined units of information, and ejection means conditioned by said comparing means when the capacity of the storage means is exceeded for ejecting signals representing units of information in sequential order.

25. In a data processing system, apparatus comprising storage means having a plurality of storage locations, each location for storing signals representing first and second classes of units of information, entry means storing signals representing a one of the unit of information, means for comparing signals in a selected portion of said storage locations with signals in a like portion of the unit of information in said entry means, means for conditioning said storage means to store signals representing units of information in said storage locations and responsive to said comparing means for arranging storage of said units of information in the sequence determined by signals in the selected portion of said storage locations, means conditioned by said comparing means for extracting the signals representing units of information of the first class from said storage means on the basis of a unique configuration of signals in the selected portion of the examined units of information, and ejection means conditioned by said comparing means when the capacity of the storage means is exceeded for ejecting signals representing units of information of the first and second classes.

26. In a data processing system, apparatus comprising storage means having a plurality of storage locations, each location for storing signals representing a unit of information, entry means storing signals representing a unit of information, means for comparing signals in a first selected portion of said storage locations with signals in a like portion of the word in said entry means, means for conditioning said storage means to store signals representing units of information in said storage locations and responsive to said comparing means for arranging storage of said units of information in the sequence determined by signals in the first selected portion of said storage locations, means conditioned by said comparing means for extracting the signals representing units of information in said storage means on the basis of a unique configuration of signals in a second selected portion of the examined units of information, and ejection means conditioned by said comparing means for ejecting signals representing a unit of information.

27. In a data processing system, apparatus comprising storage means having a plurality of storage locations, each location for storing signals representing a unit of information, entry means storing signals representing a unit of information, means for comparing signals in a first selected portion of said storage locations with signals in a like portion of the word in said entry means, means for conditioning said storage means to store signals representing units of information in said storage locations and responsive to said comparing means for arranging storage of said units of information in the sequence determined by signals in the first selected portion of said storage locations, means conditioned by said comparing means for extracting the signals representing units of information in said storage means on the basis of a unique configuration on signals in a second selected portion of the examined units of information, and ejection means conditioned by said comparing means when the capacity of the storage means is exceeded for ejecting signals representing units of information in sequential order by the first selected portion.

28. In a data processing system, apparatus comprising storage means having a plurality of storage locations, each location for storing signals representing a unit of information, addressing means storing signals associated with a selected region of two units of information in first and second classes which have like signal characteristics, means for simultaneously comparing signals in said selected region of said storage locations with corresponding signals in said addressing means and indicating a match with the information in the first class, and means conditioned by said comparing means when a match is indicated for extracting the signals representing the matched unit of information from said storage means.

29. In a data processing system, apparatus comprising storage means having a plurality of storage locations, each location storing signals representing a unit of information and adapted to be conditioned to record and read out a unit of information, means for supplying signals representing predetermined data, and further means for simultaneously comparing information in said locations for said predetermined data and means for conditioning locations storing said predetermined data for transfer of a single unit of information relative thereto.

30. In a data processing system, apparatus comprising storage means having a plurality of storage locations, each location storing signals representing a unit of information and adapted to be conditioned to record and read out a unit of information, addressing means providing signals associated with a selected portion of a unit of information, means for simultaneously comparing signals provided by said addressing means with corresponding signals in said plurality of storage locations and for indicating a match, and means for conditioning locations at which a match is indicated in response to said comparing means for transfer of a single unit of information relative thereto.

31. An associative memory comprising storage means for storing words in the form of tag digits identifying each of said words and data digits associated therewith, means for comparing argument tag digits introduced to said storage means with the tag digits of each of said stored words in said storage means, individual read-out circuits associated with each of said words, means responsive to a match between said argument tag digits and the tag digits of one of said stored words to establish a read-out path through the individual read-out circuit associated with said one word for the data digits thereof and to inhibit the remainder of said read-out circuits.

32. An associative memory system comprising a storage means for storing words in the form of tag digits identifying each word and data digits associated with each word, read-out circuits individual to each of said stored words, means to compare argument tag digits introduced to said storage means with the tag digits of each of said stored words in said storage means, means responsive to a match between said argument tag digits and one of said stored words for providing a match signal to said individual read-out circuit associated with said one word and a no-match signal to the remaining individual read-out circuits, means responsive to said signals to establish a read-out path for the data digits associated with one word through said individual read-out circuit associated with said one word and to inhibit the remaining individual read-out circuits.

33. In an associative memory of the kind in which a group of data bits stored in register is identified by a tag portion of the group, and in which the tag of a group of data bits is to be retrieved from memory is compared with the tag of the group stored therein, the data bits being representable as binary ones or zeros alternatively, a control device comprising: a first pair of current gates each gate effective to block current in dependence upon a tag bit one being stored in said register; a second pair of current gates, each effective to block current in dependence upon a tag bit zero being stored in said register; a third pair of current gates, each gate effective to block current in dependence upon a tag bit one in the desired group, a first one of said third pair being connected in series with a first one of said first pair and a second one of said third pair being connected in series with a first one in said second pair; a fourth pair of current gates, each gate responsive to a tag bit zero in the desired group, a first one of said fourth pair being connected in series with a second one of said first pair and a second one of said fourth pair being connected in series with a second one of said second pair; read-out means concurrently responsive to current flow through said first one of said first pair and said first one of said third pair or to said second one of said second pair and said second one of said fourth pair to read data out of said register; reading preventing means concurrently responsive to current through said second one of said first pair and said second one of said fourth pair or said first one of said second pair and said second one of said fourth pair for preventing the readout of data from said register; and a current source for applying current to all of said gates.

34. In an associative memory of the kind in which groups of data bits may be stored in a selected one of a sequence of registers, a control device for selecting the one of said registers within which data is to be stored, comprising: a vacancy testing means for each of said registers, each including a vacancy designating means and an occupancy designating means alternatively operative in dependence on whether the corresponding register is vacant or occupied, respectively; a plurality of select means, one for each of said registers, each operable in response to said vacancy indicating means to store data in the corresponding register; a plurality of no-select means, one for each of said registers, each operable in response to said occupancy indicating means to prevent the storage of data in the corresponding register; a plurality of previous-select means, one for each of said registers, each operable to prevent the storage of data in the corresponding register; a plurality of first connection means, one for each of said registers subsequent to a first register in said sequence, each effective to operate the previous select means of a corresponding subsequent register in response to the select means corresponding to the register antecedent thereto in said sequence; a plurality of second connection means, one for each of said subsequent registers, each effective in response to the no-select means of the register antecedent thereto in said sequence to operate the select means or the no-select means of the corresponding subsequent register, alternatively, in dependence upon the corresponding vacancy indicating means or occupancy indicating means being operative, respectively; a storage preventing means for operating the previous select means of the first register in said sequence; and a selection means for operating the select means or the no-select means of said first register, alternatively, in dependence upon the corresponding vacancy indicating means or occupancy indicating means being operative, respectively.

35. In an associative memory of the kind in which groups of data bits may be stored in a selected one of a sequence of registers, a control device for selecting the one of said registers within which data is to be stored, comprising: a vacancy control means for each of said registers, each including alternatively operable vacancy designating means and occupancy designating means, each also including means for selectively rendering said vacancy designating or said occupancy designating means operable in dependence on whether the corresponding register is vacant or occupied, respectively; a plurality of select means, one for each of said registers, each operable in response to said vacancy designating means to store data in the corresponding register; a plurality of no-select means, one for each of said registers, each operable in response to said occupancy designating means to prevent the storage of data in the corresponding register; a plurality of externally operable previous select means, one for each of said registers, each operable to prevent the storage of data in the corresponding register; a plurality of first connection means, one for each of said registers subsequent to a first register in said sequence, each effective to operate the previous select means of a corresponding subsequent register in response to the select means or the previous select means, alternatively, of the register antecedent thereto in said sequence; a plurality of second connection means, one for each of said subsequent registers; each responsive to the no-select means of the register antecedent thereto in said sequence to alternatively operate the select means or the no-select means of the corresponding subsequent register in dependence upon whether said subsequent register is vacant or occupied, respectively; a storage preventing means for operating the previous-select means of the first register in said sequence; and a selection means for alternatively operating the select means or the no-select means of said first register in dependence upon whether said first register is vacant or occupied, respectively.

36. A storage apparatus of the type having a plurality of registers arranged in a sequence, comprising: comparing means for comparing a portion of the data stored in a first one of said registers with a like portion of a data group to be retrieved; indicating means including alternatively operable match indicating means and mismatch indicating means; means to operate said match indicating means or said mismatch indication means in response to the related one of said comparing means in dependence upon whether said first register contains comparable data or not, respectively; means operable simultaneously with said first register comparing means and responsive to said mismatch indicating means for comparing the data of the register next in said sequence; and read-out means responsive to said match indicating means for retrieving data from said first register.

37. A storage apparatus of the type having a plurality of registers arranged in a sequence, comprising: comparing means for comparing a portion of the data stored in a first one of said registers with a like portion of a data group to be retrieved, said comparing means including match indicating means and mismatch indicating means alternatively operable in dependence upon whether the portion of the desired group and the portion of the data stored in said first register are identical or not, respectively; means operable simultaneously with said first register comparing means and responsive to said mismatch indicating means for comparing the data of the register next in said sequence; and read-out means responsive to said match indicating means for retrieving data from said first register.

38. A storage apparatus of the type having a plurality of registers arranged in a sequence, comprising: a plurality of simultaneously operable comparing means, one for each of said registers, each for comparing a portion of the data stored in the corresponding one of said registers with a like portion of a data group to be retrieved, each of said comparing means including match indicating means and mismatch indicating means alternatively operable in dependence upon whether the portion of the desired group and the portion of the data stored in said corresponding register are identical or not, respectively; and a plurality of readout control means, one for each of said registers, each responsive to the corresponding one of said match indicating means for retrieving data from said corresponding register and for preventing retrieval of data from ones of said registers subsequent thereto in said sequence.

39. A storage apparatus of the type having a plurality of registers arranged in a sequence, comprising: a plurality of simultaneously operable comparing means, one for each of said registers, each for comparing a portion of the data stored in the corresponding one of said registers with a like portion of a data group to be retrieved, each of said comparing means including match indicating means and mismatch indicating means alternatively operable in dependence upon whether the portion of the desired group and the portion of the data stored in said corresponding register are identical or not, respectively; means responsive to said mismatch indicating means for comparing the data of the register next in said sequence; and a plurality of readout control means, one for each of said registers, each responsive to the corresponding one of said match indicating means for retrieving data from said corresponding register and for preventing retrieval from ones of said registers subsequent thereto in said sequence.

40. In an associative memory of the kind in which groups of data bits stored in random ones of a sequence of registers are identified by a tag portion of the group, and in which the tag of a group which is to be retrieved from memory is compared with the tags of one or more of the groups stored therein, a control device for selecting the one of said registers from which data is to be retrieved, comprising: a tag comparing means for each of said registers, each including a match responsive means and mismatch responsive means alternatively operable in dependence on whether the tag of the desired group and the tag of the group stored in the corresponding register are identical or not, respectively; a read-out means for each of said registers, each operable in response to the corresponding one of said match responsive means to retrieve data from the corresponding register; a connection-means for each register subsequent to the first one in said sequence, each responsive to the mismatch responsive means of the register antecedent thereto in said sequence to operate the corresponding one of said tag comparing means; and initiating means to start a retrieval operation by operating the tag comparing means of the first register in said sequence.

41. Apparatus for retrieving units of coded data in a predetermined sequence from a storage apparatus having addressing means and a plurality of storage locations, each location being capable of storing a unit of data and being coupled to adjacent locations for transfer of data units therebetween, comprising:

(a) means providing a sample data unit;

(b) means for comparing the sample unit of data with an associative region of each of a multiplicity of data units previously stored in the storage locations, until a selected relationship is detected between the sample data unit and a stored unit of data which may be called the match data unit;

means defining two groups of storage locations with respect to the storage location holding the match data unit;

(d) means for extracting the match data unit; and (e) means for deleting the match data unit from the storage apparatus by simultaneously manipulating all of the data units in one of said two groups relative to the other of said groups.

42. Apparatus for retrieving units of coded data in a predetermined sequence from a storage apparatus having addressing means and a plurality of storage locations, each location being capable of storing a unit of data and being coupled to adjacent locations for transfer of data units therebetween, comprising:

(a) means for providing a sample data unit;

(b) means for comparing the sample unit of data with an associative region of each of a multiplicity of data units previously stored in the storage locations, until a selected relationship is detected between the sample data unit and a stored unit of data which may be called the match data unit;

(c) means defining two groups of storage locations with respect to the storage location holding the match data unit;

(d) means for extracting the match data unit; and (e) means for simultaneously transferring the data units in one of the two groups of storage locations into adjacent storage locations so that the storage location emptied by the extraction of the match data unit receives another data unit and consecutive storage locations contain data units of the said one group without gaps.

43. Apparatus for merging units of coded data in a predetermined sequence, according to associative portions of the data units, in a storage apparatus having a plurality of storage locations, each location being capable of storing a data unit and being coupled for transfer of the contained data unit to an adjacent location via a dummy location, comprising:

(a) means providing an entry data unit;

(b) means for comparing the associative portion of the entry data unit with the associative portions of data units contained in the storage locations by examining the data units contained in storage locations;

(c) means for selectively transferring the entry data unit to a selected dummy location when the comparing means indicates that the desired sequential relationship exists between the entry data unit and the data unit contained in the storage location associated with the selected dummy location; and (d) means for extracting the end data unit of the sequence.

44. Apparatus for merging units of coded data in a predetermined sequence, according to associative portions of the data units, in a storage apparatus having a plurality of storage locations, each location being capable of storing a data unit and being coupled for transfer of the contained data unit to an adjacent location via a dummy location, comprising:

(a) means providing an entry data unit;

(b) means for comparing the associative portion of the entry data unit with the associative portions of data units contained in the storage locations by examining the data units contained in storage locations;

(c) means for selectively transferring the entry data unit to a selected dummy location when the comparing means indicates that the desired sequential relationship exists between the entry data unit and that data unit contained in the storage location associated with the selected dummy location;

(d) means for extracting the end data unit of the sequence;

(e) means for retaining a replica of the previously extracted exit data unit in a dummy location;

(f) means for comparing the associative portion of the entry data unit with the associative portion of the replica of the previously extracted exit data unit; and (g) means for selectively starting a new sequence where the comparison between the entry data and the replica of the exit data unit indicates impossibility of maintaining the sequence.

*45. A memory apparatus comprising*

*a memory matrix for storing a plurality of words in word locations each having a plurality of storage elements for representing digit positions,*

*means for simultaneously interrogating the words of said memory matrix to detect the first of a series of words responsive to said interrogation,*

*coupling means responsive to the detection providing immediate access to the detected word location,*

*and means for altering an extra digit position corresponding to said detected word so that a next interrogation will detect a second responsive word in a second word location.*

*46. In an associative memory having word storage locations connected in an array for interrogating all locations simultaneously for a circuit response signifying a match or a mismatch with a search word, a ranking apparatus for indicating the first of a plurality of circuit responses according to a predetermined order, comprising,*

*coupling means for signalling said responses for each word,*

*said coupling means including means effective for the first response according to said predetermined order at any storage location to inhibit other coupling means so that the first response according to said predetermined order is the only one indicated,*

*and means for controlling said coupling means to advance from said first of said responses to any next response in said predetermined order.*

*47. In a storage matrix having a plurality of intersecting rows and columns of storage elements and having controls adapted for associative access to the storage elements of any row, the improvement, for conditioning said associative access upon the intelligence stored in an arbitrary set of storage elements selected at random under program control from a predetermined set of elements in the row being accessed, comprising:*

*a plurality of first means associated individually with the storage elements of all of the said predetermined sets of row elements of the matrix, each first means being operable to compare a bit of intelligence stored in its associated storage element with an externally produced interrogation bit signal;*

*a plurality of second means associated individually with the columns of elements defined by the predetermined sets of row elements, each second means being operable selectively to mask or not mask the operational effects of all first means associated with the elements of the associated column; and*

*a plurality of third means, associated individually with the said rows of storage elements, each capable of responding to the joint effects produced by the first means of the associated row and the second means associated with all columns intersecting the predetermined set of the associated row to produce a row com-*

*parison identity indication if all of the not masked effects of the first means of the associated row represent a predetermined like relationship between all of the respective pairs of internally stored intelligence bits and externally produced interrogation bits compared by the first means producing said not masked effects.*

References Cited

The following references, cited by the Examiner, are of record in the patented file of this patent or the original patent.

UNITED STATES PATENTS

| | | | |
|---|---|---|---|
| 3,119,100 | 1/1964 | Nyberg | 340—173.1 |
| 3,046,415 | 7/1962 | Winslow | 307—88.5 |
| 2,695,397 | 11/1954 | Anderson | 340—173 |
| 2,721,990 | 10/1955 | McNaney | 340—174 |
| 2,737,342 | 3/1956 | Nelson | 340—172.5 |
| 2,794,970 | 6/1957 | Yostpello | 340—172.5 |
| 2,885,655 | 5/1959 | Smoliar | 340—149 |
| 2,885,659 | 5/1959 | Spielberg | 340—174 |
| 2,889,534 | 6/1959 | Lubkin | 340—149 |
| 2,954,166 | 9/1960 | Eckdahl | 340—172.5 |
| 2,996,699 | 8/1961 | Kramskoy | 340—172.5 |
| 3,003,137 | 10/1961 | Kurkjian | 340—172.5 |
| 3,030,609 | 4/1962 | Albrecht | 340—172.5 |
| 3,079,594 | 2/1963 | Johnson | 340—172.5 |

OTHER REFERENCES

Publication I, The Cryotron—A Superconductive Computer Component, by D. AA. Buck, Proceedings of the IRE, April, 1956, pp. 482–493.

GARETH D. SHAW, Primary Examiner